United States Patent
Lai et al.

(10) Patent No.: US 10,820,387 B2
(45) Date of Patent: Oct. 27, 2020

(54) LIGHT SOURCE APPARATUS AND DISPLAY APPARATUS

(71) Applicants: Avertronics INC, Taichung (TW); INDUSTRIAL TECHNOLOGY RESEARCH INSTITUTE, Zhudong Township, Hsinchu County (TW)

(72) Inventors: Bing-Yuan Lai, Taichung (TW); Chi-I Lai, Taichung (TW); Jun-Yu Wu, Taichung (TW); Tzung-Te Chen, Taichung (TW); Shih-Yi Wen, Taichung (TW); Chia-Fen Hsieh, Taichung (TW)

(73) Assignees: Avertronics INC, Taichung (TW); INDUSTRIAL TECHNOLOGY RESEARCH INSTITUTE, Hsinchu County (TW)

( * ) Notice: Subject to any disclaimer, the term of this patent is extended or adjusted under 35 U.S.C. 154(b) by 0 days.

(21) Appl. No.: 16/593,956

(22) Filed: Oct. 4, 2019

(65) Prior Publication Data
US 2020/0077486 A1 Mar. 5, 2020

Related U.S. Application Data

(63) Continuation-in-part of application No. 16/018,086, filed on Jun. 26, 2018, now Pat. No. 10,485,070.

(30) Foreign Application Priority Data

Jul. 24, 2019 (TW) .............................. 108126215 A

(51) Int. Cl.
| | | |
|---|---|---|
| H05B 37/02 | (2006.01) | |
| H05B 39/04 | (2006.01) | |
| H05B 41/36 | (2006.01) | |
| H05B 45/20 | (2020.01) | |
| H05B 45/22 | (2020.01) | |
| H05B 47/11 | (2020.01) | |

(52) U.S. Cl.
CPC ............. *H05B 45/20* (2020.01); *H05B 45/22* (2020.01); *H05B 47/11* (2020.01)

(58) Field of Classification Search
None
See application file for complete search history.

(56) References Cited

U.S. PATENT DOCUMENTS

2005/0015122 A1* 1/2005 Mott ...................... H05B 47/11
  607/88
2010/0174345 A1* 7/2010 Ashdown ............. A61N 5/0618
  607/88

(Continued)

*Primary Examiner* — Anh Q Tran

(57) ABSTRACT

An embodiment of the disclosure provides a light source apparatus including a light-emitting module and a control unit. The light-emitting module is configured to provide a light. The control unit is configured to change proportion of a first sub-light and a second sub-light to form the light so that a circadian action factor (CAF) and a correlated color temperature (CCT) of the light varies along a CAF vs. CCT locus of the light different from a CAF vs. CCT locus of sunlight. A CAF vs. CCT coordinate of one of the first sub-light and the second sub-light is below the CAF vs. CCT locus of sunlight, and a CAF vs. CCT coordinate of the other one of the first sub-light and the second sub-light is above the CAF vs. CCT locus of sunlight. A display apparatus is also provided.

23 Claims, 95 Drawing Sheets

(56) References Cited

U.S. PATENT DOCUMENTS

2010/0244735 A1* 9/2010 Buelow, II ............. H05B 35/00
315/294
2012/0319593 A1* 12/2012 Jou ........................ H05B 45/22
315/152

* cited by examiner

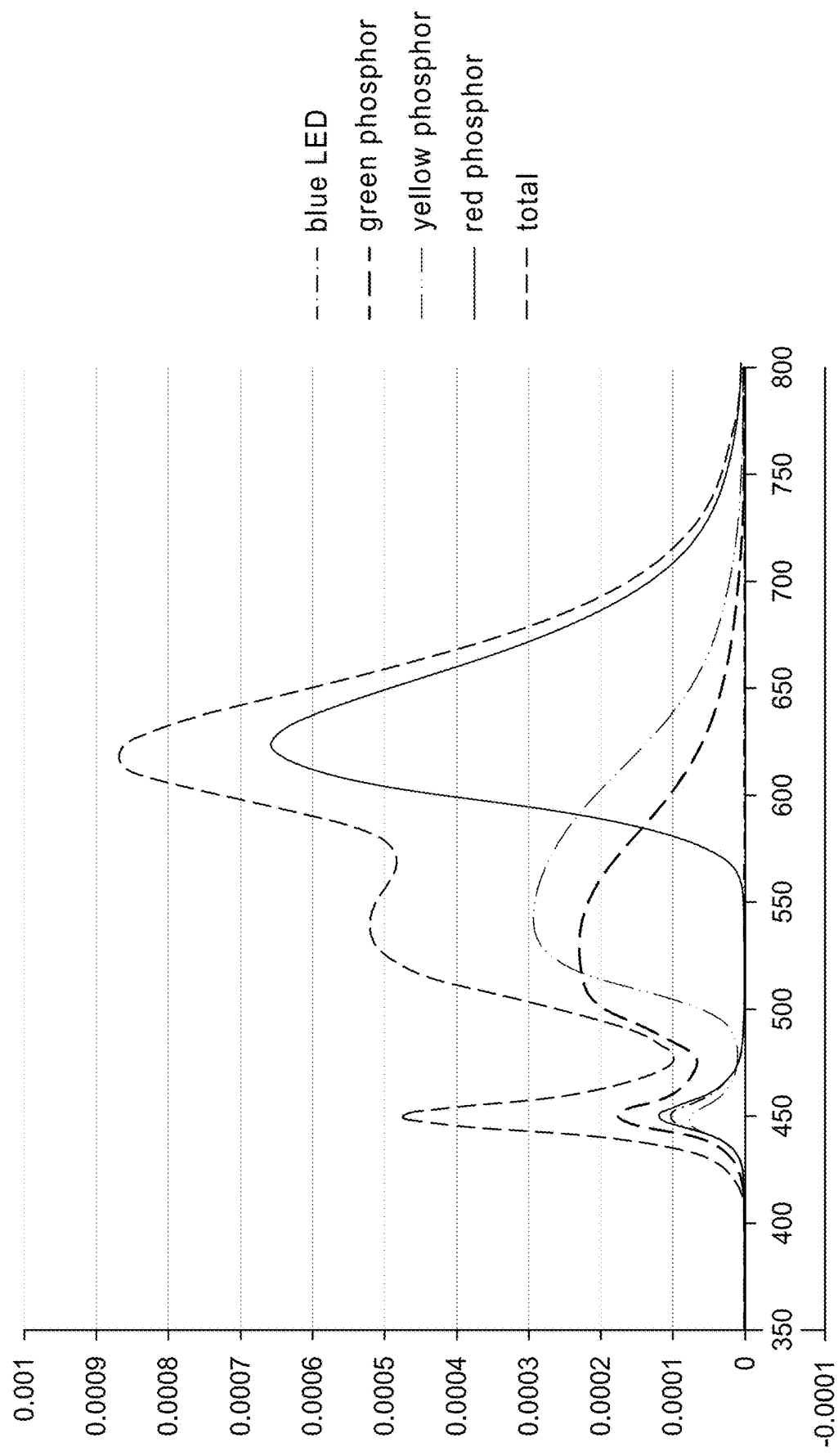

LIGHT SOURCE APPARATUS AND DISPLAY APPARATUS

CROSS-REFERENCE TO RELATED APPLICATION

This application is a continuation-in-part application of and claims the priority benefit of a prior application Ser. No. 15/632,393, filed on Jun. 26, 2017, now allowed. The application Ser. No. 15/632,393 is a continuation-in-part application of and claims the priority benefit of a prior application Ser. No. 14/746,857, filed on Jun. 23, 2015, U.S. Pat. No. 9,693,408. The application Ser. No. 14/746,857 is a continuation-in-part application of and claims the priority benefit of another prior application Ser. No. 13/864,235, filed on Apr. 16, 2013, U.S. Pat. No. 9,095,029. The application Ser. No. 13/864,235 claims the priority benefit of Taiwan application serial no. 101151048, filed on Dec. 28, 2012. The entirety of each of the above-mentioned patent applications is hereby incorporated by reference herein and made a part of this specification.

TECHNICAL FIELD

The disclosure is generally related to a light source apparatus and a display apparatus.

BACKGROUND

Along with Thomas Alva Edison invented the light bulb, the light source produced by the electric power lights up the night, and also the civilization of mankind With this kind of artificial light source, the human is able to take advantage of the time at night, which thus further led to the development of science, technology and education. In the research field about the impact of a light source on circadian stimulus (CS), Yasukouchi discovered the light source with high color temperature at night can more inhibit the secretion of melatonin than a light source with low color temperature. Next, since 2001, Branard has studied the relationship between the human eyes and the biological effects, so as to further reveal the relationship between the light source and the secretion of melatonin and the biological influences, which can be expressed by FIG. 1 "The relationship curve between a light source and the corresponding circadian stimulus" (2001, Action Spectrum for Melatonin Regulation in Humans: Evidence for a Novel Circadian Photoreceptor). The further studies point out different wavelengths (400 nm-550 nm) of a light source have different influences on CS. Therefore, by judging the influence extent of a light source on human CS, a light source used for night or daytime should be different ones respectively with different appropriate spectral composition so as to provide appropriate artificial lighting sources.

IWBI provides regulations for equivalent melanopic lux ("EML") in a building as follows:

1. Illumination in an office: illuminance in 75% of a working area should be at least 200 EML in the period of 09:00 to 13:00, and illuminance in an entire working area should be at least 150 EML.

2. Illumination in a bedroom or bathroom: average illuminance should be lower than 50 EML in two hours before the "bed time."

3. Illumination in a rest area of a hospital or restaurant: average illuminance should be higher than 250 EML.

4. Illumination in a learning area: average illuminance should be higher than 125 EML in 75% of an area around a desk or table and exposure to at least one hour of ambient light every day for those under the age of 25, and average illuminance should be higher than 150 EML in a highly creative learning area such as an art-learning area.

Hence, illumination is more than provision of light. Provision of light at different wavelengths improves users' health. Conventionally, calculation and design are used to combine illuminators of different color temperatures to satisfy different needs for EML in different areas. However, such design entails troubles in maintenance and cannot be changed or adjusted to satisfy different needs in time.

SUMMARY

An embodiment of the disclosure provides a light source apparatus including a light-emitting module and a control unit. The light-emitting module is configured to provide a light. The control unit makes the light emitted from the light-emitting module switched between a first light and a second light. A spectrum of the first light is different from a spectrum of the second light, and color temperatures of the first light and the second light are substantially the same as each other.

An embodiment of the disclosure provides a light source apparatus including a light-emitting module and a control unit. The light-emitting module is configured to provide a light. The control unit makes the light emitted from the light-emitting module switched among a plurality of kinds of first light. Correlated color temperatures of the plurality of kinds of first light are different from each other, and circadian stimulus values of the plurality of kinds of first light are substantially the same as each other.

An embodiment of the disclosure provides a light source apparatus including a light-emitting module and a control unit. The light-emitting module is configured to provide a light. The control unit is configured to change proportion of a first sub-light and a second sub-light to form the light so that a circadian action factor (CAF) and a correlated color temperature (CCT) of the light varies along a CAF vs. CCT locus of the light different from a CAF vs. CCT locus of sunlight. A CAF vs. CCT coordinate of one of the first sub-light and the second sub-light is below the CAF vs. CCT locus of sunlight, and a CAF vs. CCT coordinate of the other one of the first sub-light and the second sub-light is above the CAF vs. CCT locus of sunlight.

An embodiment of the disclosure provides a light source apparatus including a light-emitting module and a control unit. The light-emitting module is configured to provide a light. The control unit is configured to make the light switched between a first light and a second light so that at least one of a blue-light hazard and a circadian stimulus value of the light is changed. A wavelength of a blue light main peak in a spectrum of the first light is greater than a wavelength of a blue light main peak in a spectrum of the second light.

An embodiment of the disclosure provides a light source apparatus including a light-emitting module and a control unit. The light-emitting module is configured to provide a light including a red sub-light, a green sub-light, and a blue sub-light. The control unit is configured to change proportion of the red sub-light, the green sub-light, and the blue sub-light so as to form different white lights. A wavelength of a main peak in a spectrum of the blue sub-light is within a range of 460 nanometer to 480 nanometer.

An embodiment of the disclosure provides a light source apparatus including a light-emitting module and a control unit. The light-emitting module is configured to provide a light including a red sub-light, a green sub-light, and a blue sub-light. The control unit is configured to change proportion of the red sub-light, the green sub-light, and the blue sub-light so as to form different white lights. A wavelength of a main peak in a spectrum of the blue sub-light is within a range of 440 nanometer to 450 nanometer.

An embodiment of the disclosure provides a light source apparatus including a light-emitting module and a control unit. The light-emitting module is configured to provide a light. The control unit is configured to change proportion of a first sub-light and a second sub-light to form the light so that a correlated color temperature (CCT) and a blue-light hazard of the light are changed. The blue-light hazard of the light is changeable at a same CCT, and a CCT of the first sub-light is less than a CCT of the second sub-light.

An embodiment of the disclosure provides a light source apparatus including a first light source, a second light source, and a control unit. The first light source is for generating a first light having a first spectral distribution, wherein the first light has a first color coordinate in a chromaticity diagram. The second light source is for generating a second light having a second spectral distribution, wherein the second light has a second color coordinate in the chromaticity diagram. The second spectral distribution differs from the first spectral distribution. The control unit is for driving the first light source and the second light source, wherein the light source apparatus is designed in such a way that the first color coordinate substantially corresponds to the second color coordinate.

An embodiment of the disclosure provides a light source apparatus including a first light source, a second light source, and a control unit. The control unit is configured to control the first light source and the second light source. The first light source is configured to provide a first light having a correlated color temperature between 2500 K and 3000 K and a color rendering index (CRI) greater than 90. The second light source is configured to provide a second light, and the CRI of the first light is greater than a CRI of the second light.

An embodiment of the disclosure provides a light source apparatus including a first light-emitting diode (LED) light source and a second LED light source. The first LED light source and the second LED light source are arranged to be operated in a first operating mode to emit a first light, and are arranged to be operated in a second operating mode to emit a second light. The first light and the second light are within a same MacAdam ellipse of a target correlated color temperature, and a circadian stimulus value of the first light is greater than a circadian stimulus value of the second light by over 5% of the circadian stimulus value of the second light. At least one of the first LED light source and the second LED light source includes at least one LED arranged to stimulate emissions of at least one phosphor material.

An embodiment of the disclosure provides a display apparatus including a display and a backlight device. The backlight device is configured to illuminate the display and includes a first light-emitting diode (LED) light source and a second LED light source. The first LED light source and the second LED light source are arranged to be operated in a first operating mode to emit a first light, and are arranged to be operated in a second operating mode to emit a second light. The first light and the second light are within a same MacAdam ellipse of a target correlated color temperature, and a circadian stimulus value of the first light is greater than a circadian stimulus value of the second light by over 5% of the circadian stimulus value of the second light.

An embodiment of the disclosure provides a light source apparatus including a first light source configured to provide a first light. A circadian action factor (CAF) vs. correlated color temperature (CCT) coordinate (CCT, CAF) of the first light is within a first area formed by six CAF vs. CCT coordinates (2700±100 K, 0.197), (2700±100 K, 0.696), (4500±200 K, 0.474), (4500±200 K, 1.348), (6500±300 K, 0.759), and (6500±300 K, 1.604) as vertices.

An embodiment of the disclosure provides a light source apparatus including a first light source configured to provide a first light. A circadian action factor (CAF) vs. correlated color temperature (CCT) coordinate (CCT, CAF) of the first light is within an area having an upper boundary, a lower boundary, and CAF vs. CCT coordinates between the upper boundary and the lower boundary. CAF vs. CCT coordinates (2700±100 K, 0.696), (4500±200 K, 1.348), and (6500±300 K, 1.604) are on the upper boundary. CAF vs. CCT coordinates (2700±100 K, 0.197), (4500±200 K, 0.474), and (6500±300 K, 0.759) are on the lower boundary.

According to an embodiment of the present invention, a light source system is devised to sense an ambient-light parameter to enable a light source system to provide light with different EML in different areas, at different points of time or according to different settings.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 8B is spectra of the second light and the lights respectively emitted from the light-emitting units in the second illumination mode in FIG. 7.

DETAILED DESCRIPTION OF DISCLOSED EMBODIMENTS

Figure 2A:
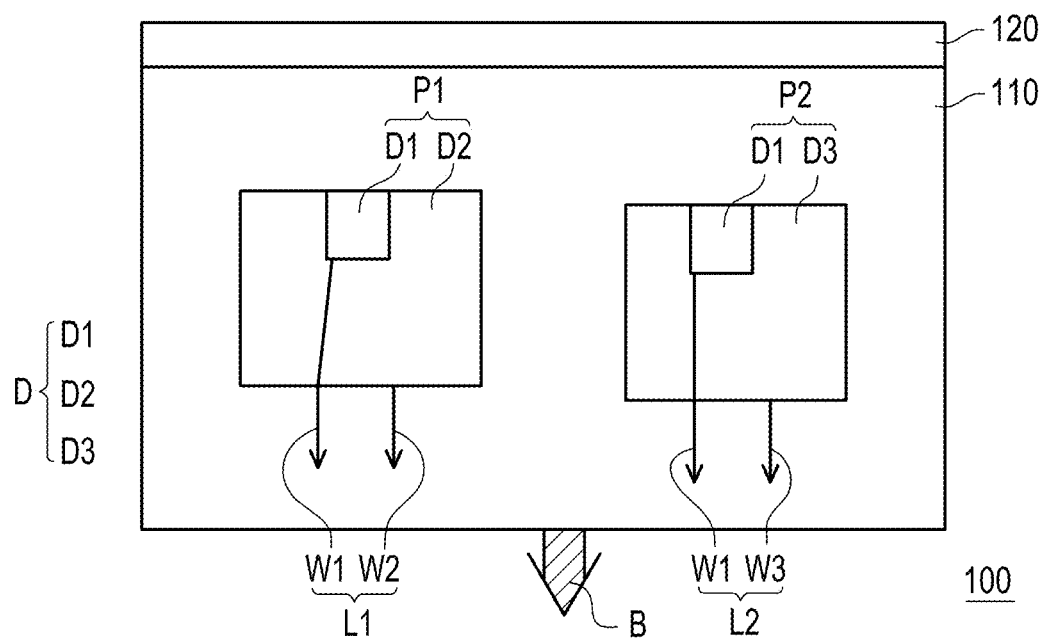
FIG. 2A is a schematic diagram of a light source apparatus in an embodiment of the disclosure.
Figure 2B:
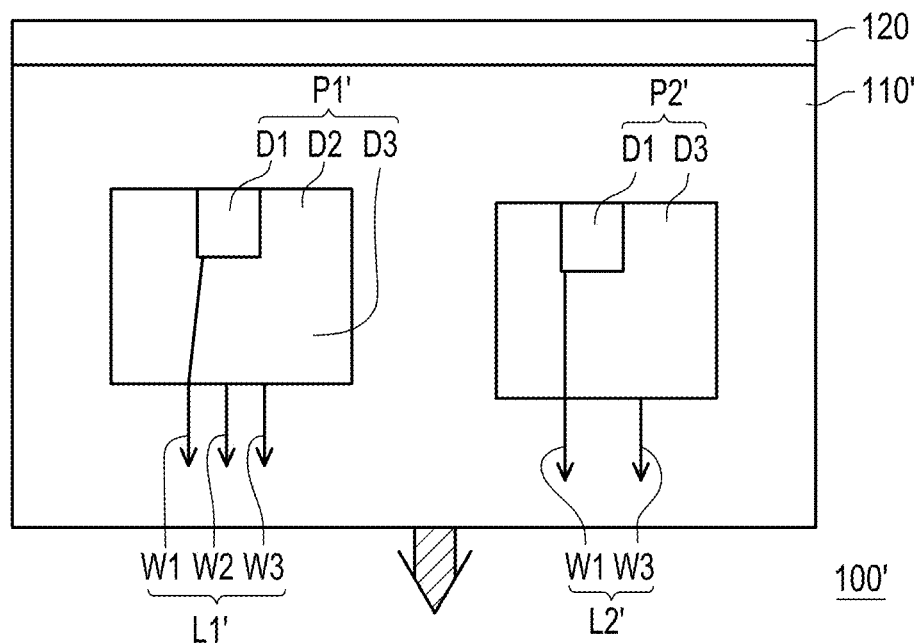
FIG. 2B is a diagram of the variation of the light source apparatus in the embodiment of FIG. 2A.
Figure 2C:
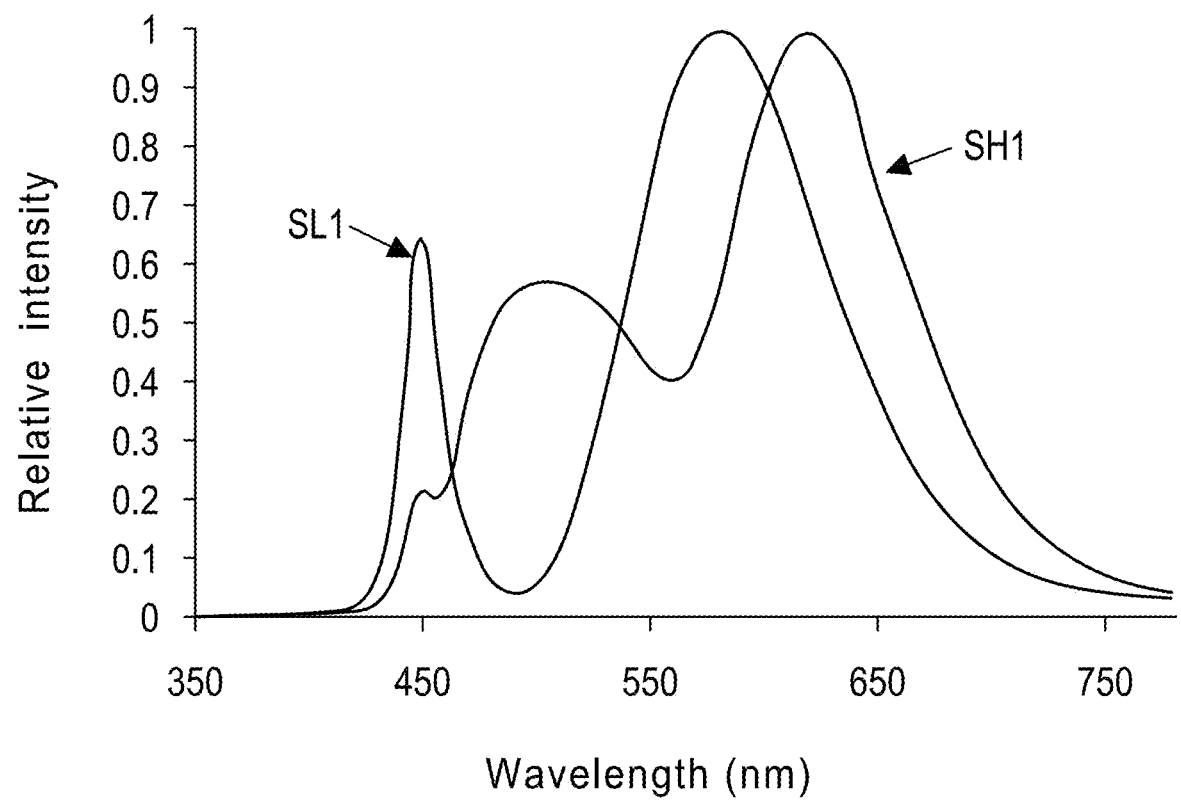
FIG. 2C is a spectrum diagram showing the relative light intensity and the optical wavelength according to the light emitted from the light source apparatus in the embodiment of FIG. 2B.

FIG. 2A is a schematic diagram of a light source apparatus in an embodiment of the disclosure, FIG. 2B is a diagram of the variation of the light source apparatus in the embodiment of FIG. 2A and FIG. 2C is a spectrum diagram showing the relative light intensity and the optical wavelength according to the light source apparatus in the embodiment of FIG. 2B.

Referring to FIGS. 2A-2C, in the embodiment, a light source apparatus 100 includes a light-emitting module 110 and a control unit 120. The light-emitting module 110 provides a light B, and in the embodiment, the light B means the light emitted from the light-emitting module 110, which may have a divergence angle and is not limited to a specific transmitting direction. The control unit 120 is for switching the light B emitted from the light-emitting module 110 between a first light L1 and a second light L2, in which the CS/P value in view of photometry of the second light L2 is less than the CS/P value of the first light L1, and the color temperatures of the first light L1 and the second light L2 are substantially the same as each other. Thus, the light source apparatus 100 can provide the first light L1 with high CS/P value or the second light L2 with low CS/P value by selection according to the real application environment, time and goal without making the user easily noticed of the change of the optical color temperature so as to maintain the natural circadian rhythm of user and meanwhile to provide enough light source.

Figure 1:
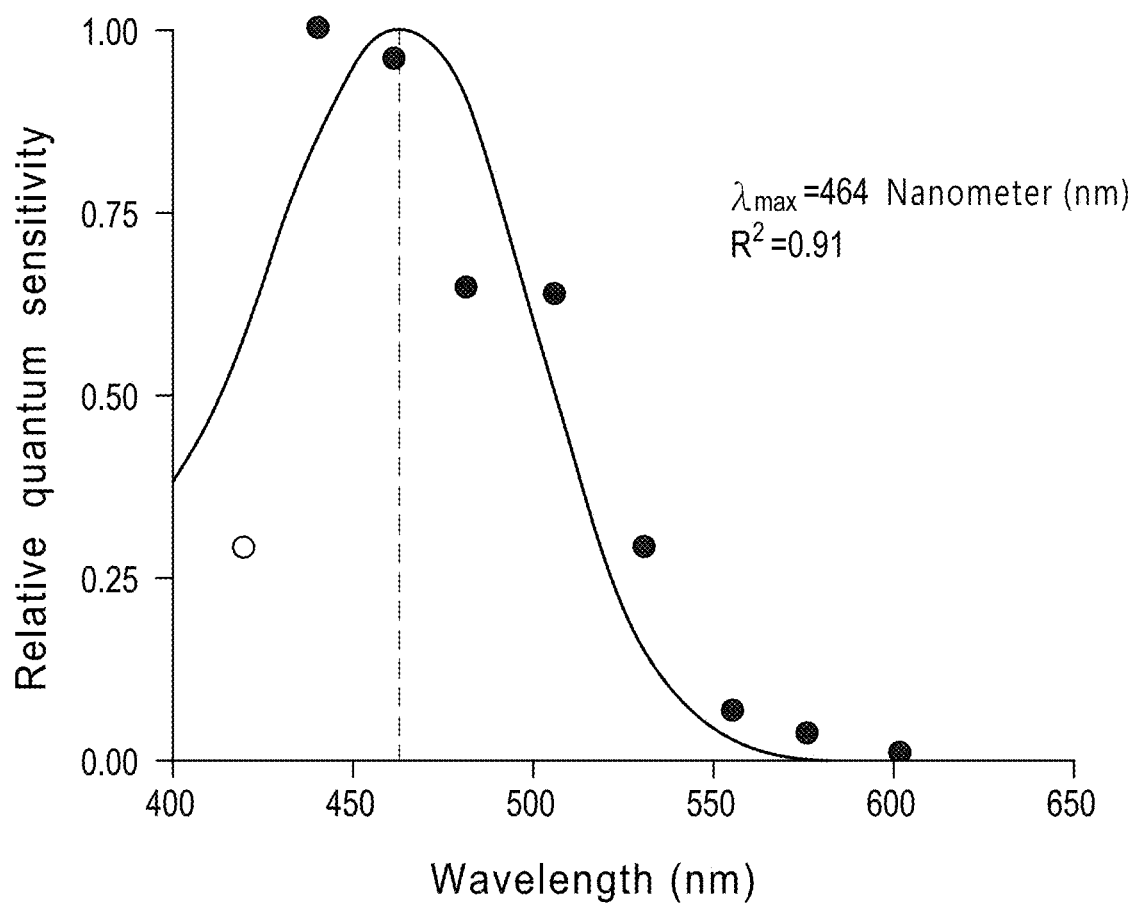
FIG. 1 is a diagram illustrating the relationship curve between a light source and the corresponding CS/P.
Figure 3:
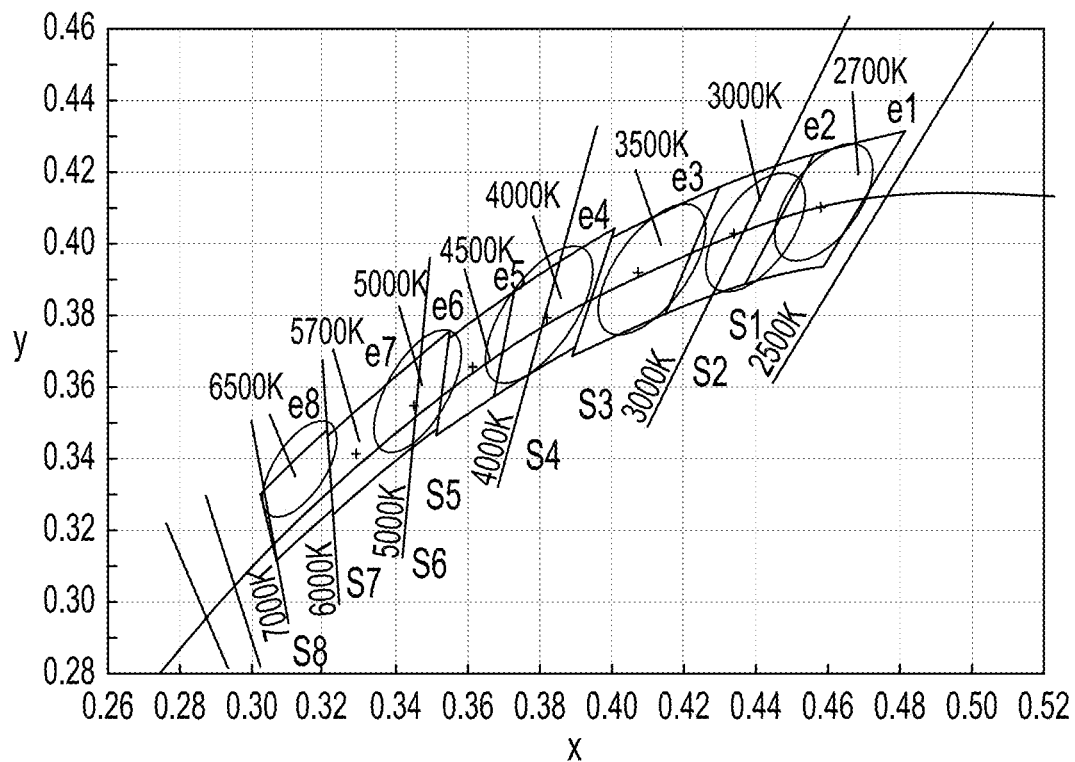
FIG. 3 is a diagram showing color space coordination patterns of same color temperatures defined by American National Standard Institute (ANSI).

In more details, in the embodiment, the definition of CS/P value is expressed by the following formula:

$$CS = \int_{vis} CS(\lambda) \cdot P_{0\lambda} \cdot d\lambda$$

$$P = \int_{vis} P(\lambda) \cdot P_{0\lambda} \cdot d\lambda$$

$$CS/P = \frac{\int_{vis} CS(\lambda) \cdot P_{0\lambda} \cdot d\lambda}{\int_{vis} P(\lambda) \cdot P_{0\lambda} \cdot d\lambda}$$

wherein CS($\lambda$) represents human circadian function, P($\lambda$) represents human photopic function, $P_{0\lambda}$ represents spectrum after completing light blending, CS represents CS/P value of the spectrum after completing light-blending, and P represents light intensity of the spectrum after completing light-blending, in which P($\lambda$) is defined according to Commission International de l'éclairage (CIE); human circadian function CS($\lambda$) can refer to the "action spectrum (1997)" introduced by Prof. Brainard as shown by FIG. 1, "human invisible circadian function (2005)" introduced by Mark Rea and the circadian function stated in German pre-standard, DIN V. The light source apparatus 100 of the disclosure can be suitable for various circadian functions. FIG. 3 is a diagram showing color space coordination patterns of same color temperatures defined by American National Standard Institute (ANSI). Referring to FIG. 3, in the embodiment, "same color temperatures" is defined according to ANSI. In other words, for any light source with the same color temperature designed following the ANSI standard, the color difference of the light source is uneasily noticed by human eyes. The detail coordinates corresponding to the color space coordination patterns in FIG. 3 defined by ANSI are listed in the following table 1:

TABLE 1

| | 2700 K | | 3000 K | | 3500 K | | 4000 K | |
| --- | --- | --- | --- | --- | --- | --- | --- | --- |
| | X | Y | X | Y | X | Y | X | Y |
| Center point | 0.4578 | 0.4101 | 0.4338 | 0.4030 | 0.4073 | 0.3917 | 0.3818 | 0.3797 |
| Tolerance | 0.4813 | 0.4319 | 0.4562 | 0.4260 | 0.4299 | 0.4165 | 0.4006 | 0.4044 |

TABLE 1-continued

| | | | | | | | | |
|---|---|---|---|---|---|---|---|---|
| quadrilateral | 0.4562 | 0.4260 | 0.4299 | 0.4165 | 0.3996 | 0.4015 | 0.3736 | 0.3874 |
| | 0.4373 | 0.3893 | 0.4147 | 0.3814 | 0.3889 | 0.3690 | 0.3670 | 0.3578 |
| | 0.4593 | 0.3944 | 0.4373 | 0.3893 | 0.4147 | 0.3814 | 0.3898 | 0.3716 |

| | 4500 K | | 5000 K | | 5700 K | | 6500 K | |
|---|---|---|---|---|---|---|---|---|
| | X | Y | X | Y | X | Y | X | Y |
| Center point | 0.3611 | 0.3658 | 0.3447 | 0.3553 | 0.3287 | 0.3417 | 0.3123 | 0.3282 |
| Tolerance | 0.3736 | 0.3874 | 0.3551 | 0.3760 | 0.3376 | 0.3616 | 0.3205 | 0.3481 |
| quadrilateral | 0.3548 | 0.3736 | 0.3376 | 0.3616 | 0.3207 | 0.3462 | 0.3028 | 0.3304 |
| | 0.3512 | 0.3465 | 0.3366 | 0.3369 | 0.3222 | 0.3243 | 0.3068 | 0.3113 |
| | 0.3670 | 0.3578 | 0.3515 | 0.3487 | 0.3366 | 0.3369 | 0.3221 | 0.3261 | wherein the data ranges in Table 1 can be corresponding to the color temperature ranges S1-S8 of tolerance quadrilateral in FIG. 3 by calculation. For example, the CS/P values within the color temperature range S1 of tolerance quadrilateral in FIG. 3 are very close to the human eyes, and analogy to the rest. In more details, the tolerance quadrilateral in Table 1 can be calculated to be a color temperature range, as shown by Table 2:

TABLE 2

| Nominal correlated color temperature (CCT) | Target-related color temperature (K) and tolerance |
|---|---|
| 2700 K | 2725 ± 145 |
| 3000 K | 3045 ± 175 |
| 3500 K | 3465 ± 245 |
| 4000 K | 3985 ± 275 |
| 4500 K | 4503 ± 243 |
| 5000 k | 5028 ± 283 |
| 5700 K | 5665 ± 355 |
| 6500 K | 6530 ± 510 | wherein the data ranges in Table 2 can be calculated to be ellipse color temperature ranges e1-e8 in FIG. 3. In more details, these ellipse color temperature ranges e1-e8 are David MacAdam ellipses. For example, the color temperature coordinates within the ellipse color temperature range e1 are very close to the human eyes, and analogy to the rest. It should be noted that the coordinate data in Table 1 and Table 2 are example to indicate that the color temperatures in the embodiment are substantially the same only. The real coordinate data should refer to the up-to-date definition of ANSI, which the disclosure is not limited to. In another embodiment, "the color temperatures are the substantially same" means the color temperatures are within a same ellipse color temperature range. In this way, the light source apparatus 100 can select a light source with different CS/P value according to the real application environment, the time and the goal without making the user easily noticed of the change of the optical color temperature, so as to maintain the user's circadian rhythm and meanwhile to provide enough light source.

In more details, referring to FIG. 2A, the control unit 120 can make the light-emitting module 110 switched between a plurality of light-emitting modes, and these light-emitting modes include a first circadian stimulus mode and a second circadian stimulus mode. The light-emitting module 110 includes a plurality of light-emitting units D, and these light-emitting units D can include electroluminescent light-emitting element, light-induced light-emitting element or a combination thereof. The light-emitting units D include at least one first light-emitting unit D1, at least one second light-emitting unit D2 and at least one third light-emitting unit D3. The first light-emitting unit D1 provides a first sub-light beam W1, the second light-emitting unit D2 provides a second sub-light beam W2, and the third light-emitting unit D3 provides a third sub-light beam W3, in which at least one range of wave peaks of the first sub-light beam W1 can be greater than 420 nm but less than 480 nm, at least one range of wave peaks of the second sub-light beam W2 can be greater than 480 nm but less than 540 nm, and at least one range of wave peaks of the third sub-light beam W3 can be greater than 540 nm.

When the control unit 120 makes the light-emitting module 110 switched to the first circadian stimulus mode, the control unit 120 makes the first portion P1 of the light-emitting units D provide the first light L1, in which the first light L1 includes the first sub-light beam W1 and the second sub-light beam W2; when the control unit 120 makes the light-emitting module 110 switched to the second circadian stimulus mode, the control unit 120 makes the second portion P2 of the light-emitting units D provide the second light L2, in which the second light L2 includes the first sub-light beam W1 and the third sub-light beam W3. The color temperatures of the first light L1 and the second light L2 are substantially the same, so that the CS/P value can be changed to meet different requirements without affecting the color temperature feeling of the user.

In addition, the light source apparatus 100' in FIG. 2B is similar to the light source apparatus 100 in FIG. 2A, and in FIG. 2B, each the light-emitting unit provides a range of wave peaks same as the corresponding range of wave peaks in the embodiment of FIG. 2A. The difference of FIG. 2B from FIG. 2A rests in that the first portion P1' of the light source apparatus 100' in FIG. 2B further includes a third light-emitting unit D3.

Under the first circadian stimulus mode, the first light L1' provided by the first portion P1' can include the first sub-light beam W1, the second sub-light beam W2 and the third sub-light beam W3; under the second circadian stimulus mode, the second light L2' provided by the second portion P2' can include the first sub-light beam W1 and the third sub-light beam W3.

The frequency spectrum of the case of FIG. 2B after finishing the light-blending is shown by FIG. 2C. Since the CS/P value of the second sub-light beam W2 is greater than the CS/P value of the third sub-light beam W3, the CS/P values of the first light L1' and the second light L2', due to the different light-blending spectrums thereof, are different from each other regardless the first light L1' and the second light L2' have the same color temperature 3000K. The spectrum of the first light L1' is shown by the light-blending spectrum curve SH1 in FIG. 2C and the CS/P value is roughly 0.43 by calculation; the light-blending spectrum of the second light L2' is shown by the spectrum curve SL1 in FIG. 2C and the CS/P value is roughly 0.27 by calculation, which mean the CS/P value of the first light L1' by calculation is roughly 159% of the CS/P value of the second light L2'. In this way, the CS/P values of the second light L2' and the first light L1' are different from each other more noticed, but the disclosure does not limit the above-mentioned difference to achieve the above-mentioned goal.

Figure 2D:
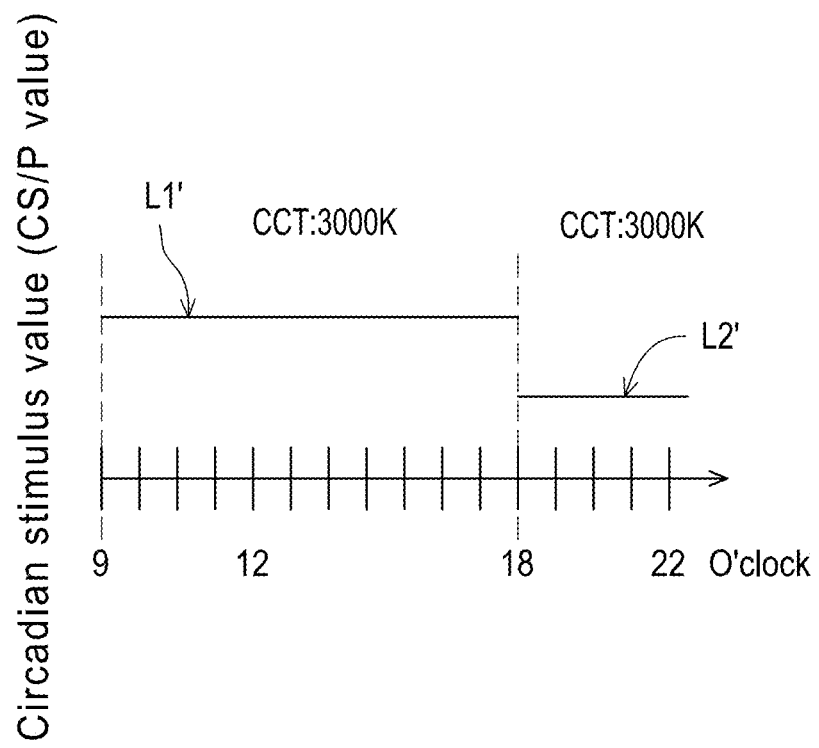
FIG. 2D is a timing diagram showing different illumination modes in different periods for the light source apparatus in the embodiment of FIG. 2B.

Moreover, the control unit 120 makes the light B emitted from the light-emitting module 110' in a plurality of periods of a whole day switched to the first circadian stimulus mode (for providing the first light L') or the second circadian stimulus mode (for providing the second light L2') according to the requirement. In more details, FIG. 2D is a timing diagram showing different illumination modes in different periods for the light source apparatus in the embodiment of FIG. 2B. Referring to FIGS. 2B and 2D, taking an example, the light source apparatus 100' can be used for illumination of hotel, where the first light L1' with color temperature of 3000K and a higher CS/P value is provided in the working period (as shown in 9:00-18:00 by FIG. 2D) so as to boost the alertness and working vitality of the service personnel and meanwhile bring guests visual warmth and comfort feeling; the light-emitting module 110' in the light source apparatus 100' is switched to provide the second light L2' with the same color temperature of 3000K and a lower CS/P value in the evening period (as shown in 18:00-22:00 of FIG. 2D) so as to reduce the circadian stimulus on the service personnel on evening duty and the quests without affecting the illumination color temperature so as to avoid affecting the melatonin secretion to affect the health of the service personnel and the guests. It should be noted that the timing of FIG. 2D is an example to describe the embodiment only, the disclosure is not limited thereto, and in other embodiments, the timing can be varied according to the implementation requirement.

Figure 2E:
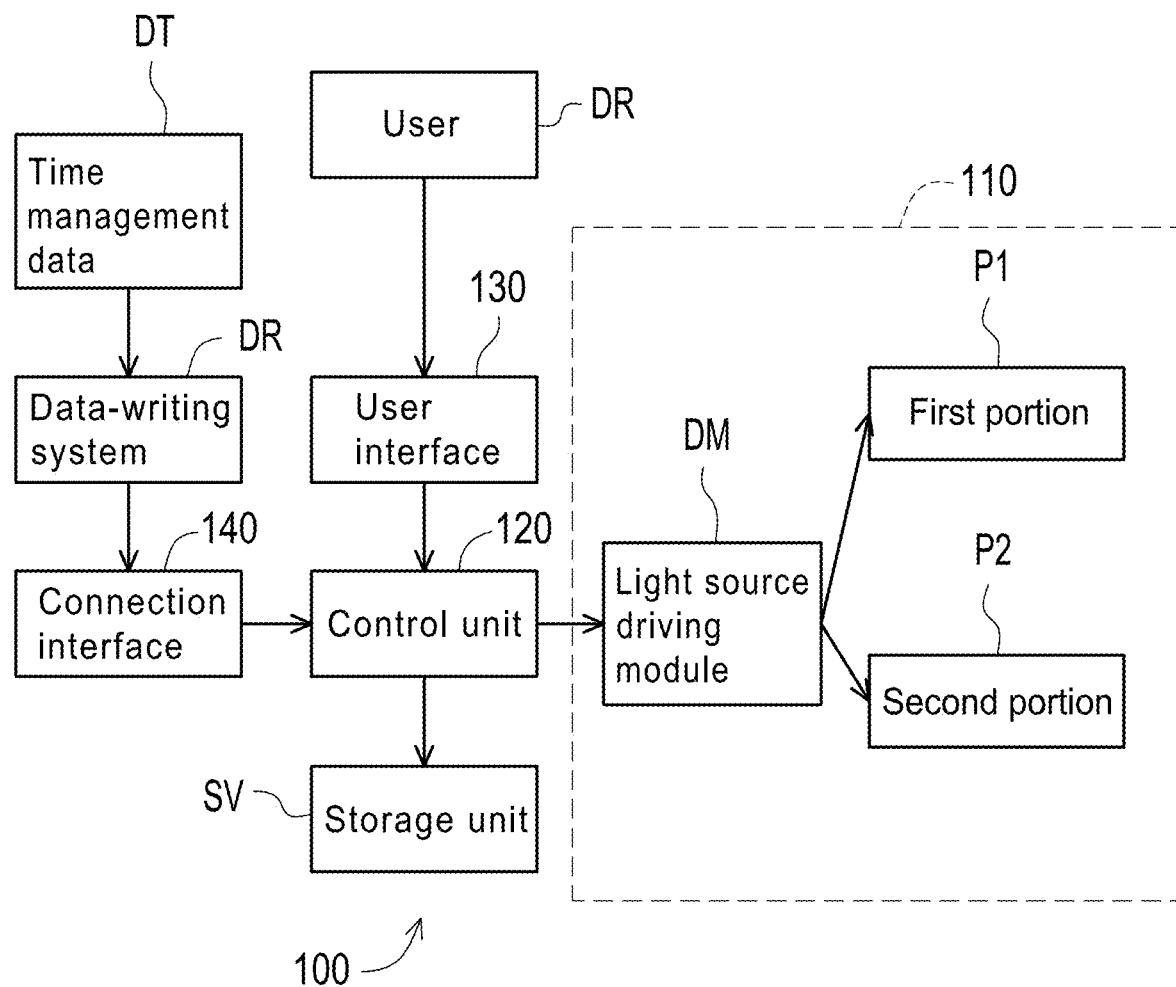
FIG. 2E is a block chart of the light source apparatus of FIG. 2A.

FIG. 2E is a block chart of the light source apparatus of FIG. 2A. Referring to FIG. 2E, in the embodiment, the light source apparatus 100 further includes a user interface 130, and the control unit 120 can decide the present illumination modes of the light source apparatus 100 according to a signal input from the user interface 130 corresponding to the operation of the user UR. In more details, the control unit 120 is, for example, a microprocessor, and can make the light-emitting module 110 in a plurality of periods respectively switched to different illumination modes according to a time management data DT, wherein the time management data DT is related to biological clock. For example, the time management data DT can be the mode-switching time data in the timing diagram in FIG. 2D, which the disclosure is not limited to. Moreover, the light source apparatus 100 includes a data-writing system DR, the time management data DT can be received and stored in a storage unit SV through the connection between the data-writing system DR and the control unit 120, and the control unit 120 can control itself by loading the time management data DT from the storage unit SV to make a light source driving module DM drive the first portion P1 or the second portion P2 so as to achieve the effect in the embodiment of FIG. 2A. On the other hand, the light source apparatus 100 further includes a connection interface 140 to transmit the time management data DT from the data-writing system DR to the control unit 120, in which the connection interface 140 is a cable connection interface or a wireless connection interface. For example, the connection interface 140 may be a manual switch or a remote, and the user UR can use the manual switch or the remote to select or alter the illumination mode of the light source apparatus 100. The light source apparatus 100 can also automatically select or alter the illumination mode depending on the time to meet the requirement of the user UR according to the content of the time management data DT.

In the embodiment of FIG. 2A however, the light-emitting module 110 of the light source apparatus 100 can provide the first light L1 and the second light L2 with the same color temperatures but different CS/P values; in other embodiments, the light-emitting module 110 of the light source apparatus 100 can provide the lights with the same or different color temperatures and different CS/P values as well.

Figure 4A:
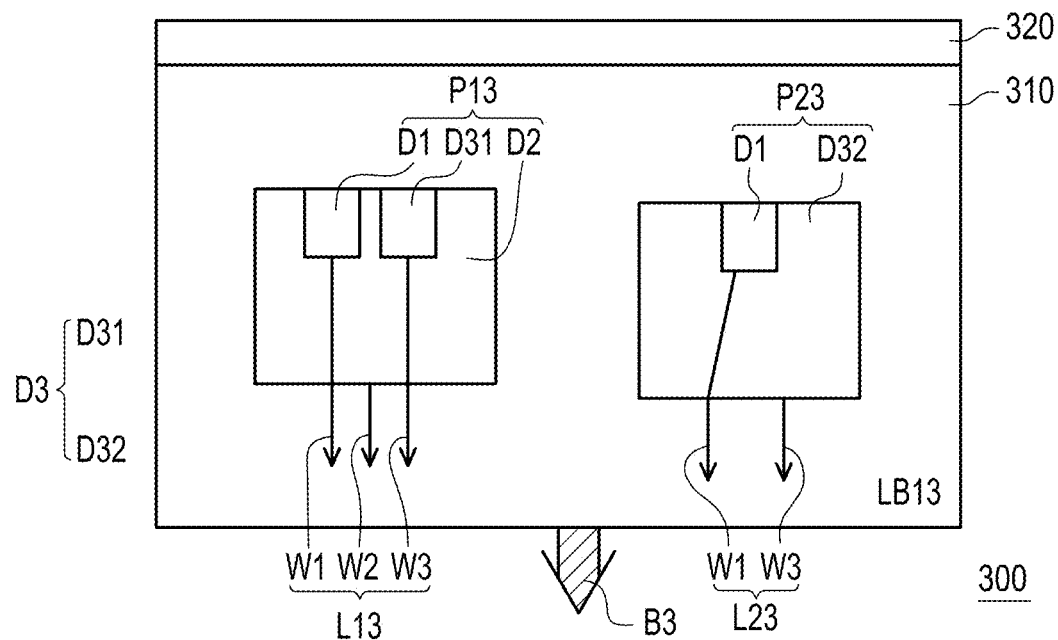
FIG. 4A is a schematic diagram of a light source apparatus in another embodiment of the disclosure.

FIG. 4A is a schematic diagram of a light source apparatus in another embodiment of the disclosure. Similarly to the embodiment of FIG. 2A, a light source apparatus 300 in FIG. 4A includes a first light-emitting unit D1, a second light-emitting unit D2 and a third light-emitting unit D3, in which the third light-emitting unit D3 includes two light-emitting units D31 and D32.

The first portion P1 of the light source apparatus 300 includes the first light-emitting unit D1, the second light-emitting unit D2 and the third light-emitting unit D31 respectively corresponding to producing the first sub-light beam W1, the second sub-light beam W2 and the third sub-light beam W3. The second sub-light beam W2 herein can be produced by a phosphor stimulated by the first sub-light beam W1 (at the time, the second light-emitting unit D2 can be a phosphor), while the third sub-light beam W3 is produced by a light-emitting diode (LED). The second portion P23 of the light source apparatus 300 includes the first light-emitting unit D1 and the third light-emitting unit D32 respectively corresponding to producing the first sub-light beam W1 and the third sub-light beam W3, in which the first sub-light beam W1 can be produced by an LED and the third sub-light beam W3 can be produced by a phosphor stimulated by the first sub-light beam W1 (at the time, the third light-emitting unit D32 can be a phosphor). Herein, at least one range of wave peaks of the first sub-light beam W1 is greater than 420 nm but less than 480 nm, at least one range of wave peaks of the second sub-light beam W2 can be greater than 480 nm but less than 540 nm, and at least one range of wave peaks of the third sub-light beam W3 can be greater than 540 nm.

In the embodiment of FIG. 4A, the difference from the above-mentioned embodiments rests in that, in the light source apparatus 300 of FIG. 4A, the control unit 320 makes the light B3 emitted from the light-emitting module 310 switched between a first light L13 and a second light L23, in which the color temperatures of the first light L13 and the second light L23 are different from each other.

Figure 4B:
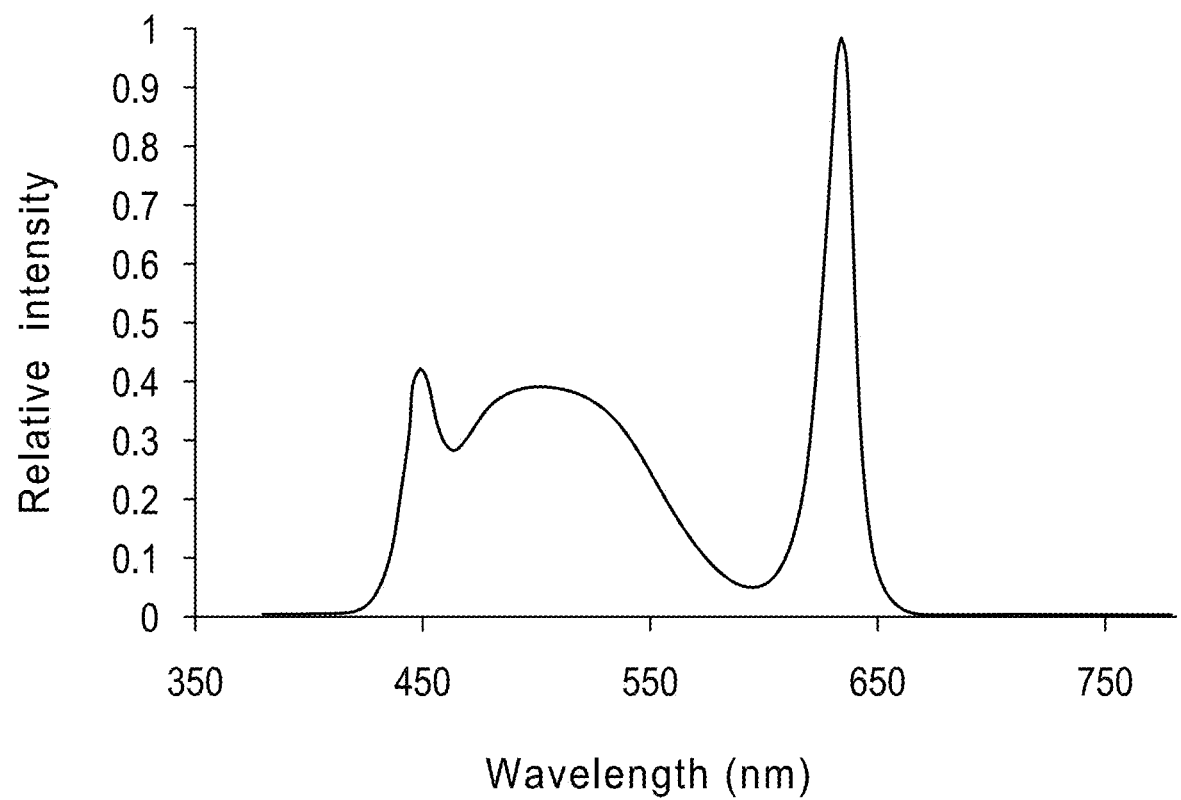
FIG. 4B is a diagram showing spectrum curve of the first light in the embodiment of FIG. 4A.
Figure 4C:
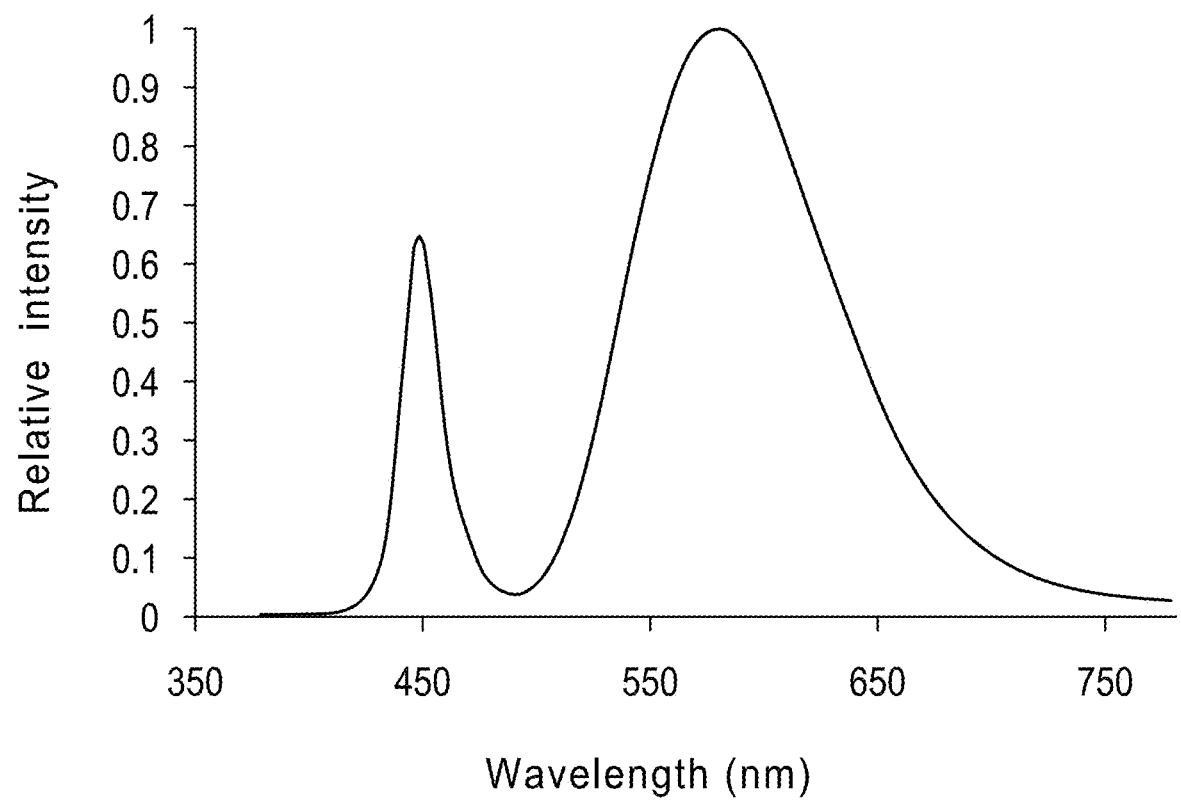
FIG. 4C is a diagram showing spectrum curve of the second light in the embodiment of FIG. 4A.

FIG. 4B is a diagram showing spectrum curve of the first light in the embodiment of FIG. 4A and FIG. 4C is a diagram showing spectrum curve of the second light in the embodiment of FIG. 4A. In the embodiment, the embodiment in FIG. 4B takes the color temperature of 6500K as an example, while the embodiment in FIG. 4C takes the color temperature of 3000K as an example. By the calculations on the spectrum curves in FIGS. 4B and 4C through the related formulas, the CS/P value of the first light L13 provided by the light-emitting module 310 of the light source apparatus 300 is roughly 0.94 and the CS/P value of the second light L23 is roughly 0.27. The CS/P value of the first light L13 herein is roughly 3.48 times of the CS/P value of the second light L23, i.e., the CS/P value of the first light L13 is greater than the CS/P value of the second light L23 by more than 5% of the CS/P value of the second light L23.

Figure 4D:
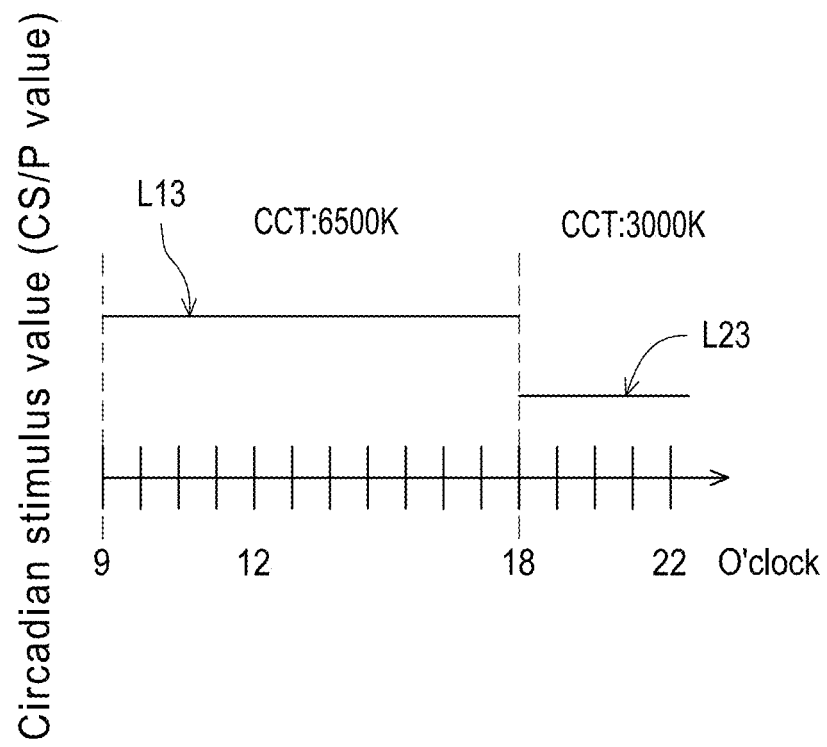
FIG. 4D is a timing diagram showing different illumination modes in different periods for the light source apparatus in the embodiment of FIG. 4A.

FIG. 4D is a timing diagram showing different illumination modes in different periods for the light source apparatus in the embodiment of FIG. 4A. The light source apparatus 300 of FIG. 4D can be used in resident lighting, as shown by FIG. 4D, the light-emitting module 310 of the light source apparatus 300 can provide a light source with a high CS/P value and high color temperature (6500K) in the daytime period (for example, 9:00-18:00) so as to make a person feel fresh and boost the vitality and a light source with a low CS/P value and low color temperature (3000K) in the evening period (for example, 18:00-22:00) so as to bring a person feeling of warmth and comfort. The above-mentioned CS/P values and the spectrum curves in FIGS. 4B and 4C herein are examples used in the embodiment only, and they may be different in other embodiments according to the real requirement, which the disclosure is not limited to. In other embodiments, the light-emitting module may provide lights respectively having different correlated color temperatures but having substantially the same CS/P value in different modes, or provide lights respectively having different or substantially the same optical parameters, which will be shown in the following embodiments of FIGS. 15 to 22B.

Figure 5A:
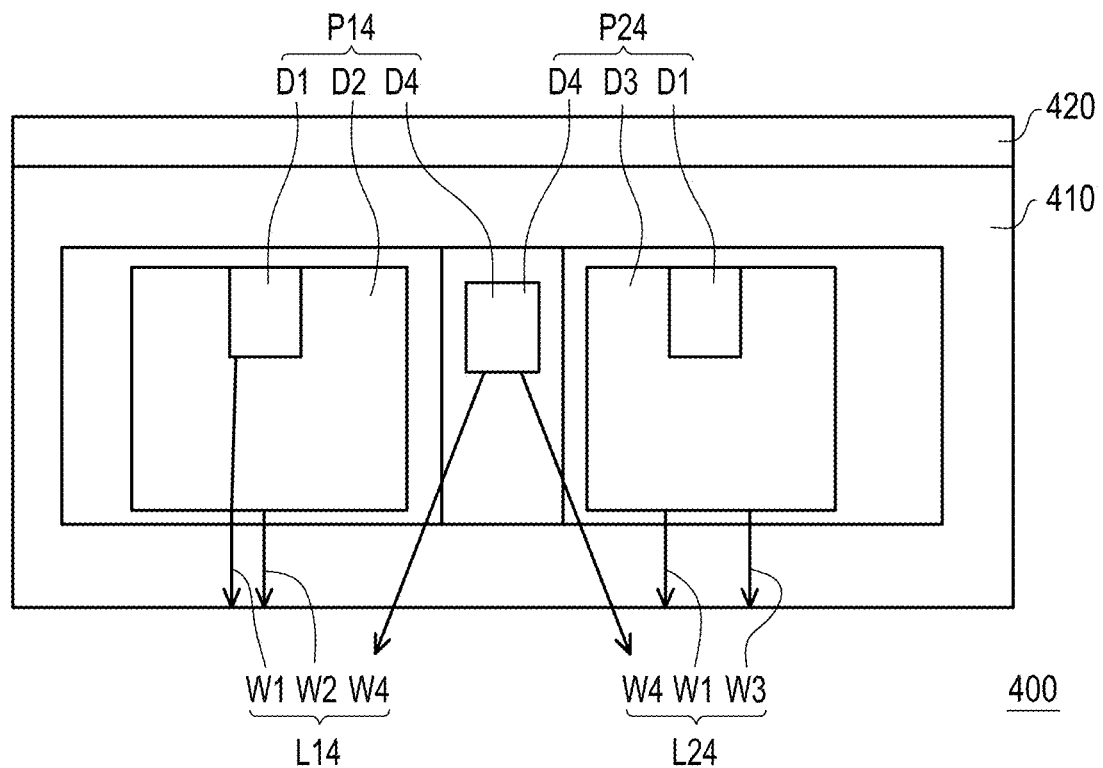
FIG. 5A is a schematic diagram of a light source apparatus in yet another embodiment of the disclosure.

FIG. 5A is a schematic diagram of a light source apparatus in yet another embodiment of the disclosure. The light source apparatus in FIG. 5A is similar to the embodiment in FIG. 2A, except that in the embodiment, a light-emitting module 410 further includes at least one fourth light-emitting unit D4, in which the first light-emitting unit D1 provides a first sub-light beam W1, the second light-emitting unit D2 provides a second sub-light beam W2, the third light-emitting unit D3 provides a third sub-light beam W3 and the fourth light-emitting unit D4 provides a fourth sub-light beam W4. As shown by FIG. 5A, the first portion P14 can include the first light-emitting unit D1, the second light-emitting unit D2 and the fourth light-emitting unit D4; the second portion P24 can include the first light-emitting unit D1, the third light-emitting unit D3 and the fourth light-emitting unit D4. When the control unit 420 makes the light-emitting module 410 switched to the first circadian stimulus mode, the first light-emitting unit D1 emits the first sub-light beam W1, the second light-emitting unit D2 emits the second sub-light beam W2 and the fourth light-emitting unit D4 emits the fourth sub-light beam W4; when the control unit 420 makes the light-emitting module 410 switched to the second circadian stimulus mode, the first light-emitting unit D1 emits the first sub-light beam W1, the third light-emitting unit D3 emits the third sub-light beam W3 and the fourth light-emitting unit D4 emits the fourth sub-light beam W4. The CS/P value of the first sub-light beam W1 herein is greater than the CS/P value of the second sub-light beam W2, and the CS/P value of the second sub-light beam W2 is greater than the CS/P value of the third sub-light beam W3. In short, under the first circadian stimulus mode, the first light L14 provided by the light-emitting module 410 of the light source apparatus 400 can include the first sub-light beam W1, the second sub-light beam W2 and the fourth sub-light beam W4; under the second circadian stimulus mode, the second light L24 provided by the light-emitting module 410 of the light source apparatus 400 can include the first sub-light beam W1, the third sub-light beam W3 and the fourth sub-light beam W4 so as to achieve the similar effect to the light source apparatus 100 in the embodiment of FIG. 2A.

In other words, the light-emitting module 410 of the light source apparatus 400 can include the first light-emitting unit D1, the second light-emitting unit D2, the third light-emitting unit D3 and the fourth light-emitting unit D4, in which at least the first light-emitting unit D1, the second light-emitting unit D2 and the fourth light-emitting unit D4 can form the first light source (i.e., the first portion P14) to emit the first light L14, and the first light-emitting unit D1, the third light-emitting unit D3 and the fourth light-emitting unit D4 can form the second light source (i.e., the second portion P24) to emit the second light L24. The color temperatures of the first light L14 and the second light L24 emitted from the first light source and the second light source are substantially the same, but the first light L14 and the second light L24 have different CS/P values.

In the embodiment, the first light-emitting unit D1 in FIG. 5A can be an LED, the second sub-light beam W2 can be produced by a first phosphor stimulated by the first sub-light beam W1 and the third sub-light beam W3 can be produced by a second phosphor stimulated by the first sub-light beam W1; that is to say, in the embodiment, the second light-emitting unit D2 and the third light-emitting unit D3 are made of electroluminescent light-emitting material (such as phosphor material), which can be stimulated by the first sub-light beam W1 to produce the second sub-light beam W2 and the third sub-light beam W3 with different ranges of wave peaks from each other. In addition, in the embodiment, the fourth light-emitting unit D4 can be, for example, an p LED, but in other embodiments, the fourth light-emitting unit D4 may be made of electroluminescent light-emitting material (such as phosphor material) stimulated by light to produce the fourth sub-light beam W4, which the disclosure is not limited to. In another embodiment, the first light-emitting unit D1, the second light-emitting unit D2, the third light-emitting unit D3 and the fourth light-emitting unit D4 can be an LED or a combination of LED and phosphor with different ranges of wave peaks.

Figure 5B:
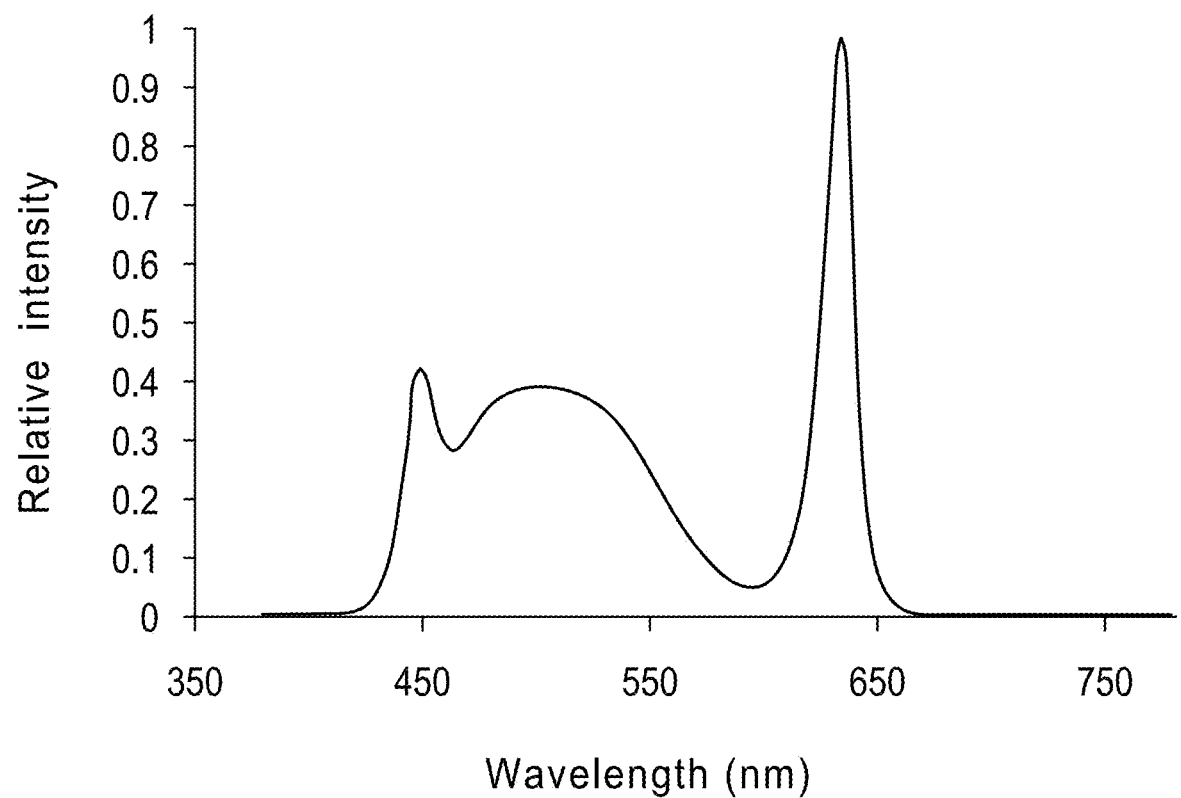
FIG. 5B is a diagram showing spectrum curve of the first light in the embodiment of FIG. 5A.
Figure 5C:
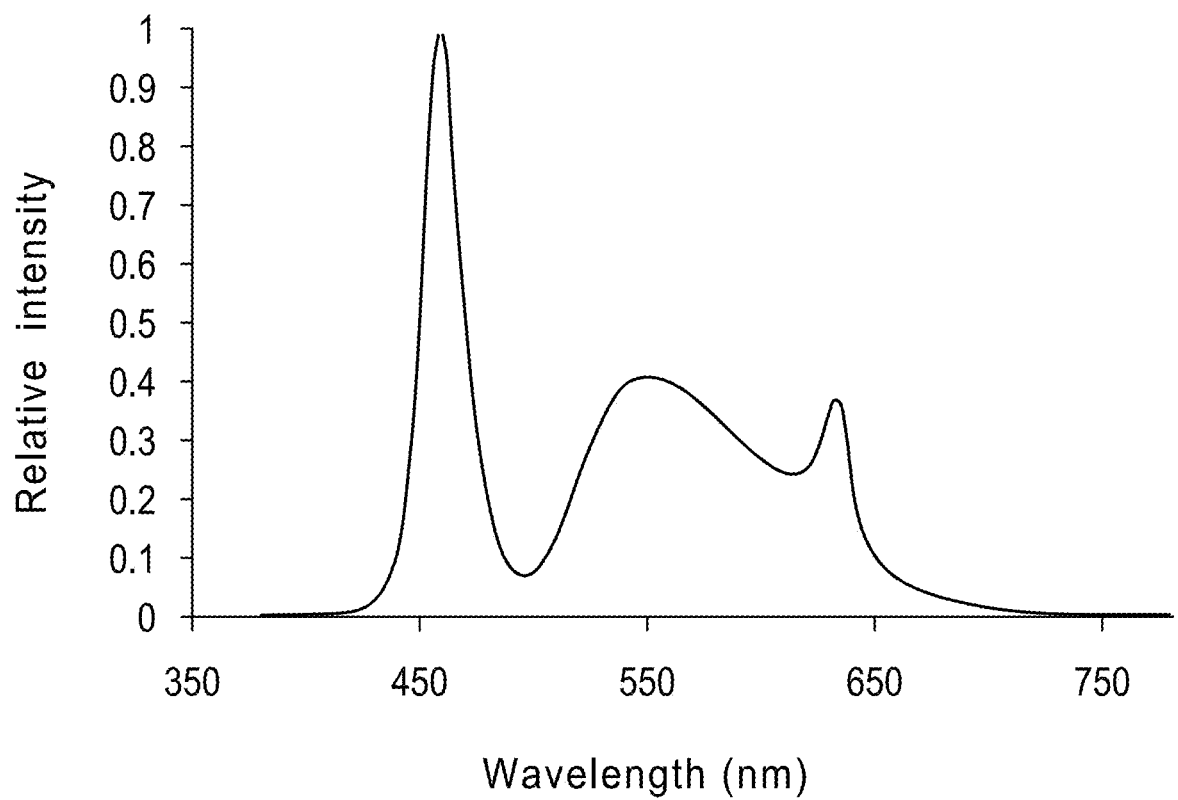
FIG. 5C is a diagram showing spectrum curve of the second light in the embodiment of FIG. 5A.
Figure 5D:
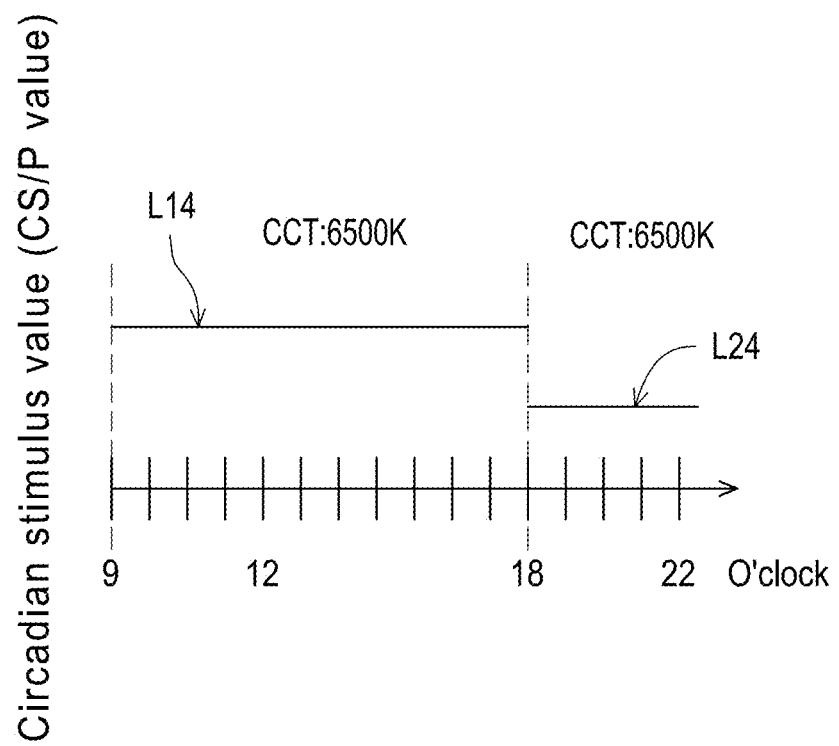
FIG. 5D is a timing diagram showing different illumination modes in different periods for the light source apparatus in the embodiment of FIG. 5A.

FIG. 5B is a diagram showing spectrum curve of the first light in the embodiment of FIG. 5A, FIG. 5C is a diagram showing spectrum curve of the second light in the embodiment of FIG. 5A and FIG. 5D is a timing diagram showing different illumination modes in different periods for the light source apparatus in the embodiment of FIG. 5A. In more details, at least one range of wave peaks of the first sub-light beam W1 is greater than 420 nm but less than 480 nm, at least one range of wave peaks of the second sub-light beam W2 is greater than 480 nm but less than 540 nm, at least one range of wave peaks of the third sub-light beam W3 is greater than 540 nm but less than 590 nm and at least one range of wave peaks of the fourth sub-light beam W4 is greater than 590 nm but less than 680 nm. When the light source apparatus 400 is in the first circadian stimulus mode, the spectrum of the first light L14 provided by the light-emitting module 410 is shown by the light-blending spectrum curve in FIG. 5B; when the light source apparatus 400 is in the second circadian stimulus mode, the light-blending spectrum of the second light L24 provided by the light-emitting module 410 is shown by the spectrum curve in FIG. 5C. In the embodiment, the color temperatures in FIGS. 5B and 5C are, for example, 6500K. According to the spectrum curves in FIGS. 5B and 5C, it can be deduced the CS/P value of the first light L14 provided by the light source apparatus 400 is roughly 0.94 and the CS/P value of the second light L24 is roughly 0.79. Thus, the light source apparatus 400 can be used in working illumination (such as hospital or factory illumination) as shown by FIG. 5D. The light-emitting module 410 of the light source apparatus 400 can provide a light source with high CS/P value and high color temperature in daytime period (for example, 9:00-18:00) so as to make stuff feel fresh and boost the vitality, provide a light source with low CS/P value but high color temperature in evening period (for example, 18:00-22:00) so as to reduce the circadian stimulus on the stuff on evening duty so as to avoid affecting the health of the stuff. It should be noted that the spectrum curves in FIGS. 5B and 5C are used to describe the embodiment only; in other embodiments, it can be different according to the real requirement, which the disclosure is not limited to. The light source apparatus 400 in FIG. 5A can, similarly to the light source apparatus 300 in the embodiment of FIG. 4A, provide the first light L14 and the second light L24 with different color temperatures and different CS/P values with difference over 5% by adjusting the proportions between the first sub-light beam W1, the second sub-light beam W2, the third sub-light beam W3 and the fourth sub-light beam W4, which can refer to the embodiments of FIGS. 2A and 4A and is omitted to describe.

Figure 6A:
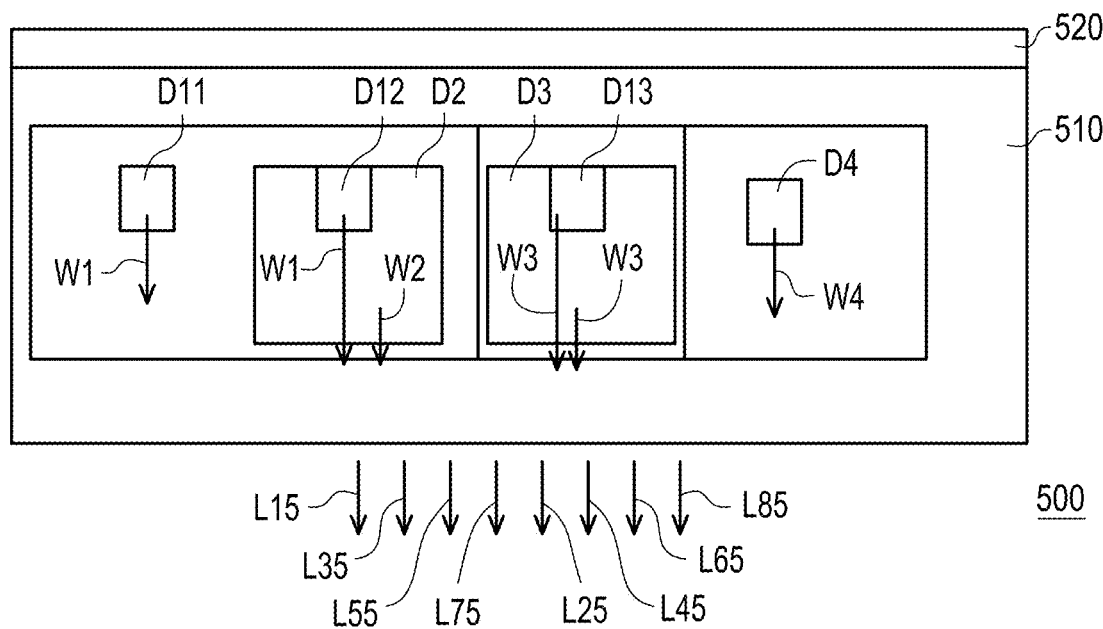
FIG. 6A is a schematic diagram of a light source apparatus in yet another embodiment of the disclosure.
Figure 6B:
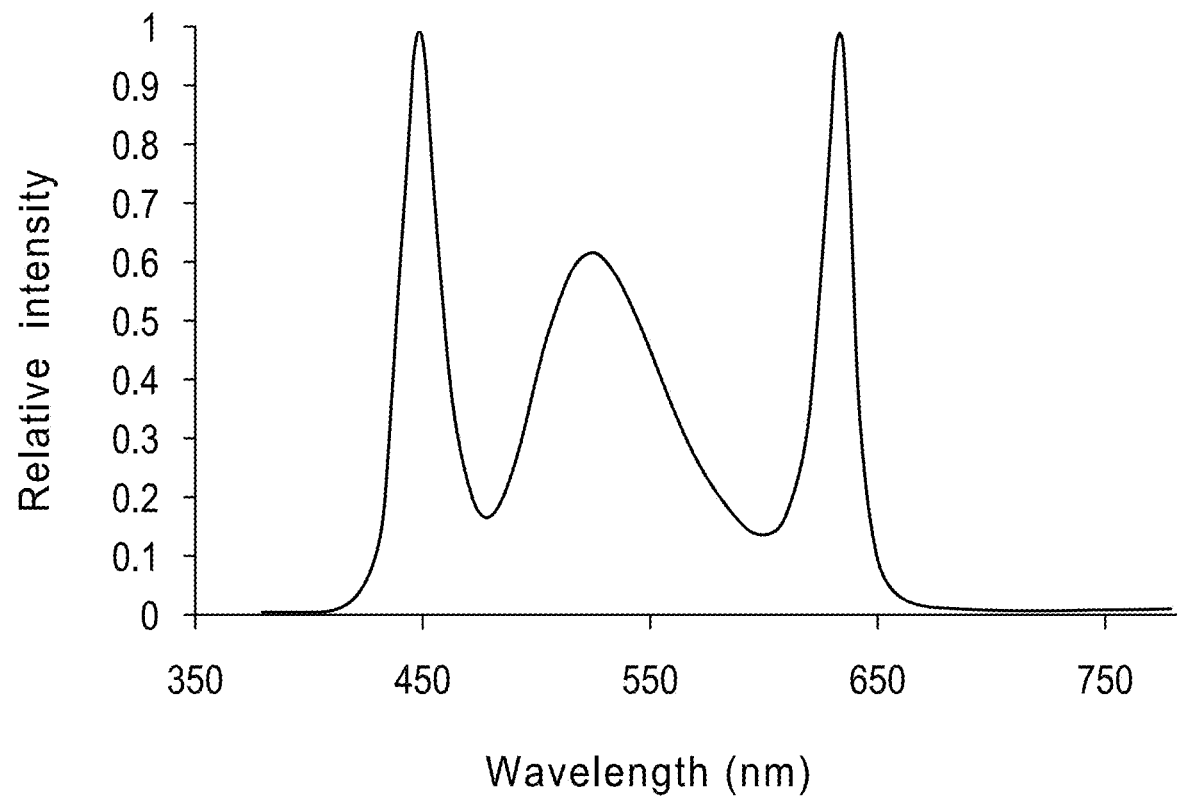
FIGS. 6B-6I are diagrams showing spectrum curves of the lights provided by the light source apparatus 500 under various color temperature conditions.
Figure 6C:
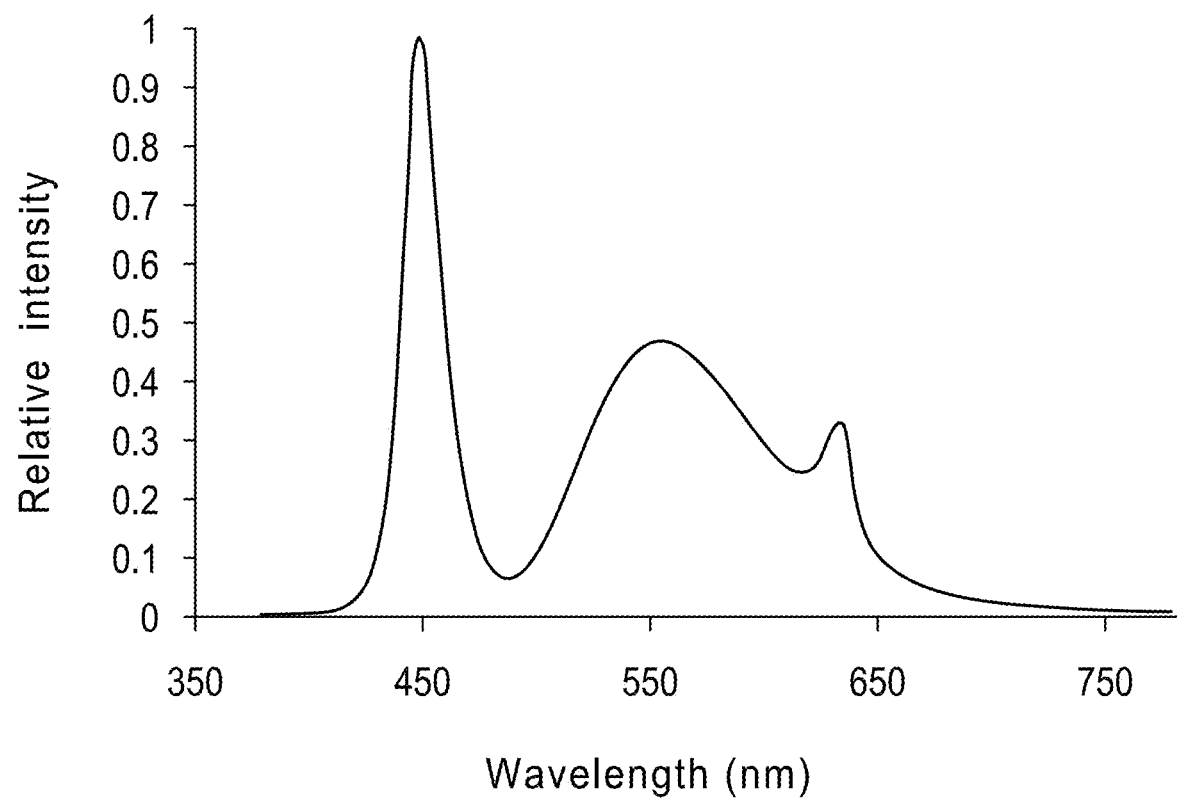
Figure 6D:
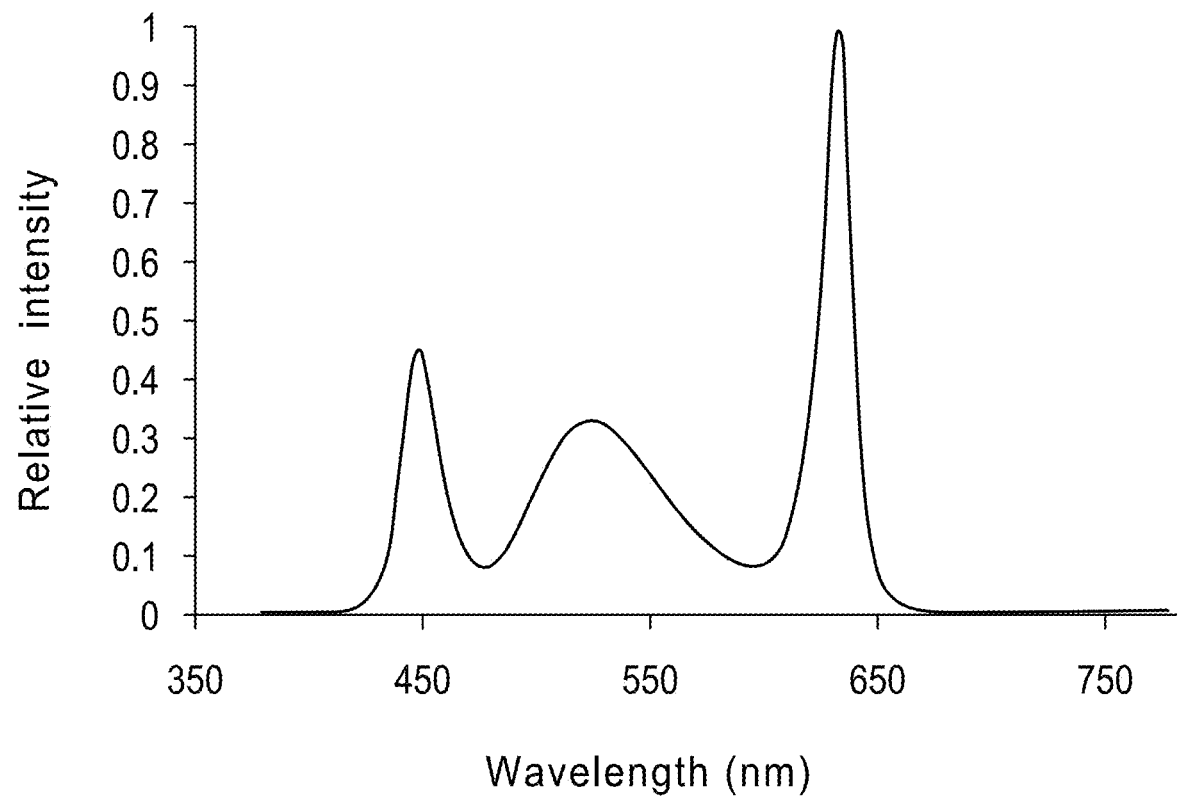
Figure 6E:
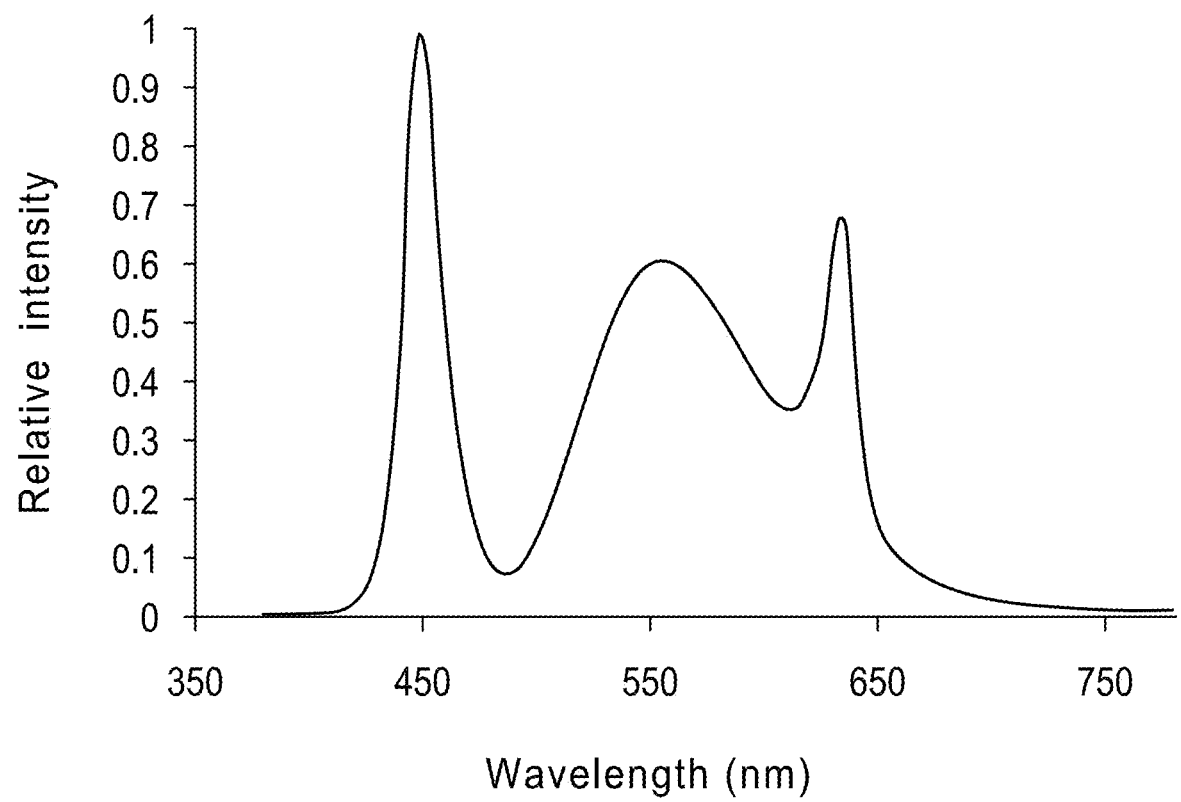
Figure 6F:
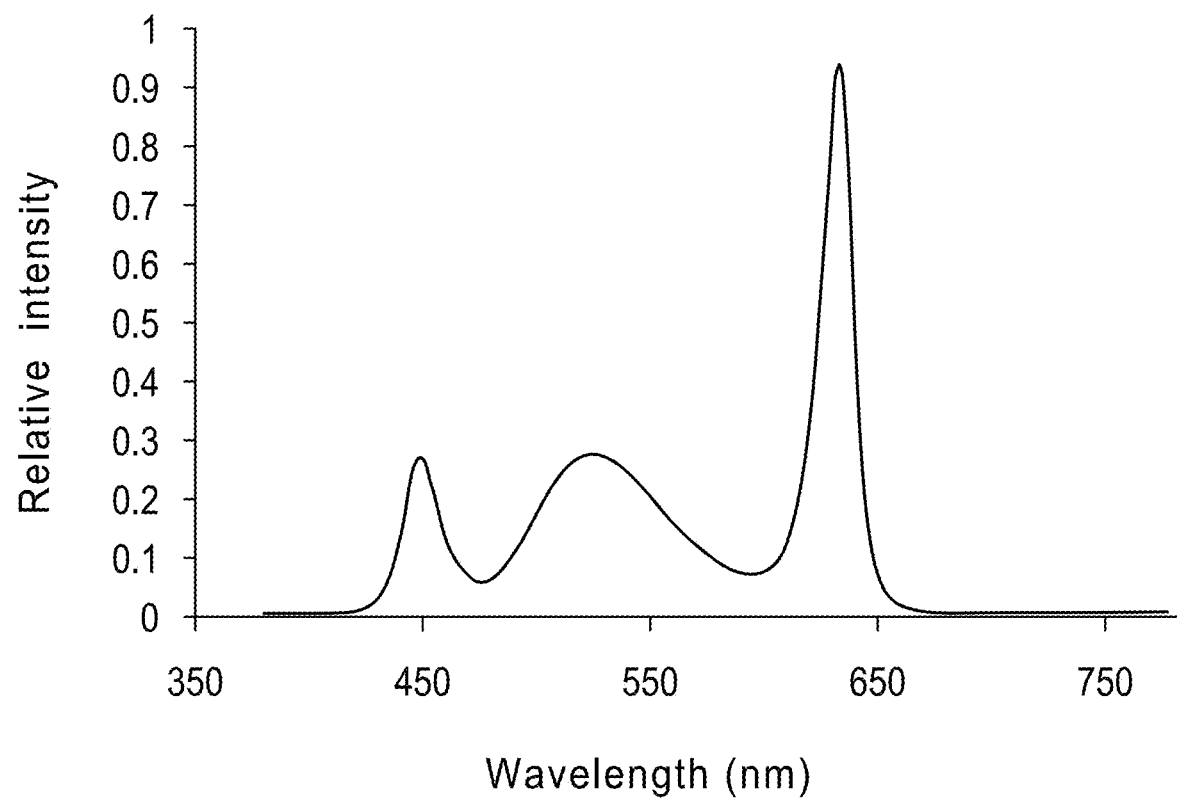
Figure 6G:
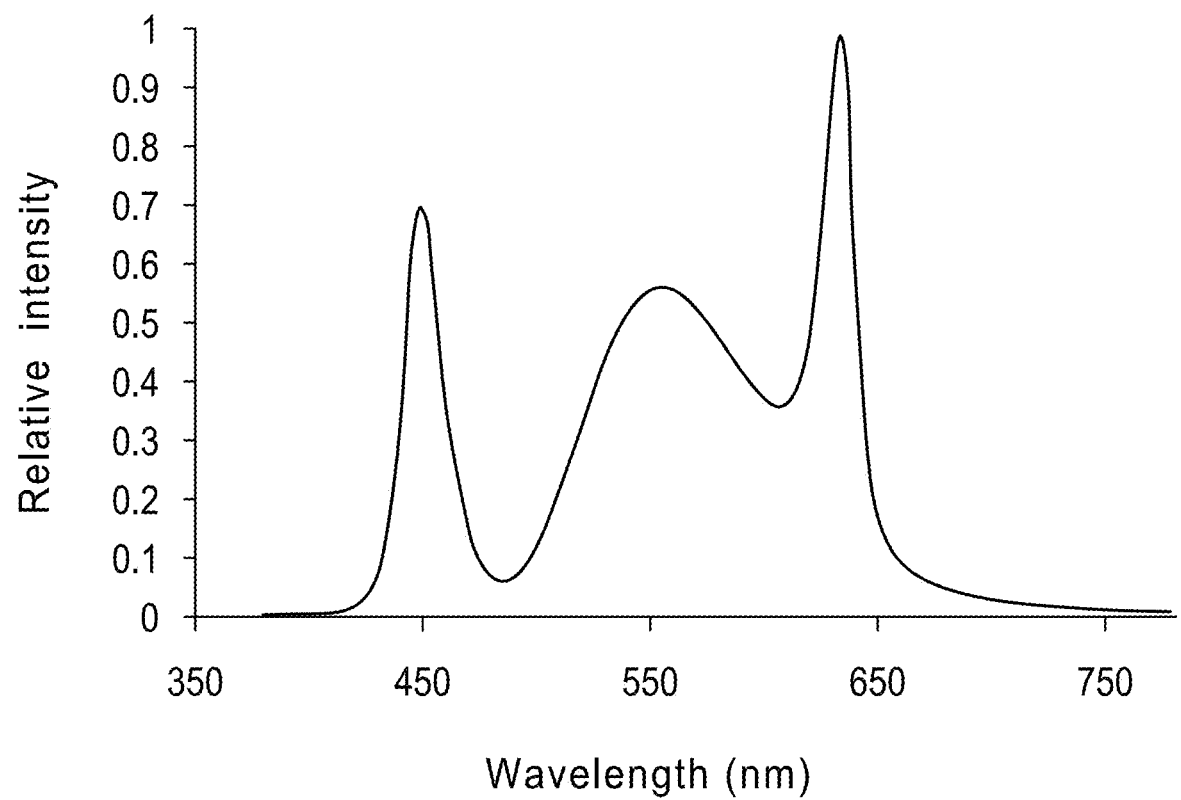
Figure 6H:
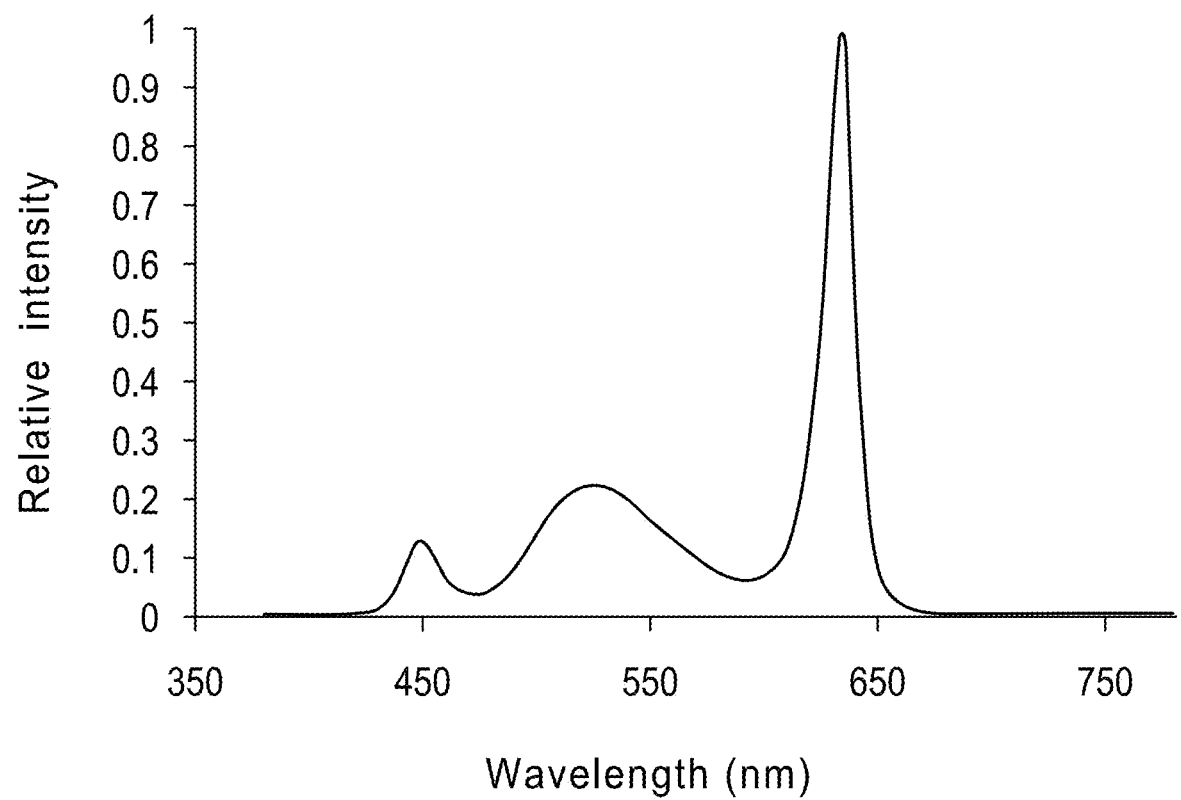
Figure 6I:
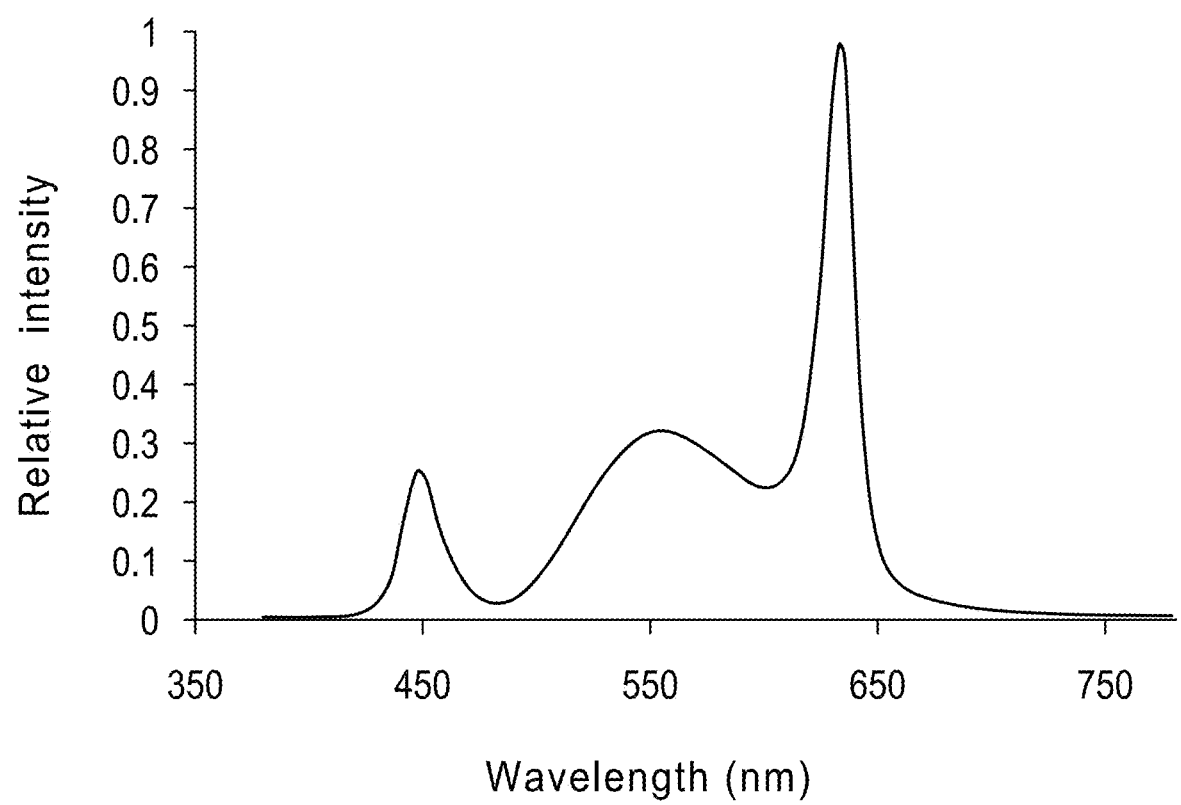

FIG. 6A is a schematic diagram of a light source apparatus in yet another embodiment of the disclosure and FIGS. 6B-6I are diagrams showing spectrum curves of the lights provided by the light source apparatus 500 under various color temperature conditions. The light source apparatus in FIG. 6A is similar to the embodiment in FIG. 5A and there are the first sub-light beam W1, the second sub-light beam W2, the third sub-light beam W3 and the fourth sub-light beam W4 all which have the same range of wave peaks, except that in the embodiment of FIG. 6A, the light-emitting module 510 of the light source apparatus 500 can provide more sets of light sources with different color temperatures and high/low CS/P values under these illumination modes. For example, in the embodiment, when the first light-emitting units D11 and D12 in the light-emitting module 510 of the light source apparatus 500 provide first sub-light beams W1, the second light-emitting unit D2 provides the second sub-light beam W2 and the fourth light-emitting unit D4 provides the fourth sub-light beam W4, the light-emitting module 510 of the light source apparatus 500 can respectively provide lights with higher CS/P values, i.e., a first light L15 (for example, 6500K and 0.82 of CS/P value), a third light L35 (for example, 5000K and 0.67 of CS/P value), a fifth light L55 (for example, 4000K and 0.54 of CS/P value) and a seventh light L75 (for example, 3000K and 0.39 of CS/P value) according to the application requirement by adjusting the proportions between the first sub-light beam W1, the second sub-light beam W2 and the fourth sub-light beam W4; on the other hand, when the first light-emitting units D11 and D13 in the light-emitting module 510 of the light source apparatus 500 provide first sub-light beams W1, the third light-emitting unit D3 provides the third sub-light beam W3 and the fourth light-emitting unit D4 provides the fourth sub-light beam W4, the light-emitting module 510 of the light source apparatus 500 can respectively provide lights with lower CS/P values, i.e., a second light L25 (6500K and 0.72 of CS/P value), a fourth light L45 (5000K and 0.57 of CS/P value), a sixth light L65 (4000K and 0.45 of CS/P value) and an eighth light L85 (3000K and 0.30 of CS/P value) according to the application requirement by adjusting the proportions between the first sub-light beam W1, the third sub-light beam W3 and the fourth sub-light beam W4. Thus, in comparison with the light-emitting modules 110 and 110' of the light source apparatuses 100 and 100' in FIGS. 2A and 2C, the light-emitting module 510 of the light source apparatus 500 of the embodiment can provide more sets of light sources with different color temperatures so as to meet various application requirements and have good application potential.

In more details, in the embodiment, the light source apparatus 500 can include a first circadian stimulus mode, a second circadian stimulus mode, a third circadian stimulus mode, a fourth circadian stimulus mode, a fifth circadian stimulus mode, a sixth circadian stimulus mode, a seventh circadian stimulus mode and an eighth circadian stimulus mode. The control unit 520 makes the lights emitted by the light-emitting module 510 under these circadian stimulus modes respectively switched between the first light L15 (corresponding to the spectrum curve shown by FIG. 6B), the second light L25 (corresponding to the spectrum curve shown by FIG. 6C), the third light L35 (corresponding to the spectrum curve shown by FIG. 6D), the fourth light L45 (corresponding to the spectrum curve shown by FIG. 6E), the fifth light L55 (corresponding to the spectrum curve shown by FIG. 6F), the sixth light L65 (corresponding to the spectrum curve shown by FIG. 6G), the seventh light L75 (corresponding to the spectrum curve shown by FIG. 6H) and the eighth light L85 (corresponding to the spectrum curve shown by FIG. 6I) so as to provide more sets of light sources.

In more details, the CS/P value of the second light L25 is less than the CS/P value of the first light L15 and the color temperatures of the second light L25 and the first light L15 are substantially the same; the CS/P value of the fourth light L45 is less than the CS/P value of the third light L35 and the color temperatures of the fourth light L45 and the third light L35 are substantially the same; the CS/P value of the sixth light L65 is less than the CS/P value of the fifth light L55 and the color temperatures of the sixth light L65 and the fifth light L55 are substantially the same; the CS/P value of the eighth light L85 is less than the CS/P value of the seventh light L75 and the color temperatures of the eighth light L85 and the seventh light L75 are substantially the same. The color temperatures of the first light L15, the third light L35, the fifth light L55 and the seventh light L75 are substantially different, and the color temperatures of the second light L25, the fourth light L45, the sixth light L65 and the eighth light L85 are substantially different. In other words, the light-emitting module 510 of the light source apparatus 500 can provide more sets of light sources with different color temperatures by adjusting the proportions between the first sub-light beam W1, the second sub-light beam W2, the third sub-light beam W3 and the fourth sub-light beam W4. Specifically, the lights with the same color temperature of each of the sets can be switched between a high CS/P value and a low CS/P value.

Moreover, in the embodiment, the light-emitting module 510 of the light source apparatus 500 can include three first light-emitting units D11, D12 and D13, a second light-emitting unit D2, a third light-emitting unit D3 and a fourth light-emitting unit D4, in which the first light-emitting units D11 and D12, the second light-emitting unit D2 and the fourth light-emitting unit D4 form a first light source (i.e., the first portion P1) to emit the first light L15, the third light L35, the fifth light L55 and the seventh light L75 respectively under each of the circadian stimulus modes. On the other hand, the first light-emitting units D11 and D13, the third light-emitting unit D3 and the fourth light-emitting unit D4 form a second light source (i.e., the second portion P2) to emit the second light L25, the fourth light L45, the sixth light L65 and the eighth light L85 under each of the circadian stimulus modes.

In this way, by changing the light-blending proportions between the first sub-light beam W1, the second sub-light beam W2, the third sub-light beam W3 and the fourth sub-light beam W4, the light source apparatus 500 can, under the color temperature condition of 6500K, make the light switched between the first light L15 with high CS/P value and the second light L25 with low CS/P value; the light source apparatus 500 can, under the color temperature condition of 5000K, make the light switched between the third light L35 with high CS/P value and the fourth light L45 with low CS/P value; the light source apparatus 500 can, under the color temperature condition of 4000K, make the light switched between the fifth light L55 with high CS/P value and the sixth light L65 with low CS/P value; the light source apparatus 500 can, under the color temperature condition of 3000K, make the light switched between the seventh light L75 with high CS/P value and the eighth light L85 with low CS/P value. As a result, the light source apparatus 500 has larger application potential.

The first light L15 and the second light L25 have the same color temperature but different CS/P values, the third light L35 and the fourth light L45 have the same color temperature but different CS/P values, the fifth light L55 and the sixth light L65 have the same color temperature but different CS/P values, and the seventh light L75 and the eighth light L85 have the same color temperature but different CS/P values. In other embodiments however, the first light L15 and the second light L25 can have different color temperatures, and the CS/P value of the first light L15 is greater than the CS/P value of the second light L25 by over 5% of the CS/P value of the second light L25; the third light L35 and the fourth light L45 have different color temperatures, and the CS/P value of the third light L35 is greater than the CS/P value of the fourth light L45 by over 5% of the CS/P value of the fourth light L45; the fifth light L55 and the sixth light L65 have different color temperatures, and the CS/P value of the fifth light L55 is greater than the CS/P value of the sixth light L65 by over 5% of the CS/P value of the sixth light L65; the seventh light L75 and the eighth light L85 have different color temperatures, and the CS/P value of the seventh light L75 is greater than the CS/P value of the eighth light L85 by over 5% of the CS/P value of the eighth light L85. In this way, it has the effect same as the light source apparatus 500 in FIG. 6A.

Figure 6J:
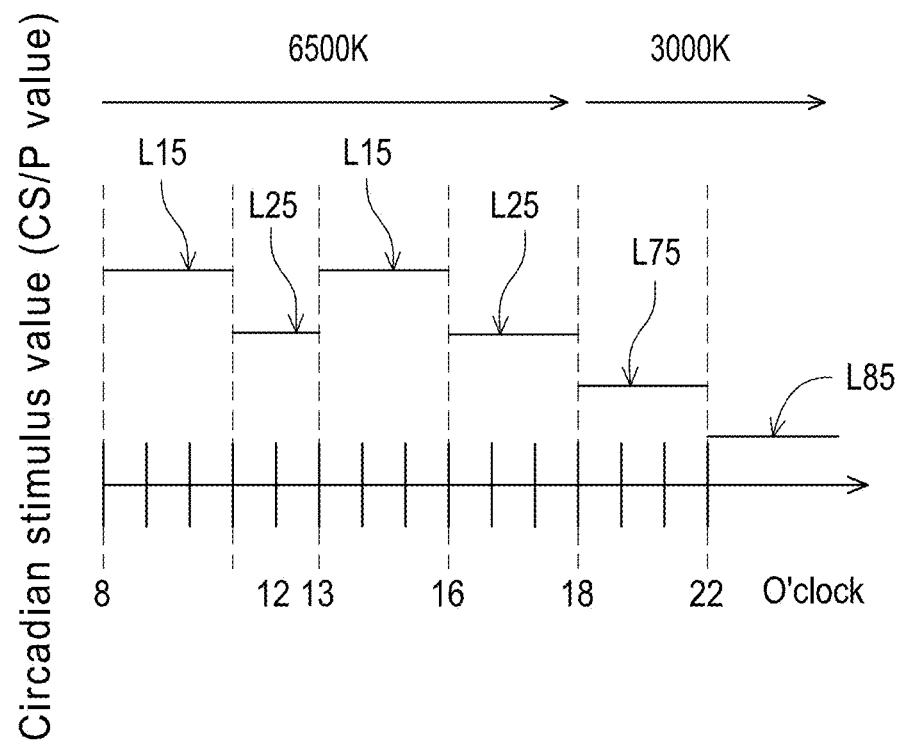
FIG. 6J is a timing diagram showing different illumination modes in different periods for the light source apparatus in the embodiment of FIG. 6A.

FIG. 6J is a timing diagram showing different illumination modes in different periods for the light source apparatus in the embodiment of FIG. 6A. Referring to FIG. 6J, the light source apparatus 500, for example, is used in office illumination, in which the light source apparatus 500 in the daytime period (8:00-11:00 as shown by FIG. 6J) can be switched to the first circadian stimulus mode to make the light-emitting module 510 provide the first light L15 with high color temperature (6500K) and high CS/P value; in the lunch break period (11:00-13:00), the light source apparatus 500 is switched to the second circadian stimulus mode to make the light-emitting module 510 provide the second light L25 with high color temperature and low CS/P value so as to reduce the circadian stimulus on the stuff during rest; in the afternoon period after the lunch break (13:00-16:00), the light source apparatus 500 is switched back to the first circadian stimulus mode to advance the working efficiency; in the evening period after off work (after 18:00 as shown by FIG. 6J), the light source apparatus 500 is switched to the seventh circadian stimulus mode to make the light-emitting module 510 provide the seventh light L75 with low color temperature (3000K); in the sleeping night period (after 22:00 as shown by FIG. 6J), the light source apparatus 500 is switched to the eighth circadian stimulus mode to make the light-emitting module 510 provide the eight light L85 with low color temperature (3000K) and the lowest CS/P value. In addition, the light source apparatus 500 can provide more combinations of light sources for more wide applications.

Figure 7:
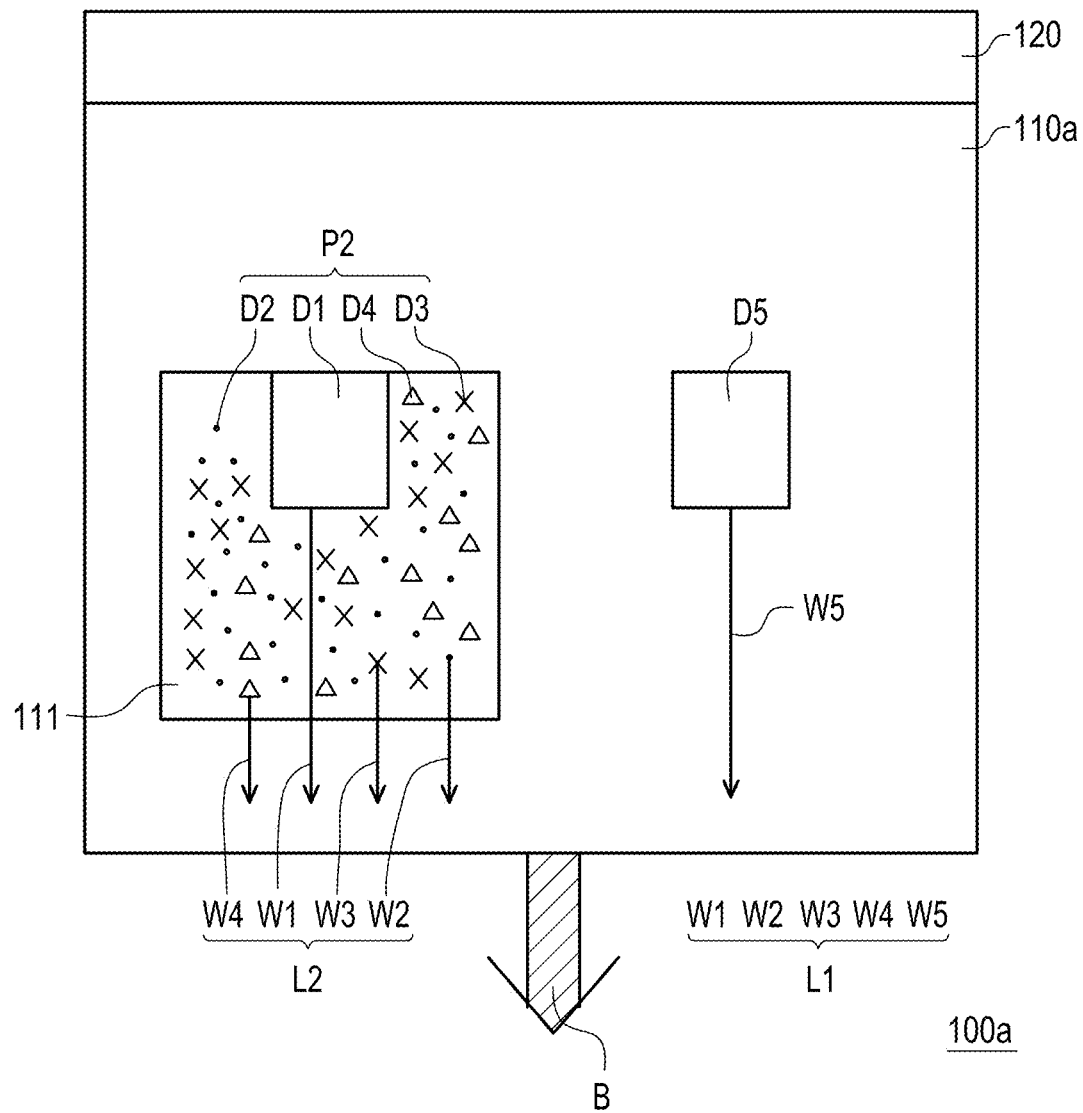
FIG. 7 is a schematic diagram of a light source apparatus in another embodiment of the disclosure.
Figure 8A:
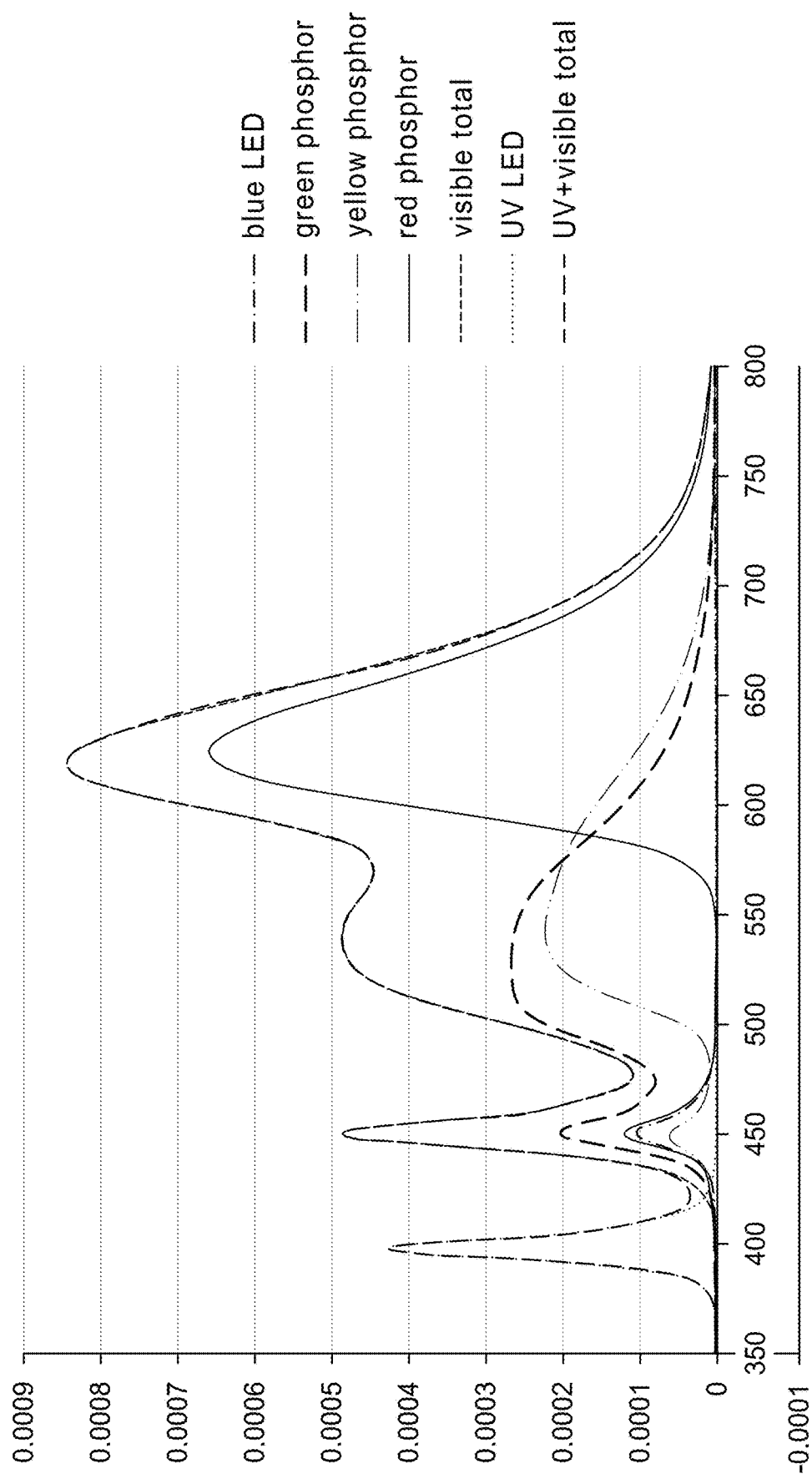
FIG. 8A is spectra of the first light and the lights respectively emitted from the light-emitting units in the first illumination mode in FIG. 7.
Figure 9:
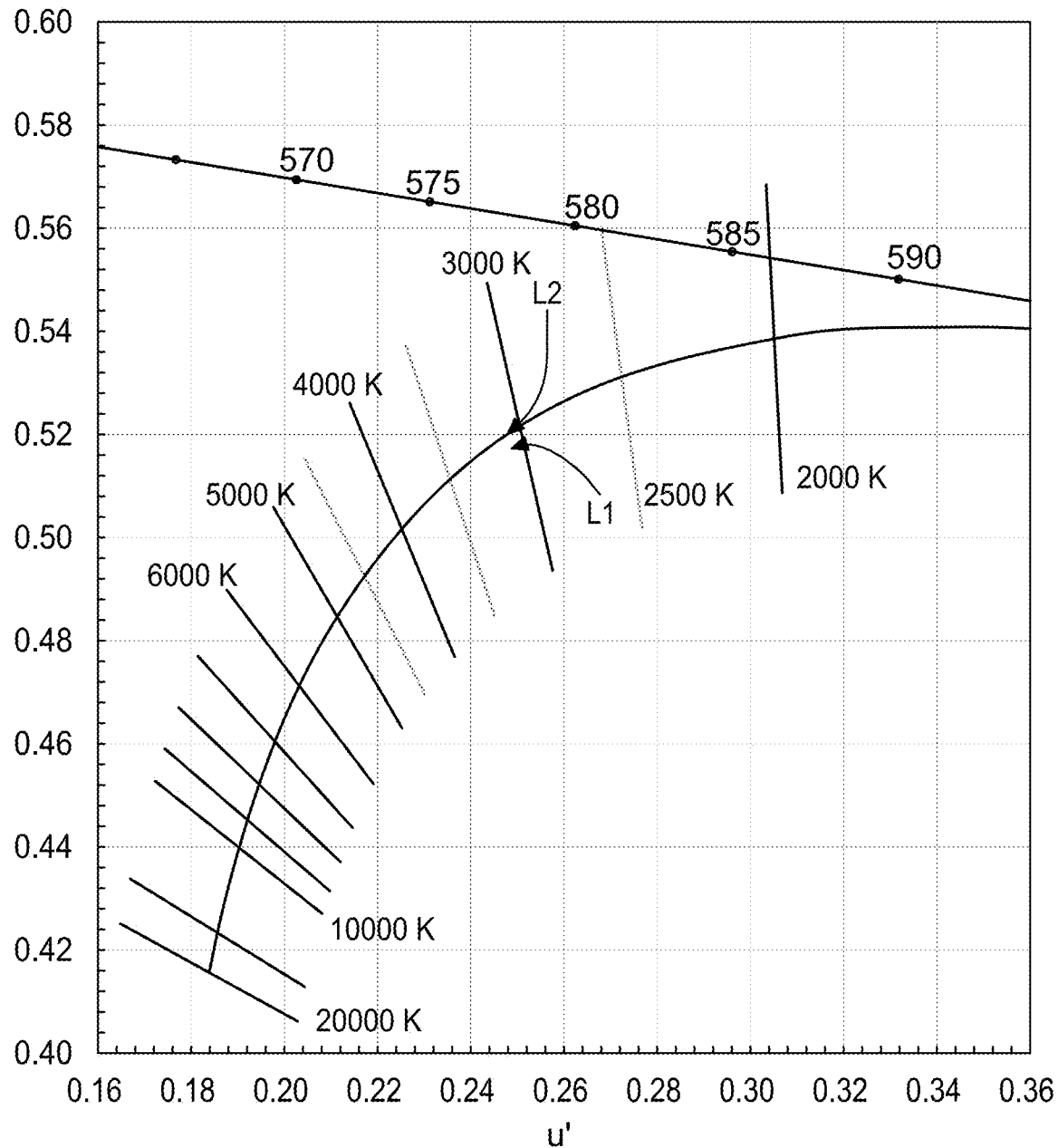
FIG. 9 is the color coordinates of the first light and the second light in FIG. 7 in the CIE 1976 u'-v' diagram.

FIG. 7 is a schematic diagram of a light source apparatus in another embodiment of the disclosure, FIG. 8A is spectra of the first light and the lights respectively emitted from the light-emitting units in the first illumination mode in FIG. 7, FIG. 8B is spectra of the second light and the lights respectively emitted from the light-emitting units in the second illumination mode in FIG. 7, and FIG. 9 is the color coordinates of the first light and the second light in FIG. 7 in the CIE 1976 u'-v' diagram. In FIGS. 8A and 8B, the horizontal axis represents wavelengths with the unit of nanometer (nm), and the vertical axis represents spectrum intensity having an arbitrary unit. Referring to FIGS. 7, 8A, 8B, and 9, the light source apparatus 100a in this embodiment is similar to the light source apparatus 100 in FIG. 2A, and the main difference therebetween is that in the light source apparatus 100a, a spectrum of the first light L1 is different from a spectrum of the second light L2, and color temperatures of the first light L1 and the second light L2 are substantially the same as each other, but the circadian stimulus values of the first light L1 and the second light L2 are not considered.

In this embodiment, the light source apparatus 100a includes a light-emitting module 110a and a control unit 120. The light-emitting module is configured to provide a light B. The control unit 120 makes the light B emitted from the light-emitting module 110a switched between a first light L1 and a second light L2. A spectrum of the first light L1 (see FIG. 8A) is different from a spectrum of the second light L2 (see FIG. 8B), and color temperatures (see FIG. 9) of the first light L1 and the second light L2 are substantially the same as each other. Referring to FIG. 9, the color coordinate of the first light L1 and the color coordinate of the second light L2 is substantially located on the same line representing the correlated color temperature (CCT) of 3000 K.

In this embodiment, the control unit 120 makes the light-emitting module 110a switched between a plurality of illumination modes. The illumination modes include a first illumination mode and a second illumination mode. The light-emitting module 110a includes a plurality of light-emitting units, e.g. a first light-emitting unit D1, a second light-emitting unit D2, a third light-emitting unit D3, a fourth light-emitting unit D4, and a fifth light-emitting unit D5. When the control unit 120 switches the light-emitting module 110a to the first illumination mode, the control unit 120 makes a first portion or all of the light-emitting units emit the first light L1. In this embodiment, when the control unit 120 switches the light-emitting module 110a to the first illumination mode, the control unit 120 makes all of the light-emitting units, including the first to fifth light-emitting units D1-D5, emit the first light L1. When the control unit 120 switches the light-emitting module 110a to the second illumination mode, the control unit 120 makes a second portion P2 of the light-emitting units (e.g., including the first to fourth light-emitting units D1-D4) emit the second light L2. The first portion and the second portion are partially the same as each other or totally different from each other.

The light-emitting units, e.g. the first to fifth light-emitting units, include electroluminescent light-emitting element, light-induced light-emitting element or a combination thereof.

In this embodiment, the light-emitting module 110a includes at least one first light-emitting unit D1, at least one second light-emitting unit D2, at least one third light-emitting unit D3, at least one fourth light-emitting unit D4, and at least one fifth light-emitting unit D5. The first light-emitting unit D1 provides a first sub-light beam W1, the second light-emitting unit D2 provides a second sub-light beam W2, the third light-emitting unit D3 provides a third sub-light beam W3, the fourth light-emitting unit D4 provides a fourth sub-light beam W4, and the fifth light-emitting unit D5 provides a fifth sub-light beam W5. The second portion P2 at least includes the first light-emitting unit D1, the second light-emitting unit D2, the third light-emitting unit D3, and the fourth light-emitting unit D4.

When the control unit 120 switches the light-emitting module 110a to the first illumination mode, the first light-emitting unit D1 emits the first sub-light beam W1, the second light-emitting unit D2 emits the second sub-light beam W2, the third light-emitting unit D3 emits the third sub-light beam W3, the fourth light-emitting unit D4 emits the fourth sub-light beam W4, and the fifth light-emitting unit D5 emits the fifth sub-light beam W5. When the control unit 120 switches the light-emitting module 110a to the second illumination mode, the first light-emitting unit D1 emits the first sub-light beam W1, the second light-emitting unit D2 emits the second sub-light beam W2, the third light-emitting unit D3 emits the third sub-light beam W3, and the fourth light-emitting unit D4 emits the fourth sub-light beam W4. Moreover, the fifth sub-light beam W5 is an invisible light beam.

In this embodiment, one of the first light L1 and the second light L2 may contain an invisible light. For example, the first sub-light beam W1, the second sub-light beam W2, the third sub-light beam W3, and the fourth sub-light beam W4 may be visible light beams, and the fifth sub-light beam W5 is an invisible light beam. Specifically, in this embodiment, the first sub-light beam W1 is a blue light beam, the second sub-light beam W2 is a green light beam, the third sub-light beam W3 is a yellow light beam, the fourth sub-light beam W4 is a red light beam, and the fifth sub-light beam W5 is an ultraviolet light beam. Moreover, in this embodiment, the first light-emitting unit D1 is a first light-emitting diode (LED), the second light-emitting unit D2 is a first phosphor, the third light-emitting unit D3 is a second phosphor, the fourth light-emitting unit D4 is a third phosphor, and the fifth light-emitting unit D5 is a second LED. The second sub-light beam W2 is produced by the first phosphor stimulated by the first sub-light beam W1, the third sub-light beam W3 is produced by the second phosphor stimulated by the first sub-light beam W1, and the fourth sub-light beam W4 is produced by the third phosphor stimulated by the first sub-light beam W1. In this embodiment, the first, second, and third phosphors may be doped in an encapsulant wrapping the first light-emitting unit D1, i.e. the first LED.

In this embodiment, the first light L1 contains the UV light beam, but the second light L2 does not contain the UV light beam. Therefore, when the light-emitting module 110a is switched to the first illumination mode, the light-emitting module 110a emits the first light L1 containing a white light and the UV light, so that the first light L1 is adapted to illuminate products containing the fluorescent whitening agent, for example, textile products. When the light-emitting module 110a is switched to the second illumination mode, the light-emitting module 110a emits the second light L2 containing a white light but not the UV light, so that the second light L2 is adapted to illuminate leather shoes, leather products, works of art, etc. which are easy to be damaged by the UV light. Moreover, in the light source apparatus 100a according to this embodiment, since the color temperatures of the first light L1 and the second light L2 are substantially the same as each other, when a plurality of light source apparatuses 100a or light-emitting modules 110a are disposed in the same exhibition space and respectively emit the first light L1 and the second light L2, the light color of the light source apparatuses 100a or light-emitting modules 110a is uniform, and the first light L1 and the second light L1 may respectively achieve different functions.

In another embodiment, the first sub-light beam W1 is a blue light beam, the second sub-light beam W2 may be a cyan light beam, the third sub-light beam W3 may be a lime color light beam, the fourth sub-light beam W4 is a red light beam, and the fifth sub-light beam W5 is an ultraviolet light beam, so that the spectrum of the second light L2 including the first sub-light beam W1, the second sub-light beam W2, the third sub-light beam W3, and the fourth sub-light beam W4 is more similar to a continuous spectrum of natural white light.

In yet another embodiment, the fifth sub-light beam W5 may be an infrared light beam, and the infrared light beam may be used in a positioning system. As a result, the first light L1 can be used for both illumination and positioning.

Figure 10:
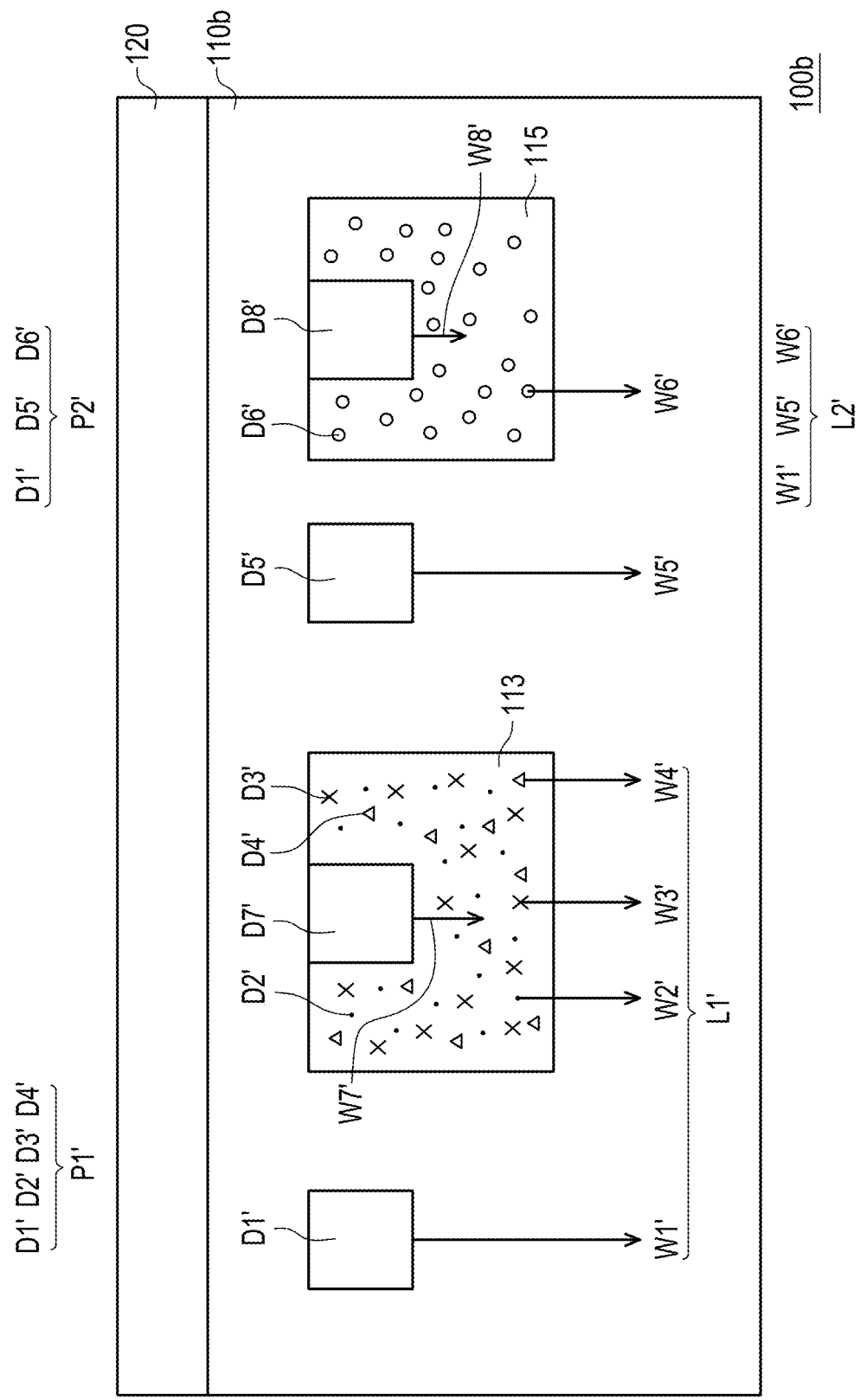
FIG. 10 is a schematic diagram of a light source apparatus in another embodiment of the disclosure.
Figure 11A:
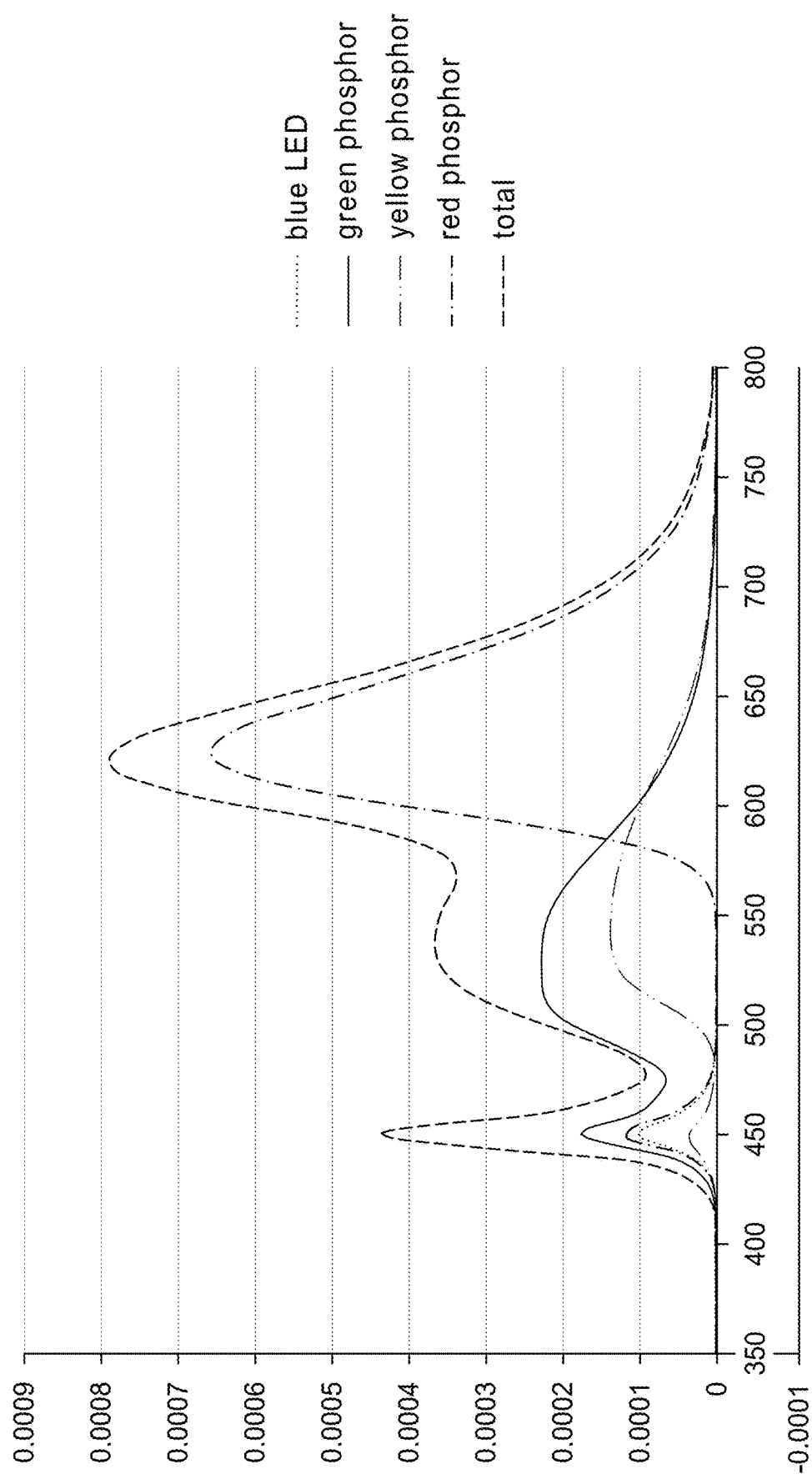
FIG. 11A is spectra of the first light and the lights respectively emitted from the light-emitting units in the first illumination mode in FIG. 10.
Figure 11B:
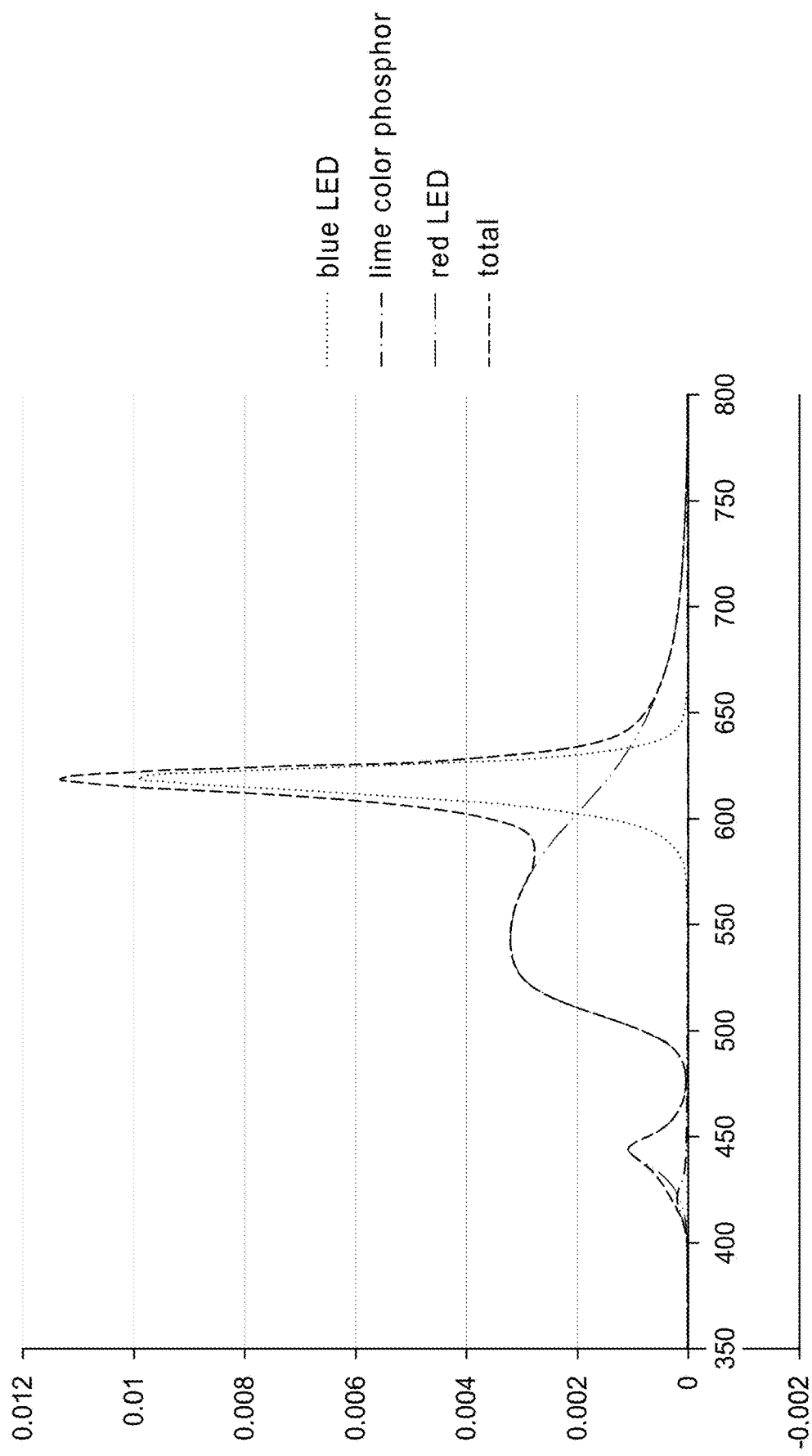
FIG. 11B is spectra of the second light and the lights respectively emitted from the light-emitting units in the second illumination mode in FIG. 10.
Figure 12:
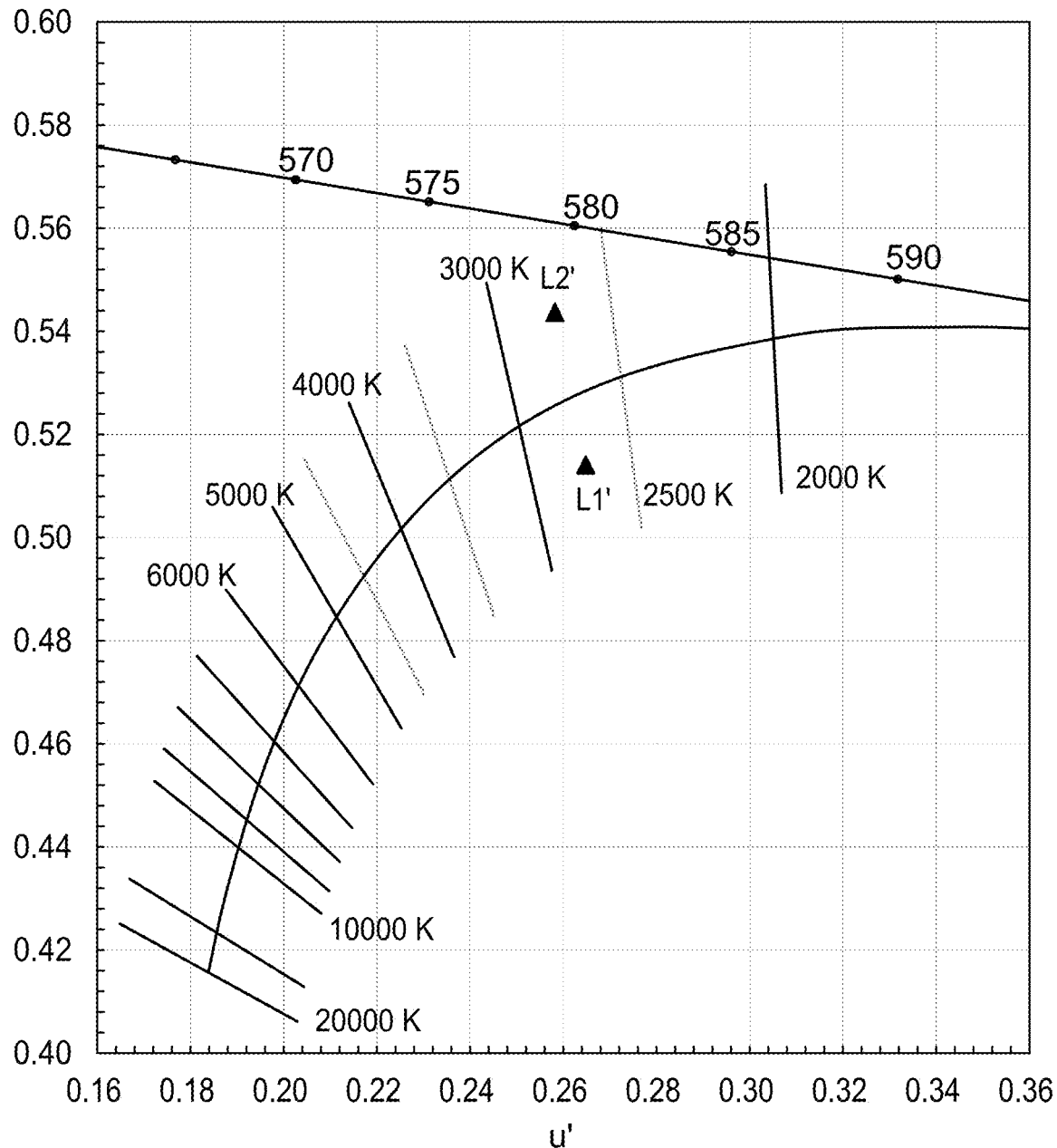
FIG. 12 is the color coordinates of the first light and the second light in FIG. 10 in the CIE 1976 u'-v' diagram.

FIG. 10 is a schematic diagram of a light source apparatus in another embodiment of the disclosure, FIG. 11A is spectra of the first light and the lights respectively emitted from the light-emitting units in the first illumination mode in FIG. 10, FIG. 11B is spectra of the second light and the lights respectively emitted from the light-emitting units in the second illumination mode in FIG. 10, and FIG. 12 is the color coordinates of the first light and the second light in FIG. 10 in the CIE 1976 u'-v' diagram. In FIGS. 11A and 11B, the horizontal axis represents wavelengths with the unit of nanometer (nm), and the vertical axis represents spectrum intensity having an arbitrary unit. Referring to FIGS. 10, 11A, 11B, and 12, the light source apparatus 100b in this embodiment is similar to the light source apparatus 100a in FIG. 7, and the main difference therebetween is as follows.

In this embodiment, the general color rendering index (CRI) of the first light L1' is greater than that of the second light L2'. The general CRI is defined as the average of CRI R1 to CRI R8, and is denoted as "Ra". Moreover, in this embodiment, the light emitting efficiency of the second light L2' is greater than that of the first light L1'.

In this embodiment, the light-emitting module 110b includes at least one first light-emitting unit D1', at least one second light-emitting unit D2', at least one third light-emitting unit D3', at least one fourth light-emitting unit D4', at least one fifth light-emitting unit D5', and at least one sixth light-emitting unit D6'. The first light-emitting unit D1' provides a first sub-light beam W1', the second light-emitting unit D2' provides a second sub-light beam W2', the third light-emitting unit D3' provides a third sub-light beam W3', the fourth light-emitting unit D4' provides a fourth sub-light beam W4', the fifth light-emitting unit D5' provides a fifth sub-light beam W5', and the sixth light-emitting unit D6' provides a sixth sub-light beam W6'.

When the control unit 120 switches the light-emitting module 110b to a first illumination mode, the control unit 120 makes a first portion P1' of the light-emitting units (e.g. the first, second, third, and fourth light-emitting units D1', D2', D3', and D4') emit the first light L1'. When the control unit 120 switches the light-emitting module 110b to a second illumination mode, the control unit 120 makes a second portion P2' of the light-emitting units (e.g. the first, fifth, and sixth light-emitting units D1', D5', and D6') emit the second light L2'. The first portion P1' and the second portion P2' are partially the same as each other or totally different from each other. In this embodiment, the first portion P1' and the second portion P2' are partially the same as each other since both the first portion P1' and the second portion P2' contain the first light-emitting unit D1'.

The first portion P1' at least includes the first light-emitting unit D1', the second light-emitting unit D2', the third light-emitting unit D3', and the fourth light-emitting unit D4'. The second portion P2' at least includes the first light-emitting unit D1', the fifth light-emitting unit D5', and the sixth light-emitting unit D6'. When the control unit 120 switches the light-emitting module 110b to the first illumination mode, the first light-emitting unit D1' emits the first sub-light beam W1', the second light-emitting unit D2' emits the second sub-light beam W2', the third light-emitting unit D3' emits the third sub-light beam W3', and the fourth light-emitting unit D4' emits the fourth sub-light beam W4'. When the control unit 120 switches the light-emitting module 110b to the second illumination mode, the first light-emitting unit D1' emits the first sub-light beam W1', the fifth light-emitting unit D5' emits the fifth sub-light beam W5', and the sixth light-emitting unit D6' emits the sixth sub-light beam W6'.

In this embodiment, the first sub-light beam W1' is a blue light beam, the second sub-light beam W2' is a green light beam, the third sub-light beam W3' is a yellow light beam, the fourth sub-light beam W4' is a red light beam, the fifth sub-light beam W5' is a red light beam, and the sixth sub-light beam W6' is a lime color light beam.

In this embodiment, the first light-emitting unit D1' is a first LED, the second light-emitting unit D2' is a first phosphor, the third light-emitting unit D3' is a second phosphor, the fourth light-emitting unit D4' is a third phosphor, the fifth light-emitting unit D5' is a second LED, and the sixth light-emitting unit D6' is a fourth phosphor. The first phosphor, the second phosphor, and the third phosphor are stimulated by a light (e.g. a seventh sub-light beam W7') emitted by a seventh light-emitting unit D7' (e.g. a third LED) to respectively emit the second sub-light beam W2', the third sub-light beam W3', and the fourth sub-light beam W4'. The fourth phosphor is stimulated by a light (e.g. an eighth sub-light beam W8') emitted by an eighth light-emitting unit D8' (e.g. a fourth LED) to emit the sixth sub-light beam W6'. In this embodiment, the seventh sub-light beam W7' and the eighth sub-light beam W8' are, for example, blue light beams. In this embodiment, the first phosphor, the second phosphor, and the third phosphor may be doped in an encapsulant 113 wrapping the seventh light-emitting unit D7', and the fourth phosphor may be doped in an encapsulant 115 wrapping the eighth light-emitting unit D8'.

In this embodiment, the general CRI of the first light L1' is greater than 90 and is greater than that of the second light L2', but the light emitting efficiency of the second light L2' is greater than that of the first light L1'. Therefore, when the light-emitting module 110b is switched to the first illumination mode, the light-emitting module 110b emits the first light L1' having higher general CRI, so that the first light L1' is adapted to illuminate fresh food. As a result, the fresh food may have better color. When the light-emitting module 110b is switched to the second illumination mode, the light-emitting module 110b emits the second light L2' having higher light emitting efficiency, so that the second light L2' is adapted to be used in the situation where the light emitting efficiency is concerned more. As shown in FIGS. 11A, 11B, and 12, the first light L1' (FIG. 11A) and the second light L2' (FIG. 11B) have different spectrum, but have substantially the same color temperature (FIG. 12). In FIG. 12, the color coordinate of the first light L1' and the color coordinate of the second light L2' are substantially located on the same line representing the correlated color temperature between 2500 K and 3000 K. Moreover, the spectrum of the second light L2' has a low circadian stimulus value and a low blue Light Hazard.

Figure 13A:
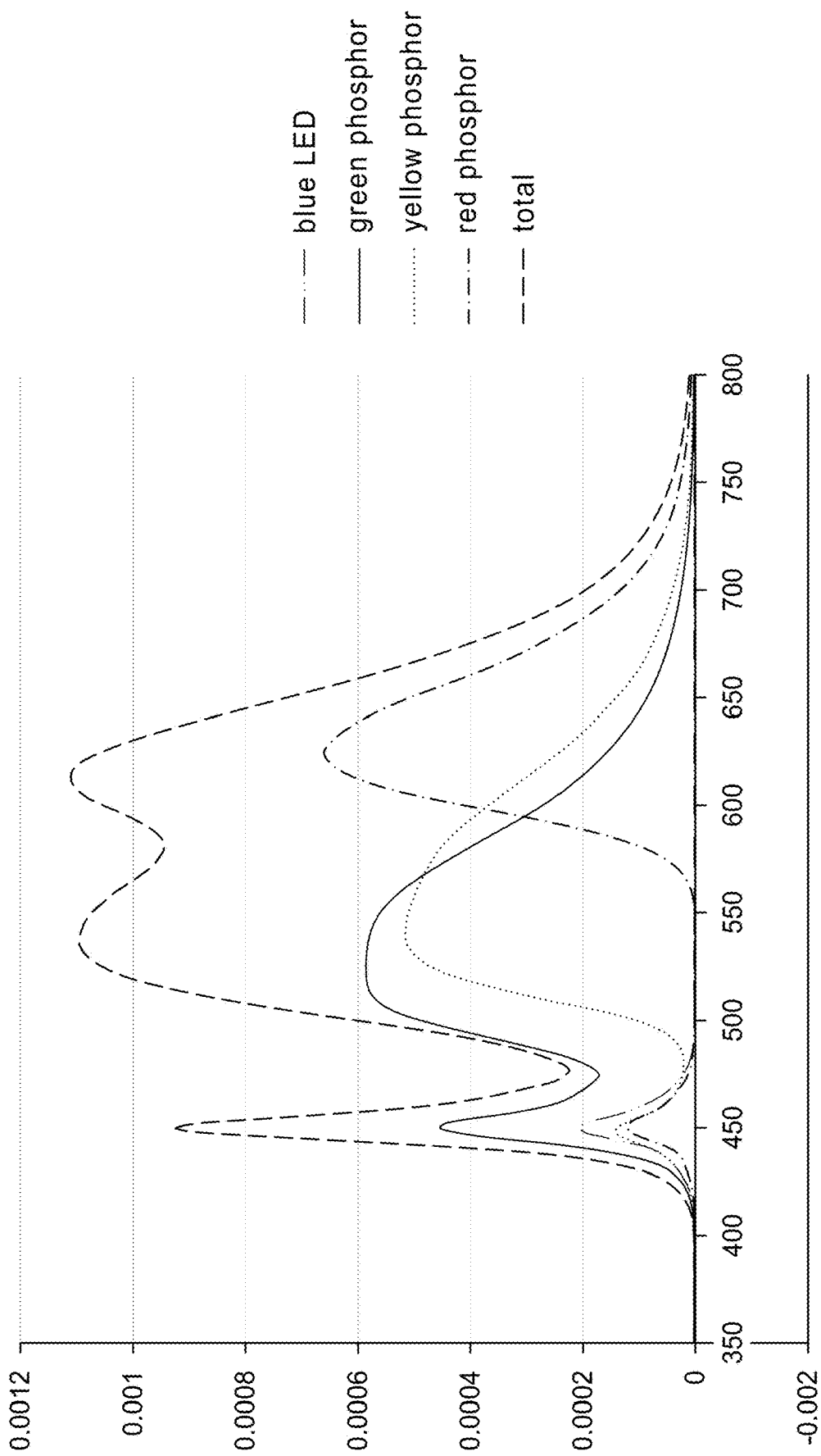
FIG. 13A is spectra of the first light and the lights respectively emitted from the light-emitting units in the first illumination mode in FIG. 10 according to another embodiment of the disclosure.
Figure 13B:
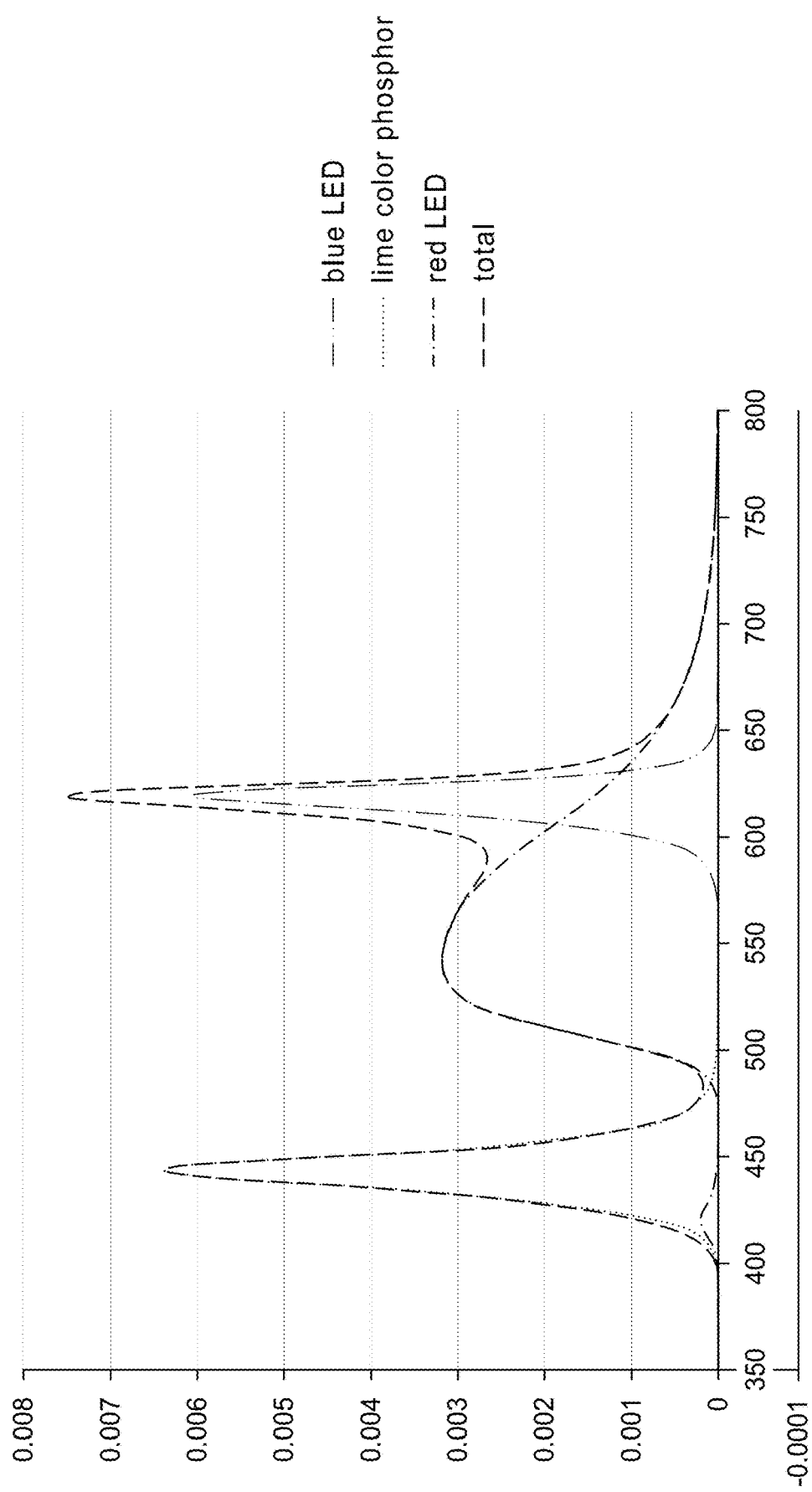
FIG. 13B is spectra of the second light and the lights respectively emitted from the light-emitting units in the second illumination mode in FIG. 10 according to another embodiment of the disclosure.
Figure 14:
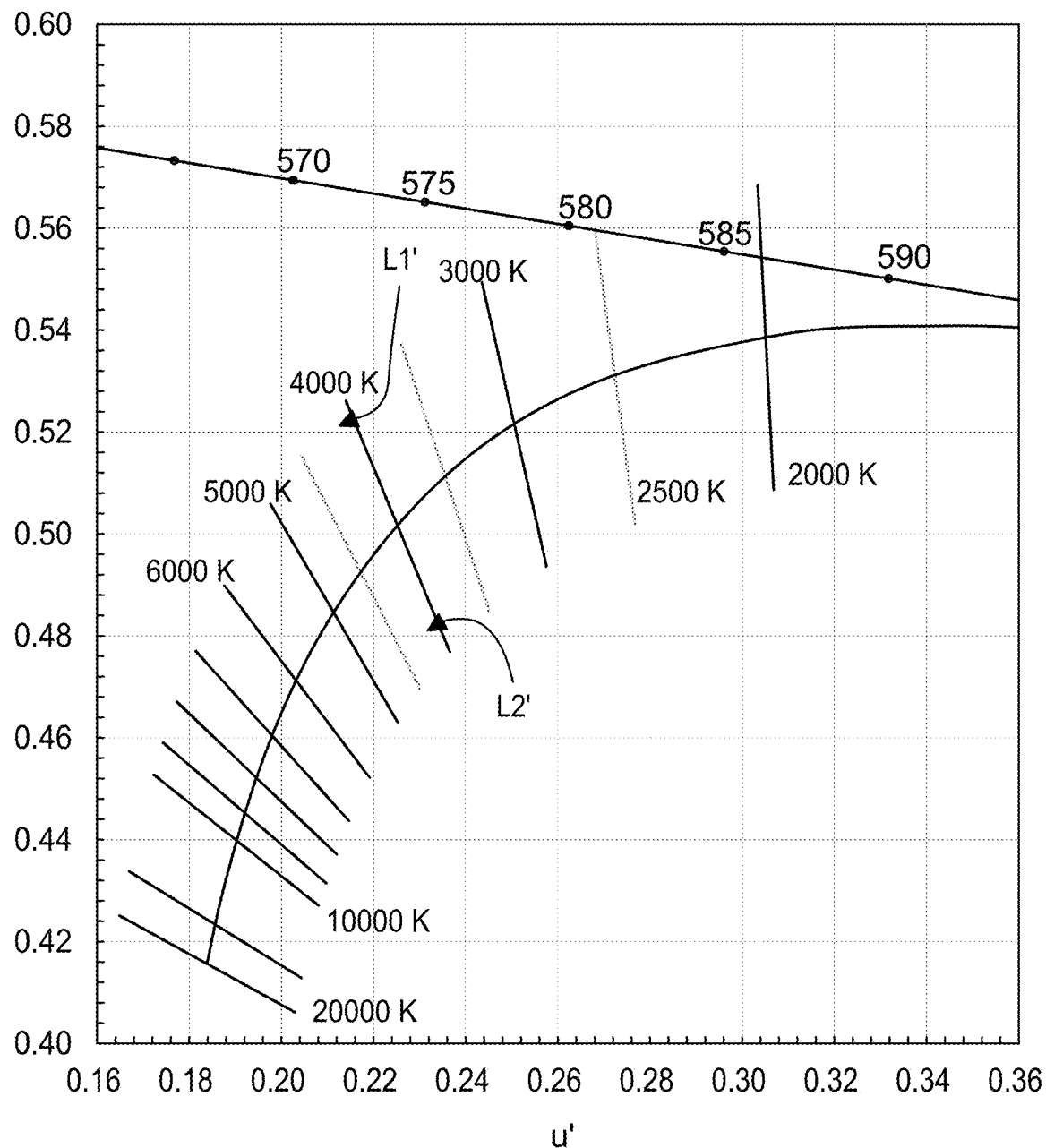
FIG. 14 is the color coordinates of the first light and the second light in FIG. 10 in the CIE 1976 u'-v' diagram according to another embodiment of the disclosure.

FIG. 13A is spectra of the first light and the lights respectively emitted from the light-emitting units in the first illumination mode in FIG. 10 according to another embodiment of the disclosure, FIG. 13B is spectra of the second light and the lights respectively emitted from the light-emitting units in the second illumination mode in FIG. 10 according to another embodiment of the disclosure, and FIG. 14 is the color coordinates of the first light and the second light in FIG. 10 in the CIE 1976 u'-v' diagram according to another embodiment of the disclosure. In FIGS. 13A and 13B, the horizontal axis represents wavelengths with the unit of nanometer (nm), and the vertical axis represents spectrum intensity having an arbitrary unit. Referring to FIGS. 10, 13A, 13B, and 14, the structure of the light source apparatus 100b in this embodiment is substantially the same as that of the light source apparatus 100b in the embodiment of FIGS. 10, 11A, 11B, and 12, but the main difference therebetween is that the spectra of the first light L1' and the second light L2' in this embodiment (shown in FIGS. 13A and 13B) are different from the spectra of the first light L1' and the second light L2' in the embodiment of FIGS. 10, 11A, 11B, and 12 (shown in FIGS. 11A and 11B).

In this embodiment, the CRI R14 of the first light L1' is greater than that of the second light L2', and the CRI R13 of the second light L2' is greater than that of the first light L1'. Specifically, in this embodiment, the CRI R14 of the first light L1' is greater than 90, and the CRI R13 of the second light L2' is greater than 90. Moreover, in this embodiment, both the general CRIs of the first light L1' and the second light L2' are greater than 84.

In this embodiment, when the light-emitting module 110b is switched to the first illumination mode, the light-emitting module 110b emits the first light L1' having the higher CRI R14, so that the first light L1' is adapted to illuminate green plants. As a result, the green plants may have better color. When the light-emitting module 110b is switched to the second illumination mode, the light-emitting module 110b emits the second light L2' having the higher CRI R13, so that the second light L2' is adapted to illuminate a human face or portrait, and the human face or the portrait may have better color. As shown in FIGS. 13A, 13B, and 14, the first light L1' (FIG. 13A) and the second light L2' (FIG. 13B) have different spectrum, but have substantially the same color temperature (FIG. 14). In FIG. 14, the color coordinate of the first light L1' and the color coordinate of the second light L2' are substantially located on the same line representing the correlated color temperature of 4000K.

The light-emitting units in aforementioned embodiments are not limited to be LEDs or phosphors. In other embodiments, the aforementioned light-emitting units may be organic light-emitting diodes (OLEDs) or other appropriate light-emitting devices.

Figure 15:
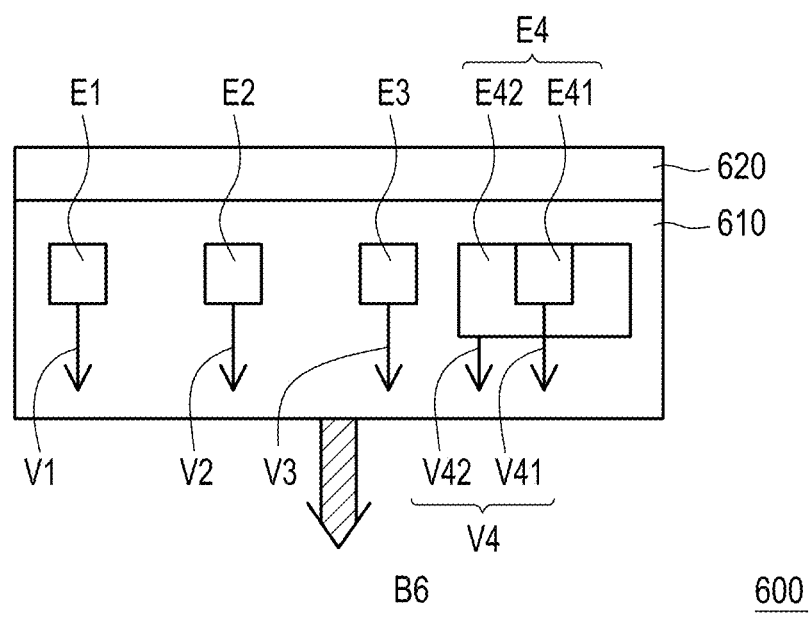
FIG. 15 is a schematic diagram of a light source apparatus in another embodiment of the disclosure.
Figure 16A:
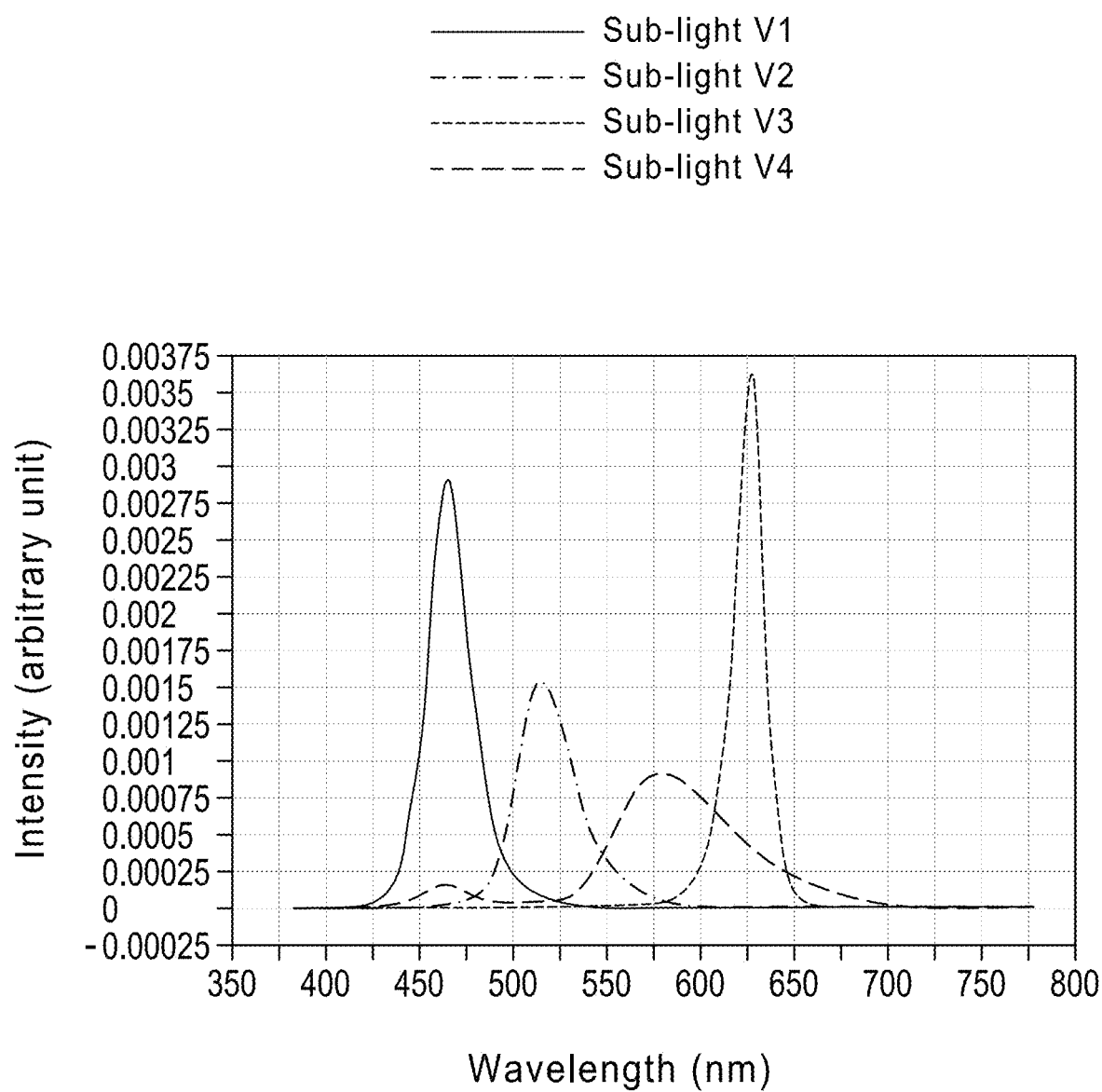
FIG. 16A is spectra of sub-lights emitted by light-emitters in FIG. 15.
Figure 16B:
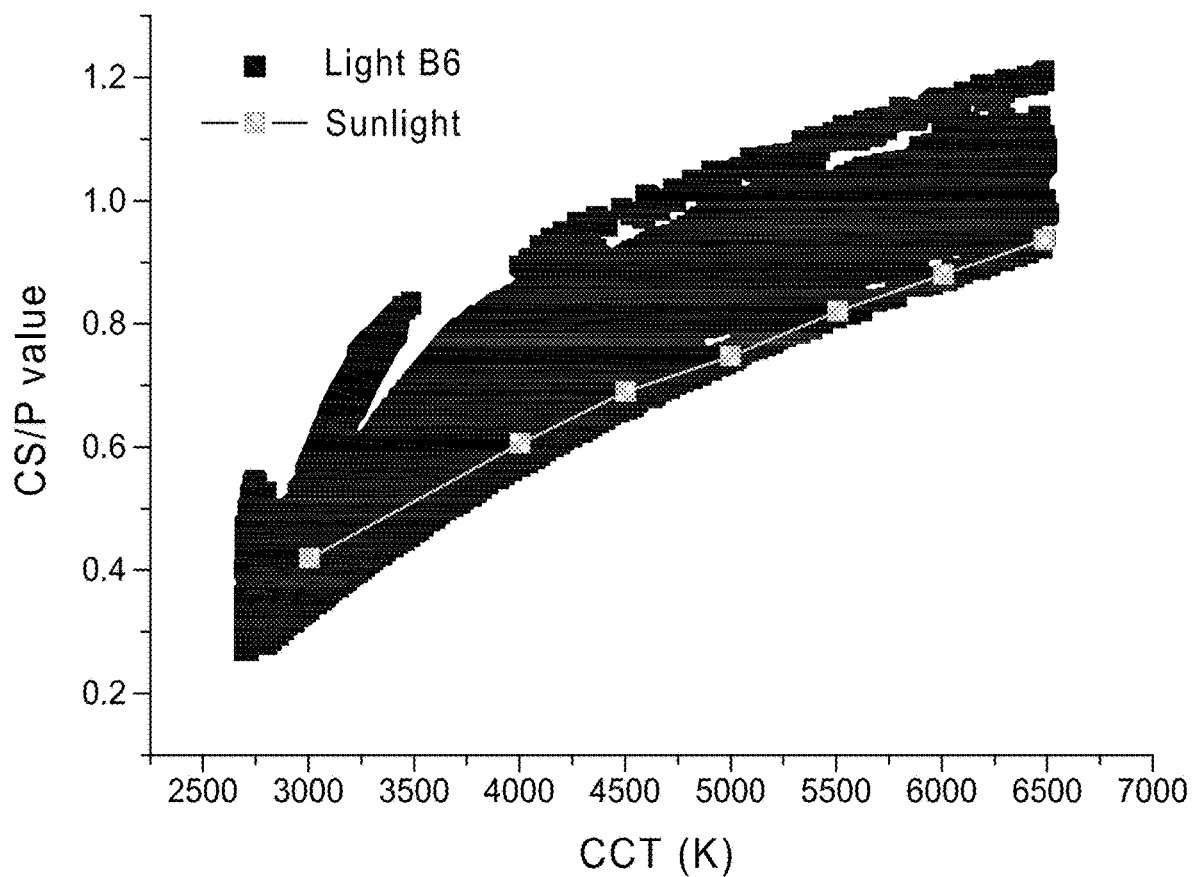
FIG. 16B is a graph of the circadian action factor (CAF) vs. correlated color temperature of light emitted from the light-emitting module in FIG. 15.

FIG. 15 is a schematic diagram of a light source apparatus in another embodiment of the disclosure, FIG. 16A is spectra of sub-lights emitted by light-emitters in FIG. 15, and FIG. 16B is a graph of the circadian action factor vs. correlated color temperature of light emitted from the light-emitting module in FIG. 15. Referring to FIGS. 15, 16A, and 16B, the light source apparatus 600 in this embodiment includes a light-emitting module 610 and a control unit 620. The light-emitting module 610 is configured to provide a light B6. The control unit 620 makes the light B6 emitted from the light-emitting module 610 switched among a plurality of kinds of first light. Correlated color temperatures (CCTs) of the plurality of kinds of first light are different from each other, and circadian action factors of the plurality of kinds of first light are substantially the same as each other. The circadian action factor is the aforementioned CS/P value. For example, in FIG. 16B, a black square dot means the circadian action factor and the CCT of a kind of first light, and black square dots substantially aligned along a horizontal line in FIG. 16B means the circadian action factors and the CCTs respectively belonging to a plurality of kinds of first light. That "the circadian action factors of the plurality of kinds of first light are substantially the same as each other" means that the variations of the circadian action factors are within ±20% of the average of the circadian action factors, preferably within ±10% of the average of the circadian action factors.

In this embodiment, the light-emitting module 610 includes a plurality of light-emitters E1, E2, E3, E41, and E42 respectively emitting sub-lights V1, V2, V3, V41, and V42 with different wavelength ranges, and the sub-lights V1, V2, V3, V41, and V42 form the light B6 provided by the light-emitting module 610. The light B6 emitted from the light-emitting module 610 are switched among the plurality of kinds of first light by changing proportions of the sub-lights V1, V2, V3, V41, and V42. The light-emitters E1, E2, E3, E41, and E42 include an electroluminescent light-emitting element, a light-induced light-emitting element or a combination thereof. The electroluminescent light-emitting element is, for example, a light-emitting diode (LED) chip, and the light-induced light-emitting element is, for example, phosphor. In this embodiment, the light-emitters E1, E2, E3, and E41 are light-emitting diode chips, and the light-emitter E42 is phosphor. Moreover, the light-emitter E41 and the light-emitter E42 form a light-emitter E4, wherein the light-emitter E41 is, for example, a blue LED chip, the light-emitter E42 is, for example, yttrium aluminum garnet (YAG) phosphor, and the light-emitter E4 is a white LED. That is, the sub-light V41 is a blue sub-light, the sub-light V42 is a yellow sub-light, the sub-light V41 and the sub-light V42 form the sub-light V4, and the sub-light V4 is a white sub-light. Specifically, when the sub-light V41 from the light-emitter E41 irradiates the light-emitter E42, the light-emitter E42 converts the sub-light V41 into the sub-light V42. The sub-light V42 and the unconverted sub-light V41 form the sub-light V4.

In this embodiment, the peak wavelength of the sub-light V1 falls within the range of 460 nanometer (nm) to 470 nm, the peak wavelength of the sub-light V2 falls within the range of 515 nm to 525 nm, the peak wavelength of the sub-light V3 falls within the range of 620 nm to 630 nm, and the sub-light V4 is a white light with a CCT of 3100 K. In this embodiment, a full width at half maximum (FWHM) of each of sub-lights V1, V2, and V3 emitted by the light-emitting diode chips is less than 40 nanometers. For example, the FWHM of the sub-light V1 is 25 nm, the FWHM of the sub-light V2 is 32 nm, the FWHM of the sub-light V3 is 18 nm, and the FWHM of the sub-light V4 is 74 nm, wherein the sub-light V4 includes the sub-light V42 and the unconverted sub-light V41. In this embodiment, the sub-lights V1, V2, V3, and V4 are visible lights, but the disclosure is not limited thereto.

The control unit 620 is configured to change the proportions of intensities of the sub-lights V1, V2, V3, V4 by changing the currents or voltages respectively applied to the light-emitters E1, E2, E3, and E41, so that the light B6 may be switched among the plurality of kinds of first light. In this embodiment, the proportions of the sub-lights V1, V2, V3, and V4 are changed by pulse width modulation of the light emitters E1, E2, E3, and E41. For example, when the CS/P value of the light B6 is 0.8 as shown in FIG. 16B, the CCT of the light B6 may be modulated from 3750 K to 5500 K by the control unit 620 executing pulse width modulation. When the CS/P value is 0.8 and the CCT is 3750 K, the ratio of the duty cycles of pulse width modulation of the light emitters E1, E2, E3, and E41 is 3:18:17:2, for example. When the CS/P value is 0.8 and the CCT is 5500 K, the ratio of the duty cycles of pulse width modulation of the light emitters E1, E2, E3, and E41 is 13:11:0:20, for example.

In this embodiment, each of Duv values of the plurality of kinds of first light is less than 0.005. For the color consistency of white light, the standard CCT has still an allowable range of variation in chromaticity. The Duv, defined as the variations perpendicular to the Planckian locus on the CIE 1976 color space, is used to illustrate the variation in chromaticity. In usual, the color inconsistency cannot be readily discerned by viewers if the Duv is lower than 0.005.

Figure 16C:
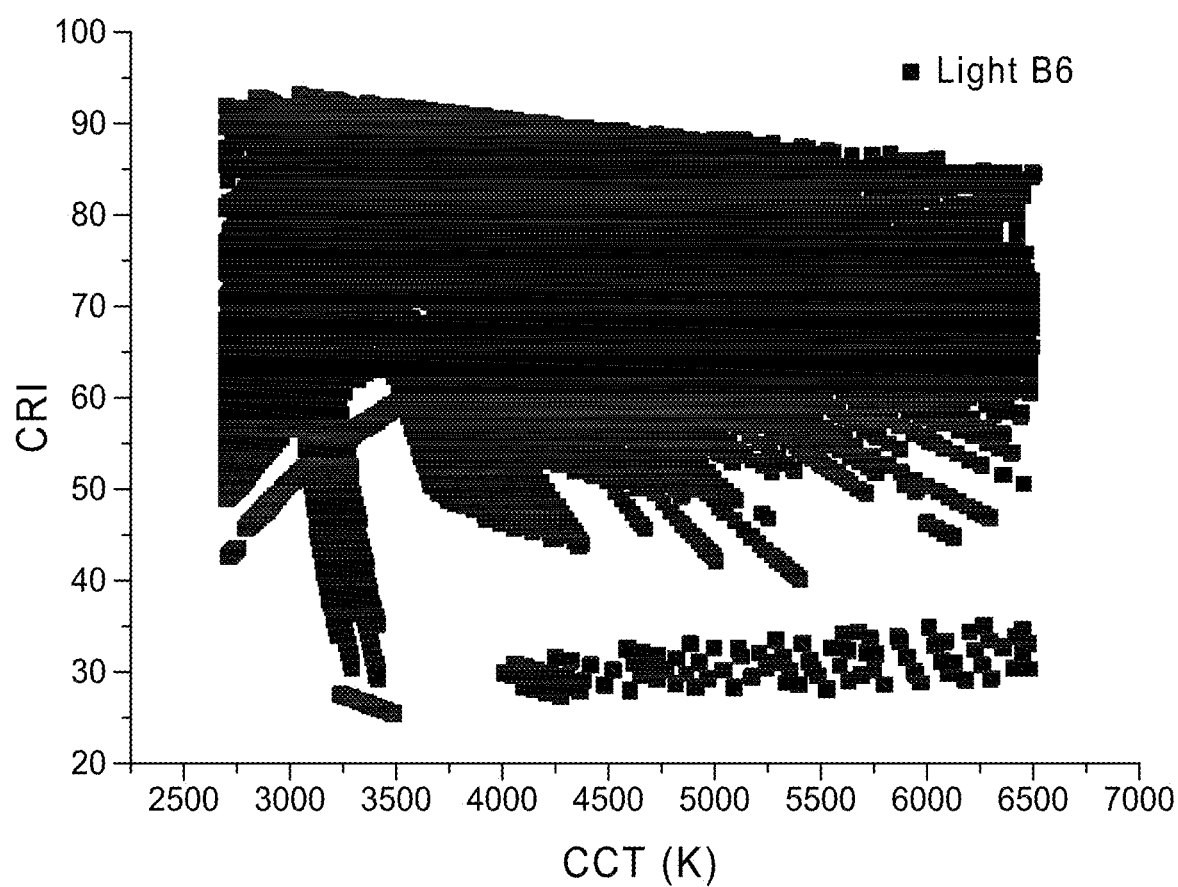
FIG. 16C is a graph of the color rendering index vs. correlated color temperature of light emitted from the light-emitting module in FIG. 15.

FIG. 16C is a graph of the color rendering index vs. correlated color temperature of light emitted from the light-emitting module in FIG. 15. Referring to FIGS. 15, 16A, and 16C, in this embodiment, the control unit 620 also makes the light B6 emitted from the light-emitting module 610 switched among a plurality of kinds of second light, wherein correlated color temperatures (CCTs) of the plurality of kinds of second light are different from each other, and color rendering indices (CRIs) of the plurality of kinds of second light are substantially the same as each other. For example, in FIG. 16C, a black square dot means the CRI and the CCT of a kind of second light, and black square dots substantially aligned along a horizontal line in FIG. 16C means the CRIs and the CCTs respectively belonging to a plurality of kinds of second light. That "the CRIs of the plurality of kinds of second light are substantially the same as each other" means that the variations of the CRIs are within ±5. In this embodiment, each of Duv values of the plurality of kinds of second light is less than 0.005. In this embodiment, when the CRI of the light B6 is 85, the CCT of the light B6 may be modulated from 2700 K to 6500 K by the control unit 620 executing pulse width modulation.

In this embodiment, the control unit 620 also makes the light B6 emitted from the light-emitting module 610 switched among a plurality of kinds of third light, wherein correlated color temperatures (CCTs) of the plurality of kinds of third light are substantially the same as each other, and color rendering indices (CRIs) or circadian action factors (i.e. CS/P values) of the plurality of kinds of third light are different from each other. That "the CCTs are substantially the same" of "the correlated color temperatures (CCTs) of the plurality of kinds of third light are substantially the same as each other" is defined the same as the definition of the color temperatures being substantially the same in Table 2 and the paragraph following Table 2. In this embodiment, a black square dot in FIG. 16B or in FIG. 16C means the CS/P value and the CCT of a kind of third light or the CRI and the CCT of a kind of third light, and black square dots substantially aligned along a vertical line in FIG. 16B or 16C means the CS/P values and the CCTs respectively belonging to a plurality of kinds of third light, or the CRIs and the CCTs respectively belonging to a plurality of kinds of third light. Moreover, in this embodiment, each of Duv values of the plurality of kinds of third light is less than 0.005. For example, when the CCT is 3000 K, the CS/P value of the light B6 may be modulated from 0.3 to 0.6 by the control unit 620 executing pulse width modulation. Besides, when the CCT is 3000 K, the CRI of the light B6 may be modulated from 55 to 93 by the control unit 620 executing pulse width modulation.

Figure 16D:
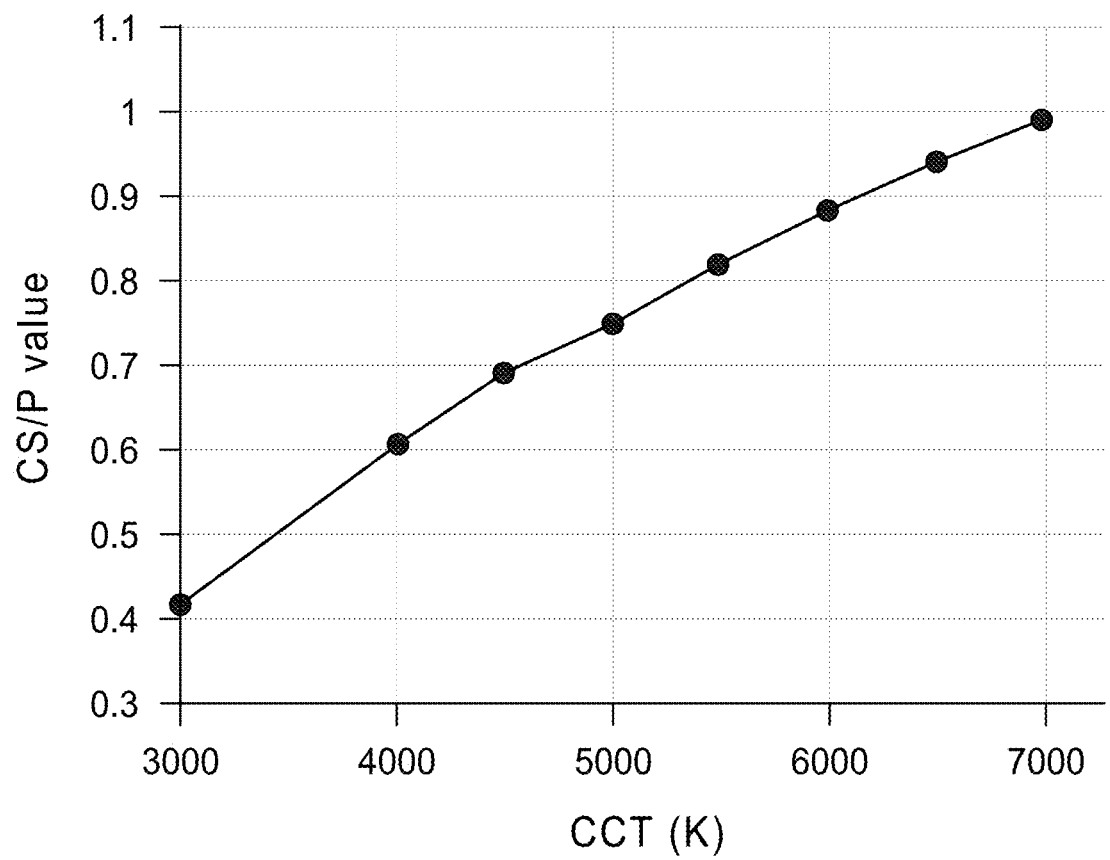
FIG. 16D is a graph of the circadian action factor vs. correlated color temperature of sunlight.

The control unit 620 may also make the light B6 emitted from the light-emitting module 610 switched among a plurality of kinds of fourth light, circadian action factors (i.e. CS/P values) of the plurality of kinds of fourth light cover or are substantially the same as circadian action factors of sunlight within a correlated color temperature range, wherein the correlated color temperature range comprises a range of 3000 K to 6500 K. The gray square dots and the gray line in FIG. 16B show the circadian action factors respectively corresponding to CCTs of sunlight, and all the black square dots in FIG. 16B show the circadian action factors respectively corresponding to CCTs of the plurality of kinds of fourth light. FIG. 16D is a graph of the circadian action factor vs. correlated color temperature of sunlight. Referring to FIGS. 15, 16A, 16B, and 16D, in this embodiment, the area of the black square dots in FIG. 16B cover the gray square dots and the gray line, which means that the circadian action factors (i.e. CS/P values) of the plurality of kinds of fourth light cover the circadian action factors of sunlight within the correlated color temperature range, e.g. a CCT range from 3000 K to 6500 K. Moreover, in this embodiment, each of Duv values of the plurality of kinds of fourth light is less than 0.005.

In this embodiment, the light B6 emitted from the light-emitting module 610 are switched among the plurality of kinds of first light, the plurality of kinds of second light, the plurality of kinds of third light, and the plurality of kinds of fourth light by changing proportions of the sub-lights V1, V2, V3, and V4 through the control unit 620 executing the aforementioned pulse width modulation.

In the light source apparatus 600 according to this embodiment, since the light B6 emitted from the light-emitting module 610 may be switched among the plurality of kinds of first light, the plurality of kinds of second light, the plurality of kinds of third light, and the plurality of kinds of fourth light, the light source apparatus 600 may have more applications.

Figure 17:
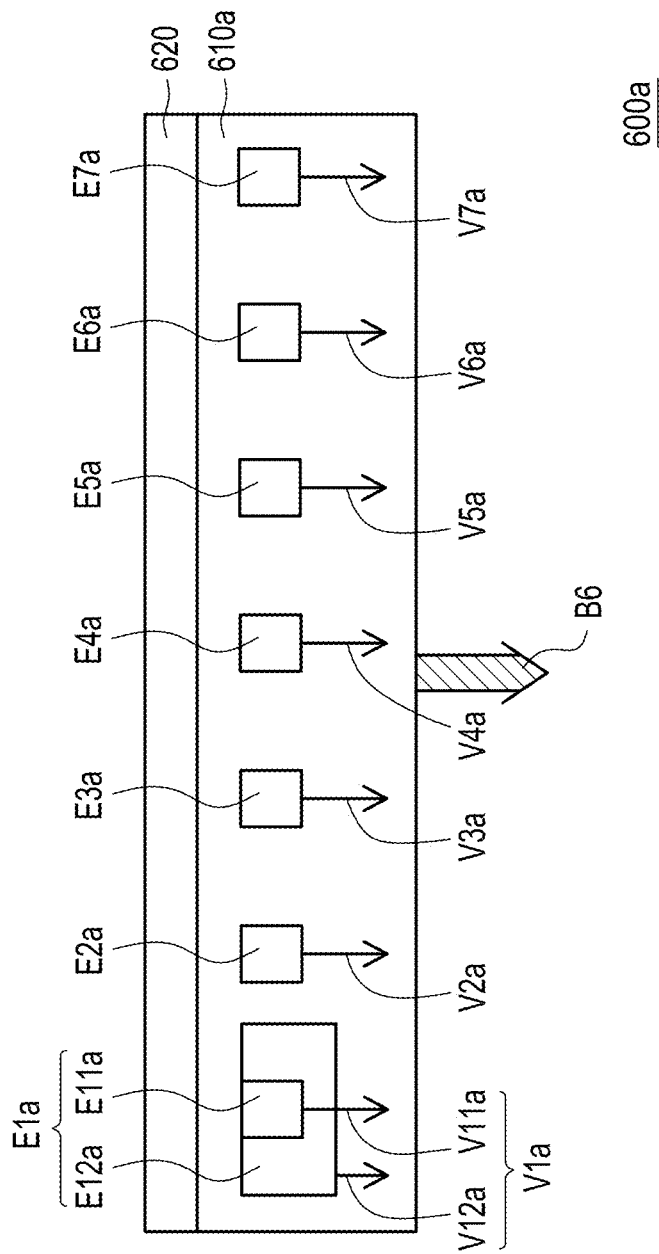
FIG. 17 is a schematic diagram of a light source apparatus in another embodiment of the disclosure.
Figure 18A:
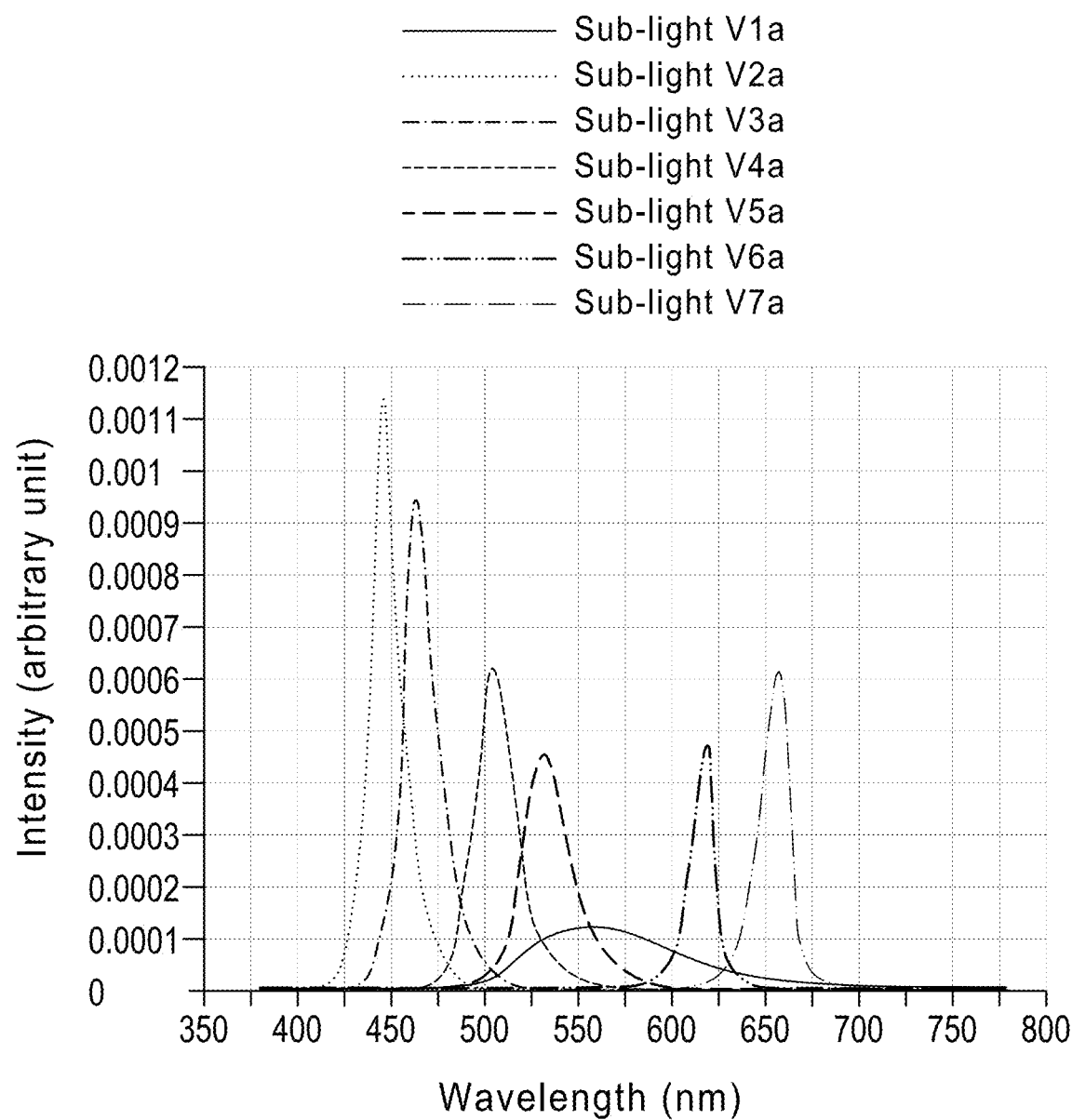
FIG. 18A is spectra of sub-lights emitted by light-emitters in FIG. 17.
Figure 18B:
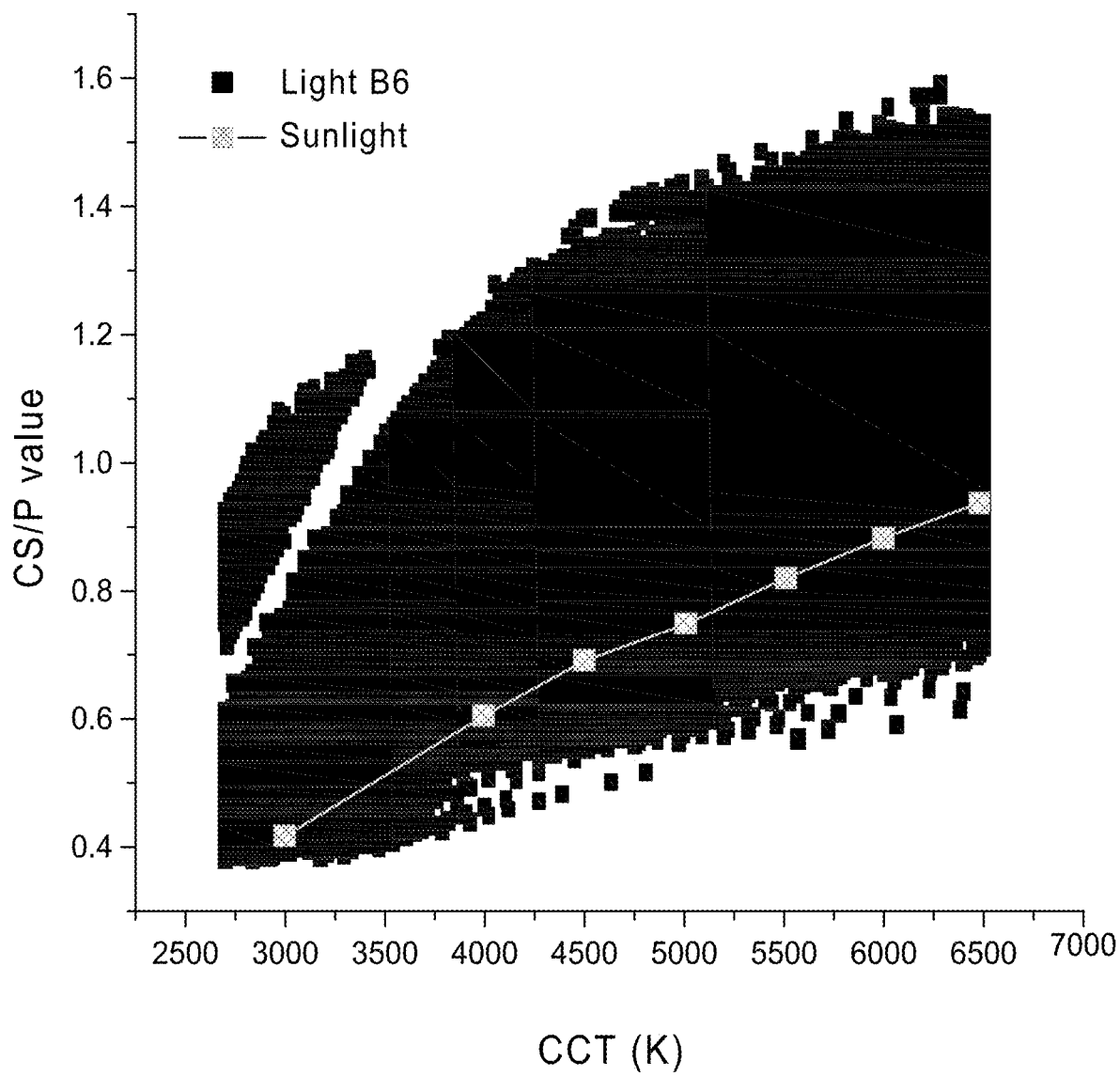
FIG. 18B is a graph of the circadian action factor vs. correlated color temperature of light emitted from the light-emitting module in FIG. 17.
Figure 18C:
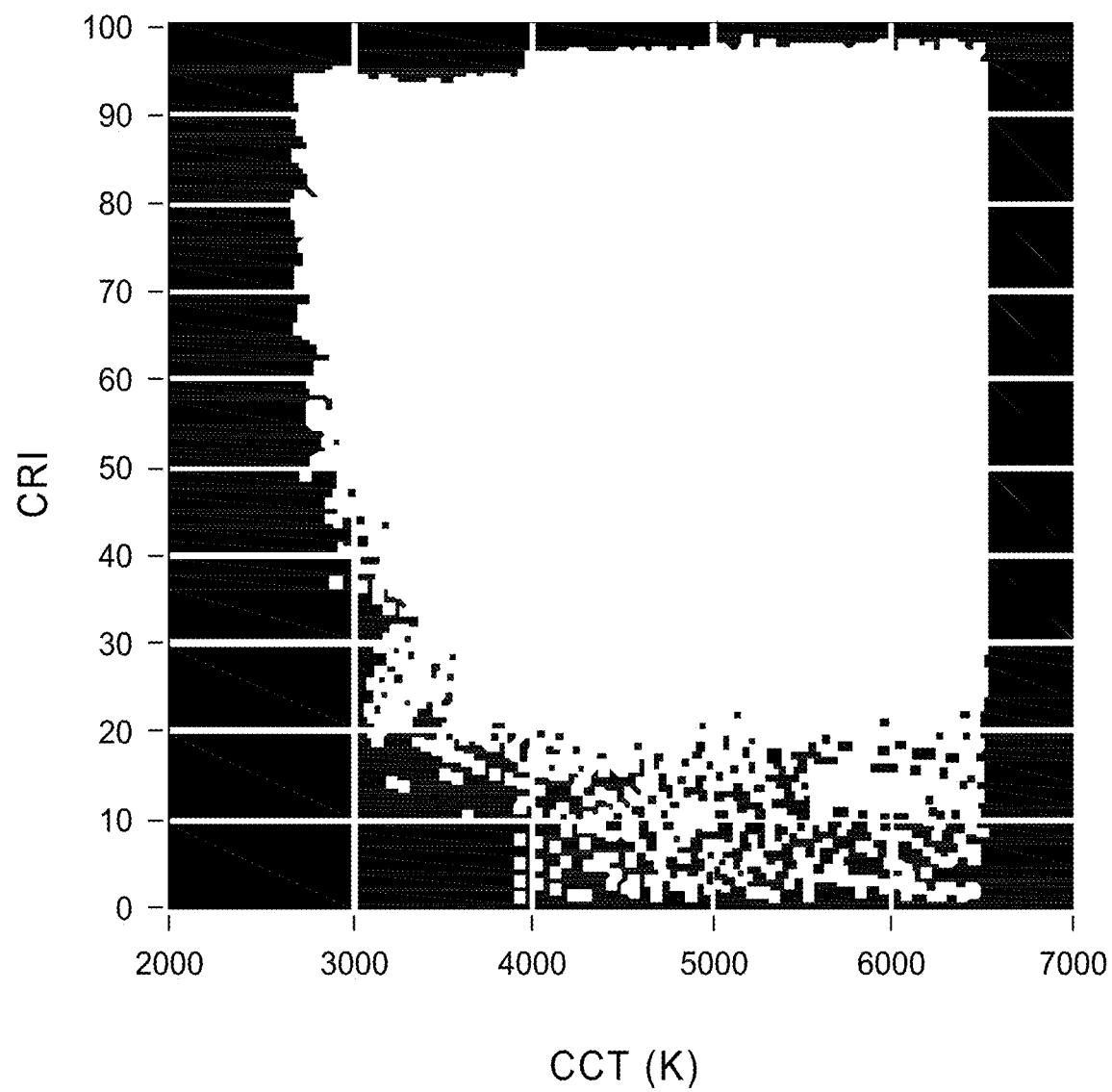
FIG. 18C is a graph of the color rendering index vs. correlated color temperature of light emitted from the light-emitting module in FIG. 17.

FIG. 17 is a schematic diagram of a light source apparatus in another embodiment of the disclosure, FIG. 18A is spectra of sub-lights emitted by light-emitters in FIG. 17, and FIG. 18B is a graph of the circadian action factor vs. correlated color temperature of light emitted from the light-emitting module in FIG. 17. FIG. 18C is a graph of the color rendering index vs. correlated color temperature of light emitted from the light-emitting module in FIG. 17, wherein the white square dots show the color rendering indices and the corresponding correlated color temperatures of light B6 emitted from the light-emitting module in FIG. 17. Referring to FIGS. 17, 18A, 18B, and 18C, the light source apparatus 600a in this embodiment is similar to the light source apparatus 600 in FIG. 15, and the main difference therebetween is as follows. In this embodiment, a light-emitting module 610a includes a plurality of light emitters E11a, E12a, E2a, E3a, E4a, E5a, E6a, and E7a respectively emitting sub-lights V11a, V12a, V2a, V3a, V4a, V5a, V6a, and V7a with different wavelength ranges, and the sub-lights V11a, V12a, V2a, V3a, V4a, V5a, V6a, and V7a form the light B6 provided by the light-emitting module 610a. In this embodiment, the light-emitters E11a, E2a, E3a, E4a, E5a, E6a, and E7a are light-emitting diode chips, and the light-emitter E12a is phosphor. Moreover, the light-emitter E11a and the light-emitter E12a form a light emitter E1a, wherein the light-emitter E12a is, for example, phosphor with lime color. When the sub-light V11a from the light-emitter E11a irradiates the light-emitter E12a, the light-emitter E12a converts the sub-light V11a into the sub-light V12a. The sub-light V12a and the unconverted sub-light V11a from the sub-light V1a. In this embodiment, almost all the sub-light V11a is converted into the sub-light V12a by the light-emitter E12a, and the unconverted sub-light V11a can be neglected, so that the sub-light V1a may be deemed having lime color.

In this embodiment, the peak wavelength of the sub-light V1a falls within the range of 550 nm to 560 nm, the peak wavelength of the sub-light V2a falls within the range of 440 nm to 450 nm, the peak wavelength of the sub-light V3a falls within the range of 460 nm to 470 nm, the peak wavelength of the sub-light V4a falls within the range of 490 nm to 500 nm, the peak wavelength of the sub-light V5a falls within the range of 520 nm to 530 nm, the peak wavelength of the sub-light V6a falls within the range of 610 nm to 620 nm, and the peak wavelength of the sub-light V7a falls within the range of 650 nm to 670 nm. Moreover, the FWHM of the sub-light V1a is 93 nm, the FWHM of the sub-light V2a is 16 nm, the FWHM of the sub-light V3a is 20 nm, the FWHM of the sub-light V4a is 22 nm, the FWHM of the sub-light V5a is 28 nm, the FWHM of the sub-light V6a is 14 nm, and the FWHM of the sub-light V7a is 15 nm, for example.

The control unit 620 is configured to change the proportions of intensities of the sub-lights V1a, V2a, V3a, V4a, V5a, V6a, and V7a by changing the currents or voltages respectively applied to the light-emitters E11a, E2a, E3a, E4a, E5a, E6a, and E7a, so that the light B6 may be switched among a plurality of kinds of first light, a plurality of kinds of second light, a plurality of kinds of third light, and a plurality of kinds of fourth light. In this embodiment, the proportions of the sub-lights V1a, V2a, V3a, V4a, V5a, V6a, and V7a are changed by pulse width modulation of the light emitters E11a, E2a, E3a, E4a, E5a, E6a, and E7a. For example, when the CS/P value of the light B6 is 0.7 as shown in FIG. 18B, the CCT of the light B6 may be modulated from 2700K to 6500K by the control unit 620 executing pulse width modulation. When the CRI of the light B6 is 93, the CCT of the light B6 may be modulated from 2700K to 6500K by the control unit 620 executing pulse width modulation. In addition, when the CCT of the light B6 is 6000 K, the CS/P value of the light B6 may be modulated from 0.62 to 1.4 by the control unit 620 executing pulse width modulation. When the CCT of the light B6 is 6000 K, the CRI of the light B6 may be modulated from 1 to 98 by the control unit 620 executing pulse width modulation. In this embodiment, each of Duv values of the plurality of kinds of first light, the plurality of kinds of second light, the plurality of kinds of third light, and the plurality of kinds of fourth light is less than 0.005.

Figure 19A:
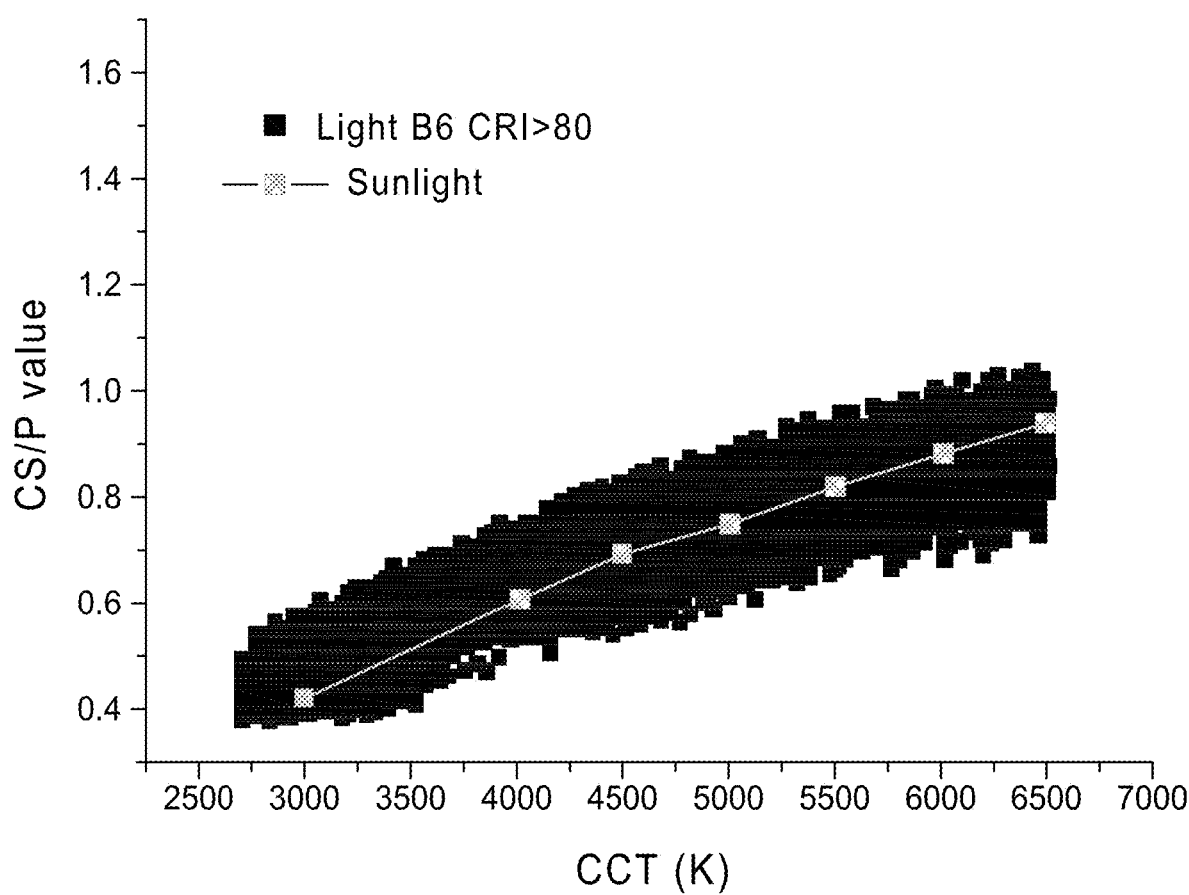
FIGS. 19A to 19D are graphs of the circadian action factor vs. correlated color temperature of light emitted from the light-emitting module in FIG. 17 respectively when the CRIs thereof are greater than 80, 90, 93, and 95.
Figure 19B:
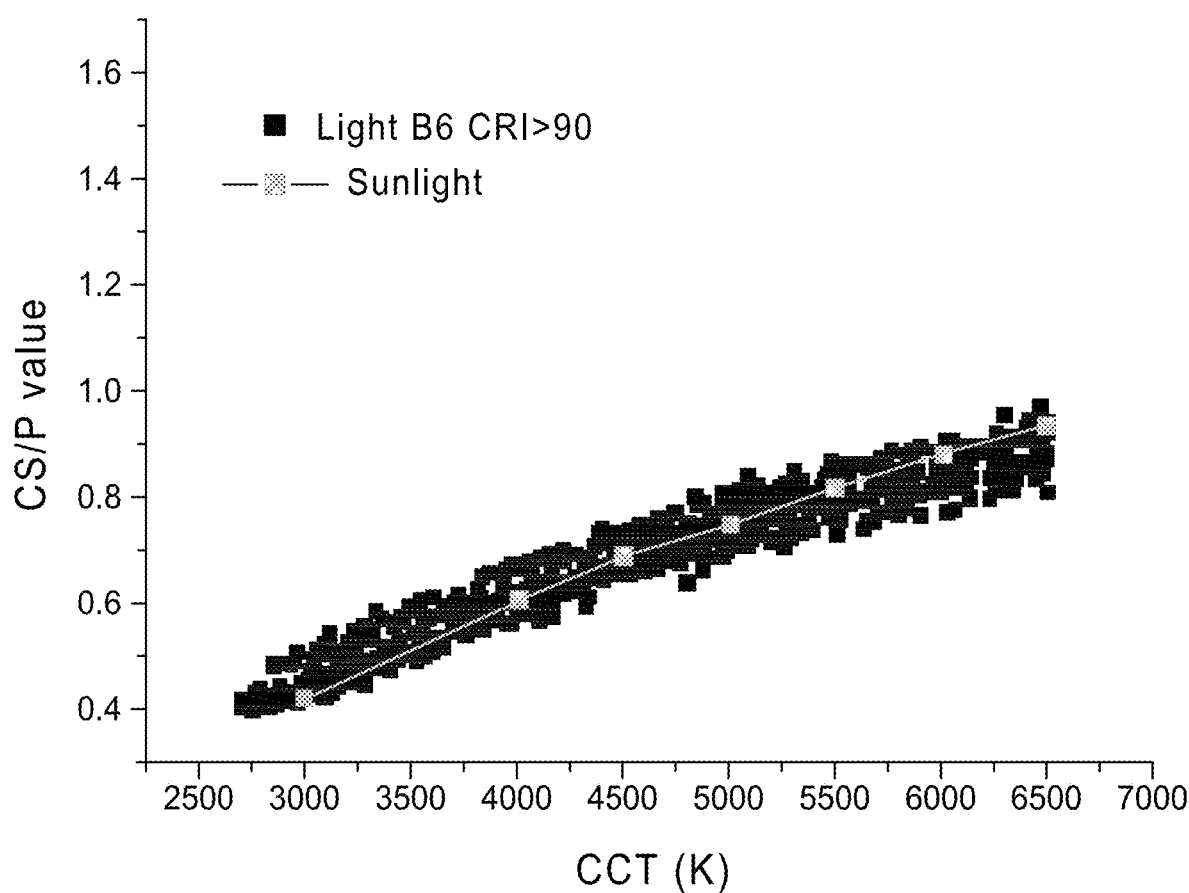
Figure 19C:
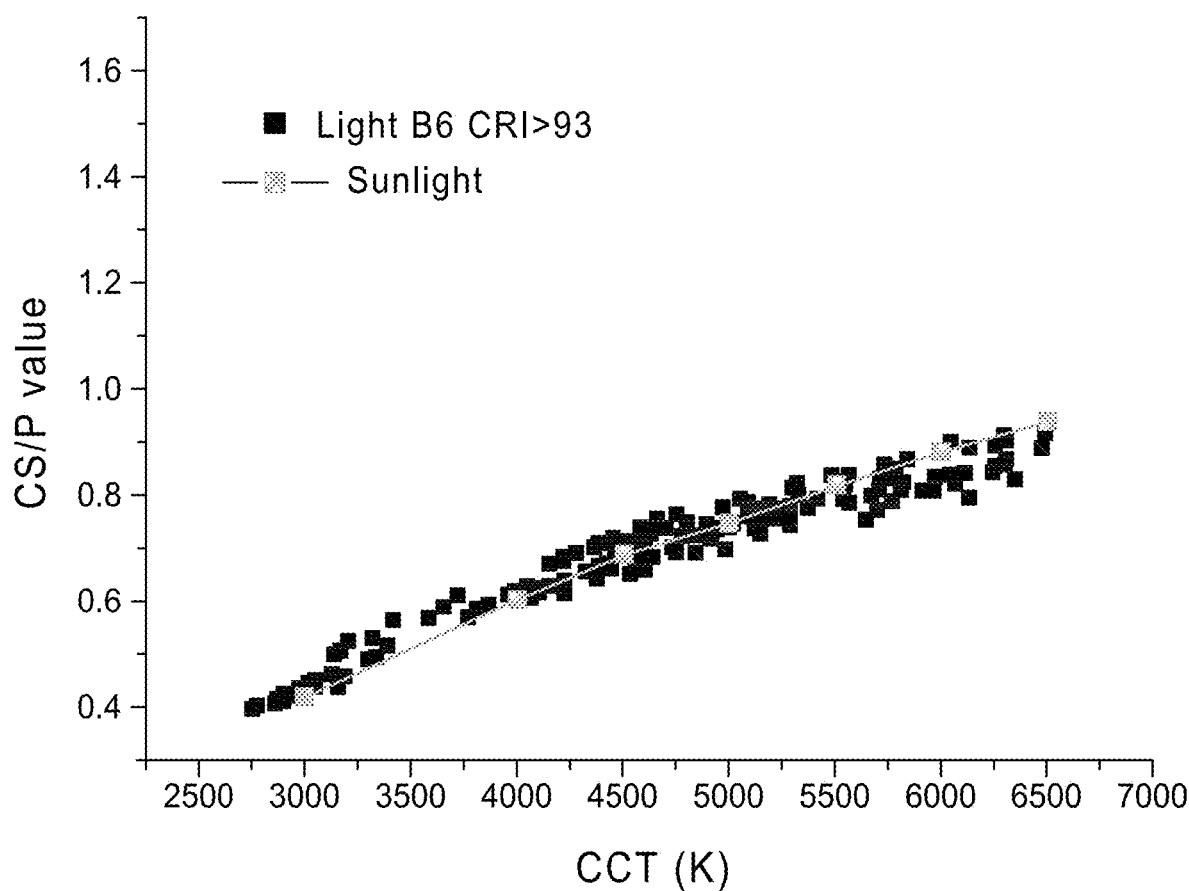
Figure 19D:
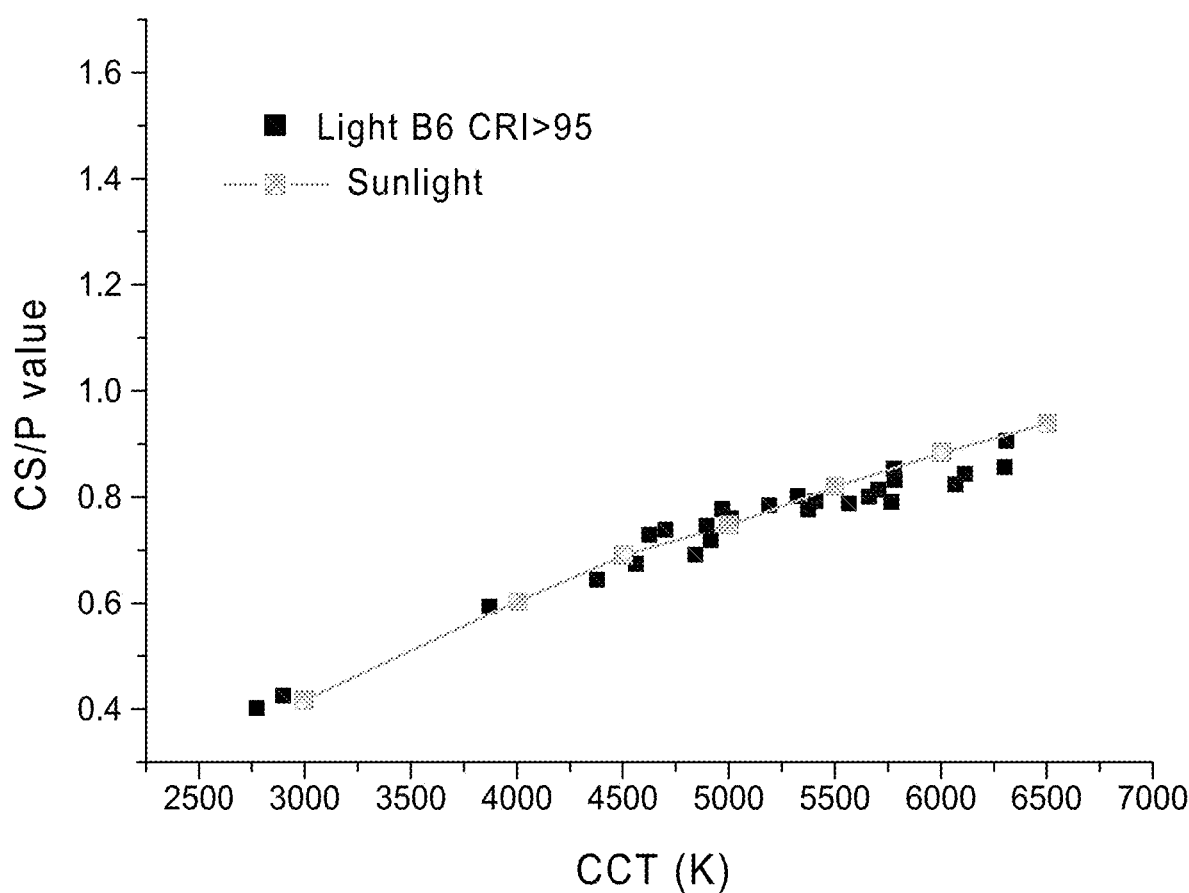

FIGS. 19A to 19D are graphs of the circadian action factor vs. correlated color temperature of light emitted from the light-emitting module in FIG. 17 respectively when the CRIs thereof are greater than 80, 90, 93, and 95. Referring to FIGS. 17, 18B, and 19A to 19D, the control unit 620 may also make the light B6 emitted from the light-emitting module 610a switched among a plurality of kinds of fourth light, circadian action factors (i.e. CS/P values) of the plurality of kinds of fourth light cover or are substantially the same as circadian action factors of sunlight within a correlated color temperature range, wherein the correlated color temperature range is, for example, a range of 3000 K to 6500 K. The gray square dots and the gray line in FIGS. 18B and 19A to 19D show the circadian action factors respectively corresponding to CCTs of sunlight, and all the black square dots in FIGS. 18B and 19A to 19D show the circadian action factors respectively corresponding to CCTs of the plurality of kinds of fourth light. In FIGS. 18B, 19A, and 19B, the circadian action factors (i.e. CS/P values) of the plurality of kinds of fourth light cover the circadian action factors of sunlight within the correlated color temperature range, e.g. a CCT range from 3000 K to 6500 K. In the embodiment of FIG. 19A, each of the color rendering indices of the plurality of kinds of fourth light is greater than 80. Besides, in FIGS. 19C and 19D, the circadian action factors (i.e. CS/P values) of the plurality of kinds of fourth light are substantially the same as the circadian action factors of sunlight within the correlated color temperature range, e.g. a CCT range from 3000 K to 6500 K, wherein That "the circadian action factors (i.e. CS/P values) of the plurality of kinds of fourth light are substantially the same as the circadian action factors of sunlight" means that the deviations of the circadian action factors of the plurality of kinds of fourth light from the circadian action factors of sunlight at corresponding CCTs are respectively within ±20% of the circadian action factors at the corresponding CCTs, preferably within ±10% of the circadian action factors at the corresponding CCTs.

Figure 20:
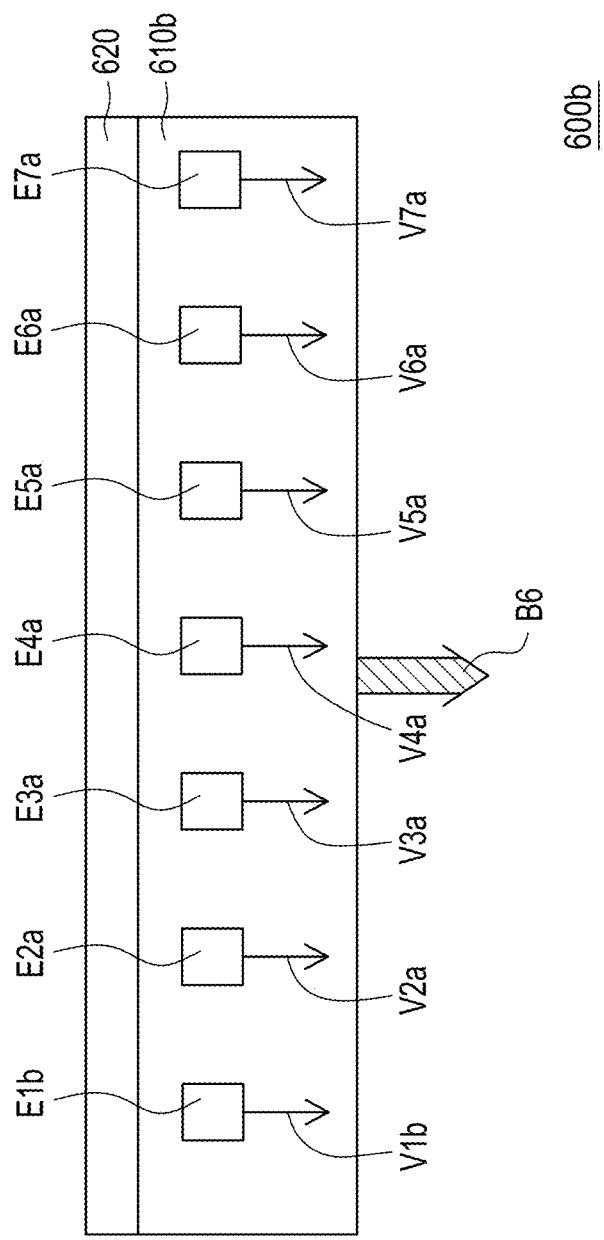
FIG. 20 is a schematic diagram of a light source apparatus in another embodiment of the disclosure.
Figure 21A:
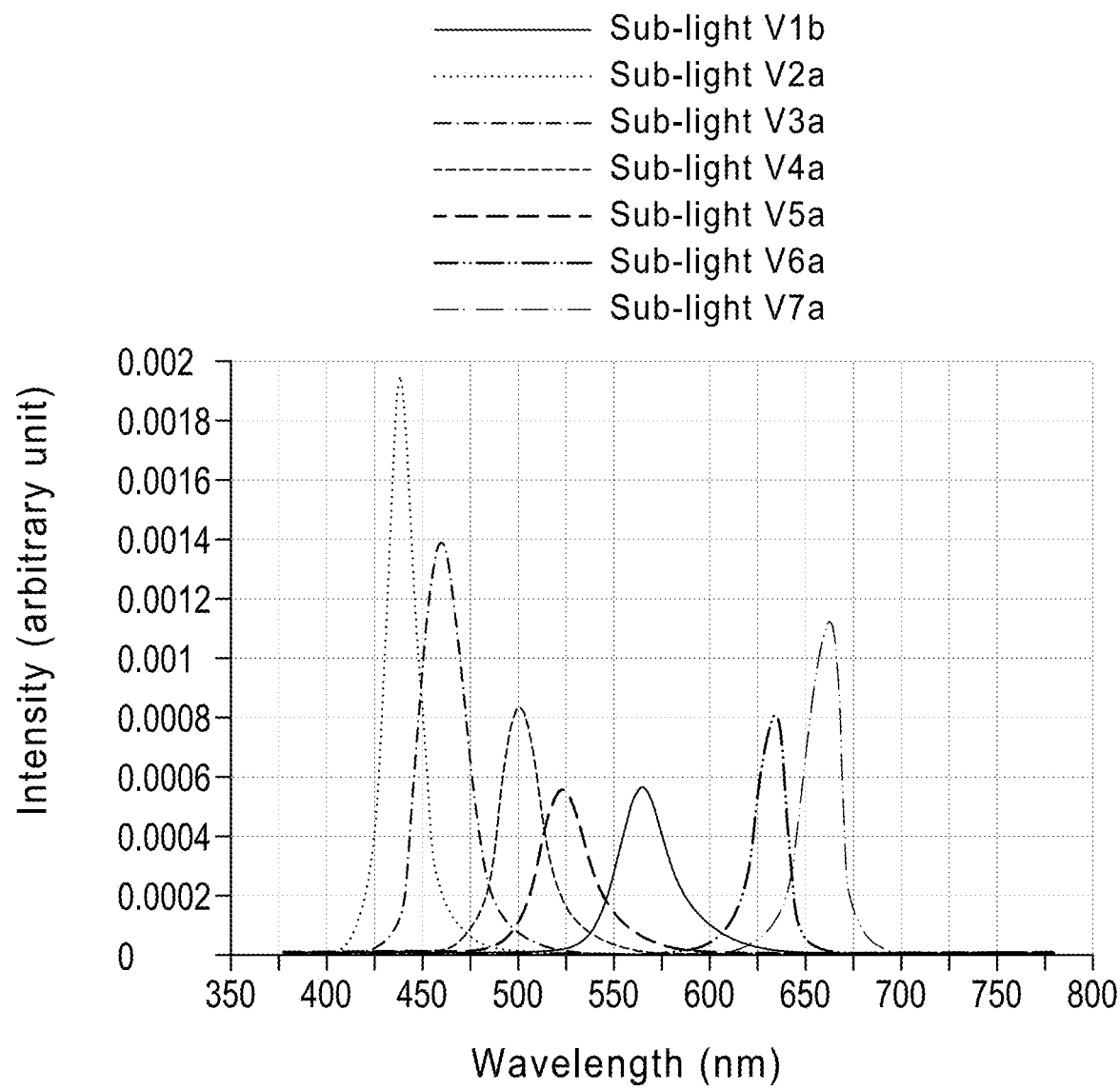
FIG. 21A is spectra of sub-lights emitted by light-emitters in FIG. 20.
Figure 21B:
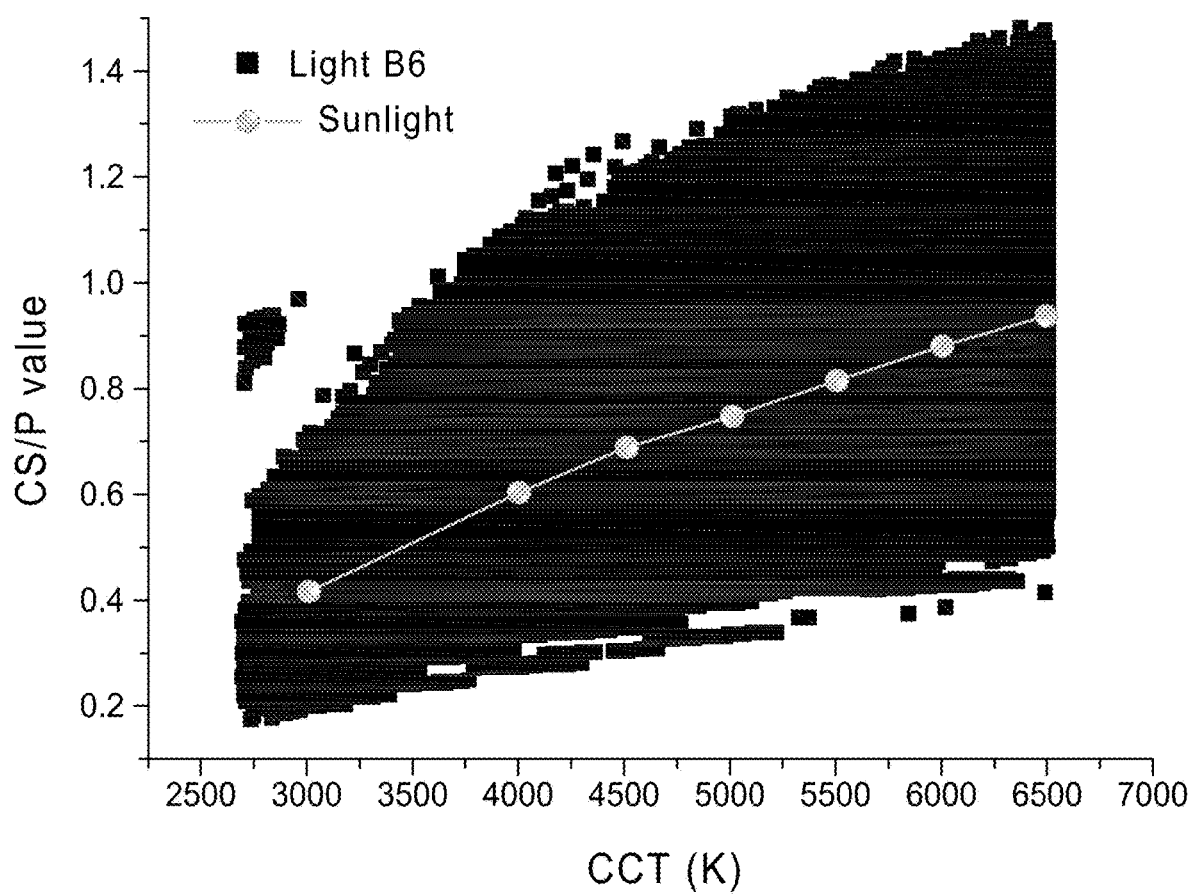
FIG. 21B is a graph of the circadian action factor vs. correlated color temperature of light emitted from the light-emitting module in FIG. 20.
Figure 21C:
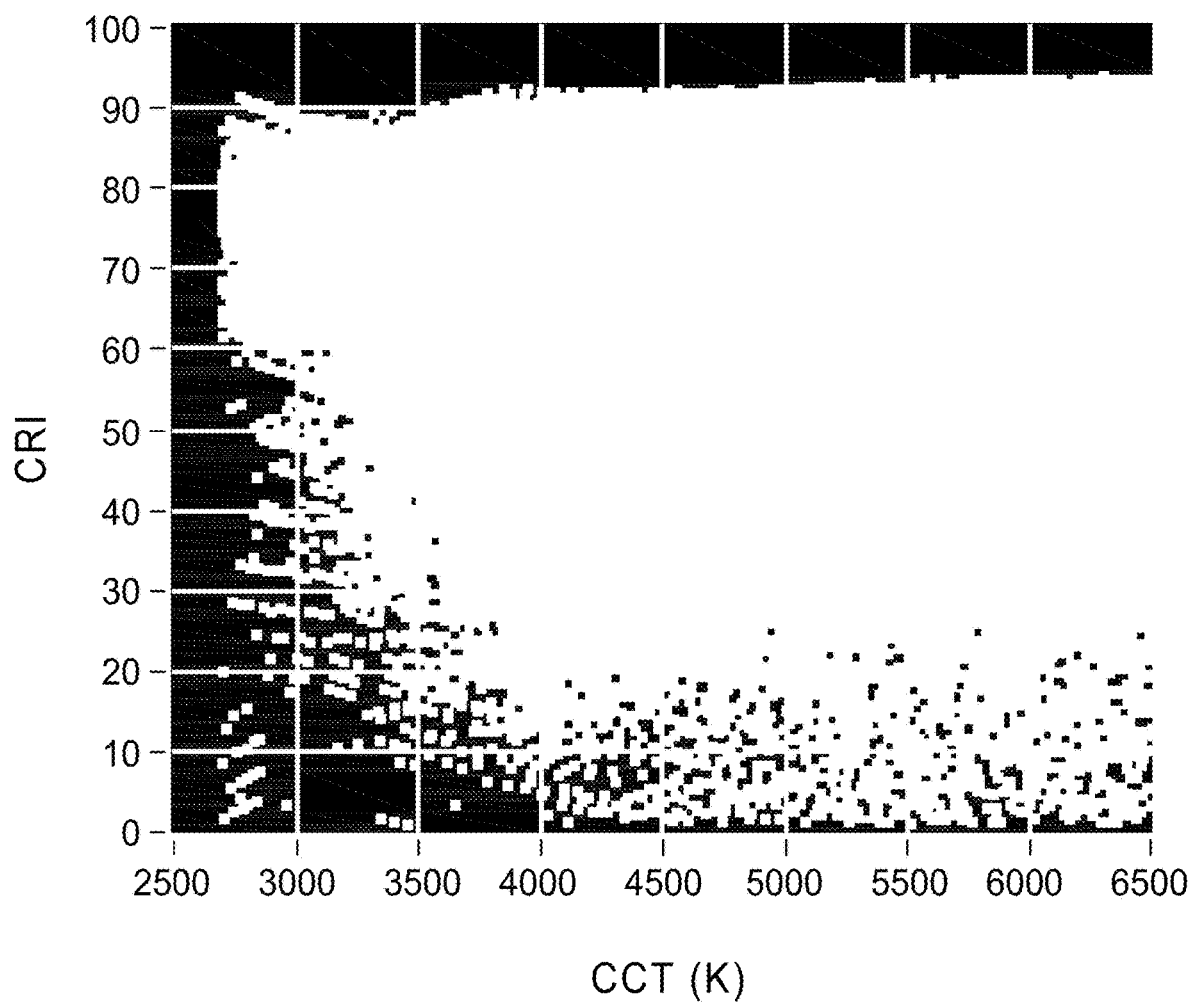
FIG. 21C is a graph of the color rendering index vs. correlated color temperature of light emitted from the light-emitting module in FIG. 20.

FIG. 20 is a schematic diagram of a light source apparatus in another embodiment of the disclosure, FIG. 21A is spectra of sub-lights emitted by light-emitters in FIG. 20, and FIG. 21B is a graph of the circadian action factor vs. correlated color temperature of light emitted from the light-emitting module in FIG. 20. FIG. 21C is a graph of the color rendering index vs. correlated color temperature of light emitted from the light-emitting module in FIG. 20, wherein the white square dots show the color rendering indices and the corresponding correlated color temperatures of light B6 emitted from the light-emitting module in FIG. 20. Referring to FIGS. 20 and 21A to 21C, the light source apparatus 600b in this embodiment is similar to the light source apparatus 600a in FIG. 17, and the main difference therebetween is as follows. In this embodiment, a light emitter E1b is used to replace the light emitter E1a in FIG. 17. The light emitter E1b is, for example, a light-emitting diode chip, and the peak wavelength of the sub-light V1b emitted by the light emitter E1a falls within the range of 550 nm to 560 nm. The FWHM of the sub-light V1b is, for example, 28 nm.

The control unit 620 is configured to change the proportions of intensities of the sub-lights V1b, V2a, V3a, V4a, V5a, V6a, and V7a by changing the currents or voltages respectively applied to the light-emitters E1b, E2a, E3a, E4a, E5a, E6a, and E7a, so that the light B6 may be switched among a plurality of kinds of first light, a plurality of kinds of second light, a plurality of kinds of third light, and a plurality of kinds of fourth light. In this embodiment, the proportions of the sub-lights V1b, V2a, V3a, V4a, V5a, V6a, and V7a are changed by pulse width modulation of the light emitters E1b, E2a, E3a, E4a, E5a, E6a, and E7a. For example, when the CS/P value of the light B6 is 0.4 as shown in FIG. 21B, the CCT of the light B6 may be modulated from 2700K to 6500K by the control unit 620 executing pulse width modulation. When the CRI of the light B6 is 90, the CCT of the light B6 may be modulated from 2700K to 6500K by the control unit 620 executing pulse width modulation. In addition, when the CCT of the light B6 is 6000 K, the CS/P value of the light B6 may be modulated from 0.4 to 1.4 by the control unit 620 executing pulse width modulation. When the CCT of the light B6 is 6000 K, the CRI of the light B6 may be modulated from 1 to 92 by the control unit 620 executing pulse width modulation. In this embodiment, each of Duv values of the plurality of kinds of first light, the plurality of kinds of second light, the plurality of kinds of third light, and the plurality of kinds of fourth light is less than 0.005.

Figure 22A:
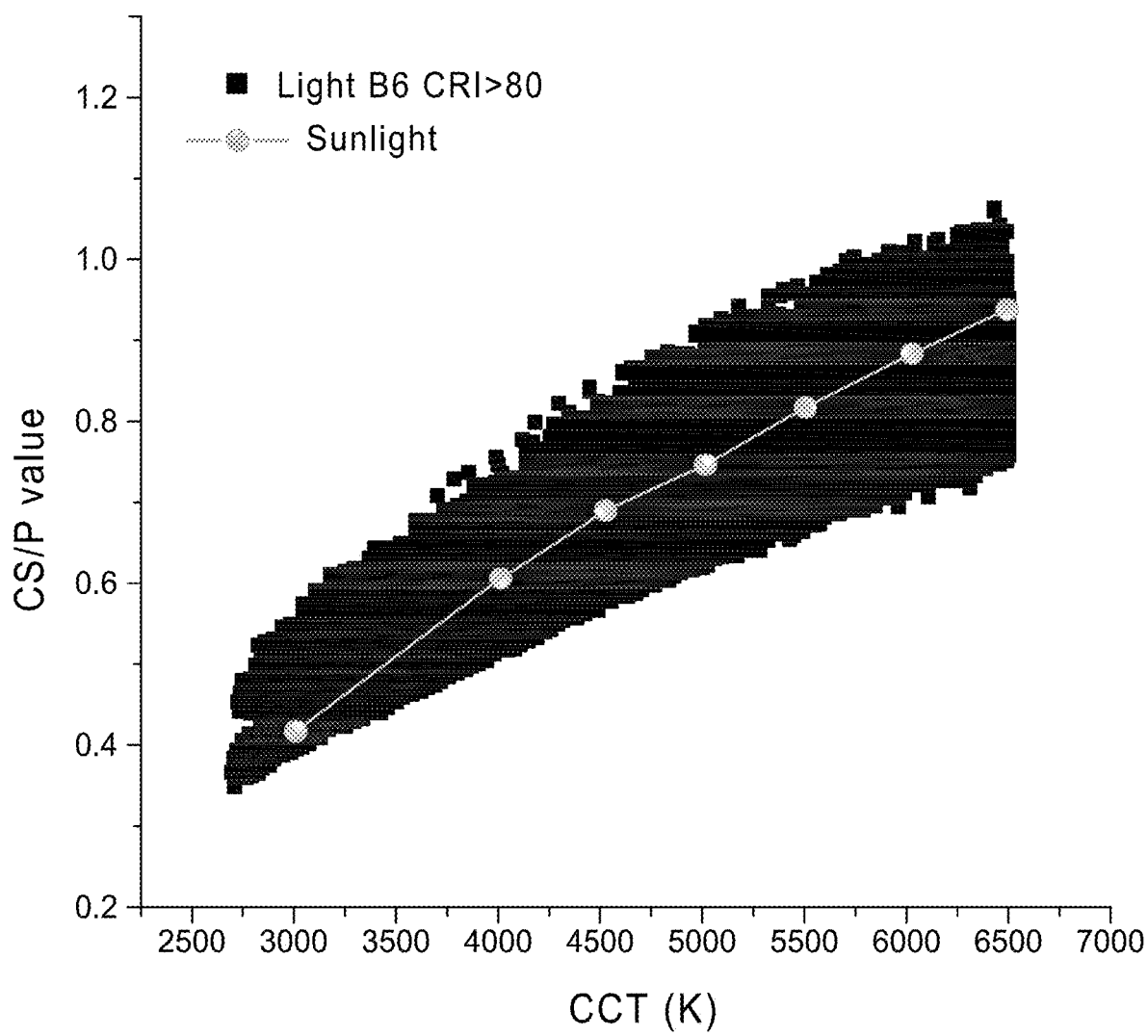
FIGS. 22A and 22B are graphs of the circadian action factor vs. correlated color temperature of light emitted from the light-emitting module in FIG. 20 respectively when the CRIs thereof are greater than 80 and 90.
Figure 22B:
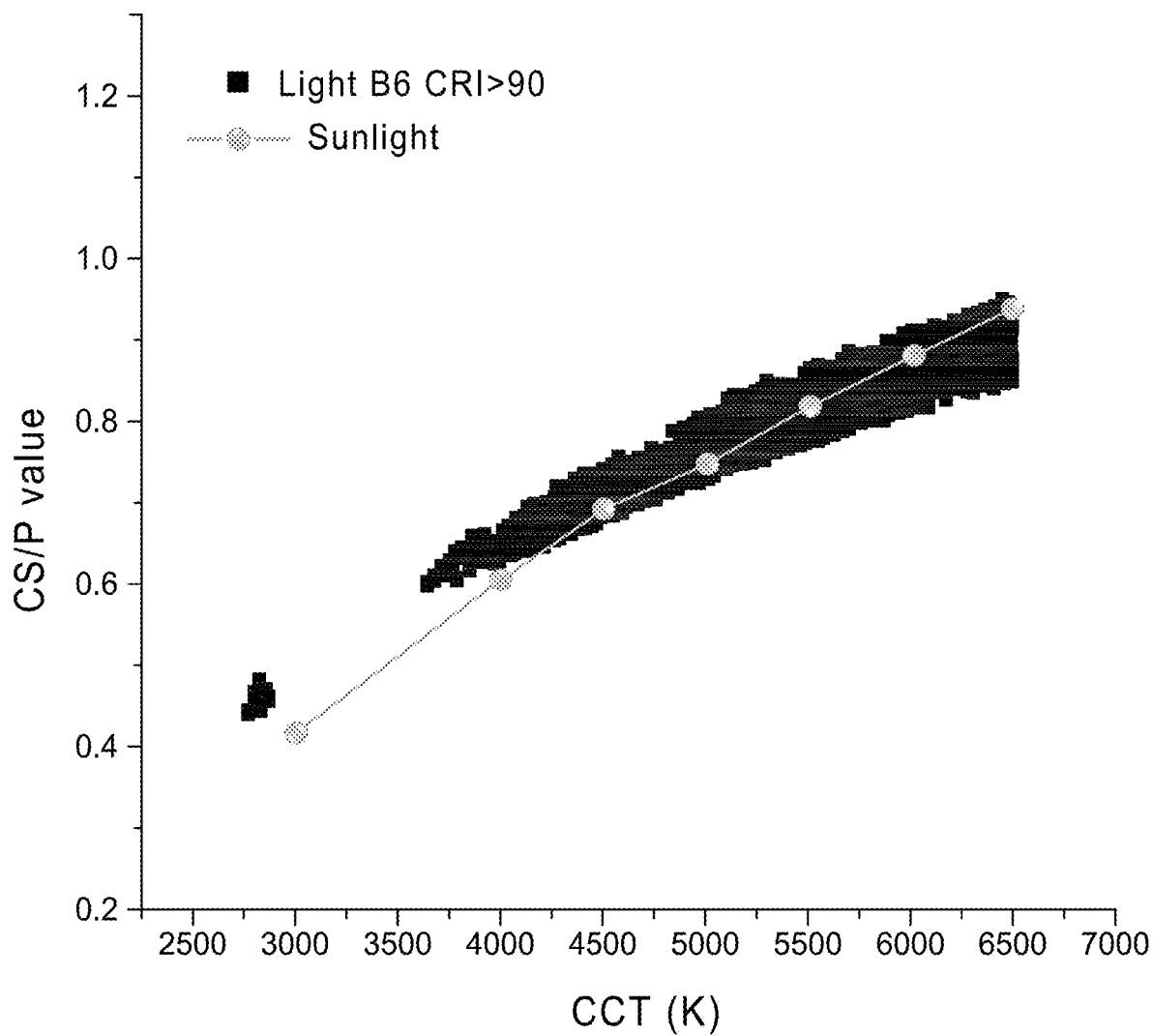

FIGS. 22A and 22B are graphs of the circadian action factor vs. correlated color temperature of light emitted from the light-emitting module in FIG. 20 respectively when the CRIs thereof are greater than 80 and 90. Referring to FIGS. 20, 21B, 22A, and 22B, the control unit 620 may also make the light B6 emitted from the light-emitting module 610b switched among a plurality of kinds of fourth light, circadian action factors (i.e. CS/P values) of the plurality of kinds of fourth light cover or are substantially the same as circadian action factors of sunlight within a correlated color temperature range, wherein the correlated color temperature range is, for example, a range of 3000 K to 6500 K. The gray round dots and the gray line in FIGS. 21B, 22A, and 22B show the circadian action factors respectively corresponding to CCTs of sunlight, and all the black square dots in FIGS. 21B, 22A, and 22B show the circadian action factors respectively corresponding to CCTs of the plurality of kinds of fourth light. In FIGS. 21B and 22A, the circadian action factors (i.e. CS/P values) of the plurality of kinds of fourth light cover the circadian action factors of sunlight within the correlated color temperature range, e.g. a CCT range from 3000 K to 6500 K. Besides, in FIG. 22B, the circadian action factors (i.e. CS/P values) of the plurality of kinds of fourth light are substantially the same as the circadian action factors of sunlight within the correlated color temperature range, e.g. a CCT range from 3000 K to 6500 K, wherein That "the circadian action factors (i.e. CS/P values) of the plurality of kinds of fourth light are substantially the same as the circadian action factors of sunlight" means that the deviations of the circadian action factors of the plurality of kinds of fourth light from the circadian action factors of sunlight at corresponding CCTs are respectively within ±20% of the circadian action factors at the corresponding CCTs, preferably within ±10% of the circadian action factors at the corresponding CCTs.

Figure 23:
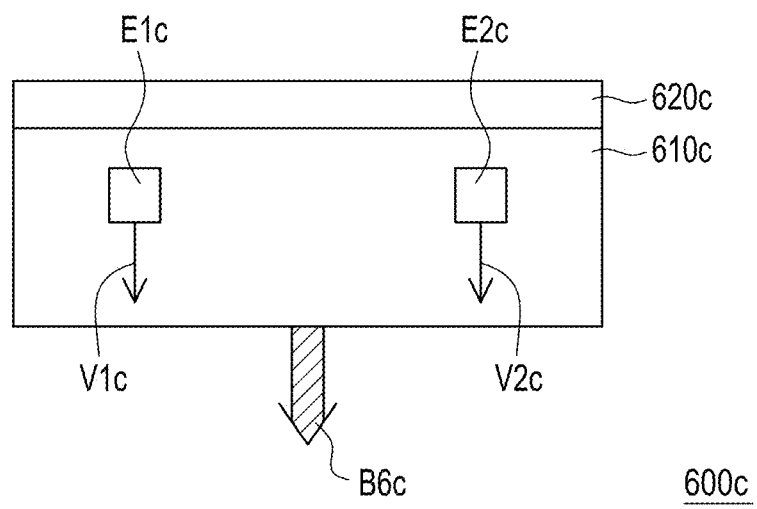
FIG. 23 is a schematic diagram of a light source apparatus in another embodiment of the disclosure.
Figure 24A:
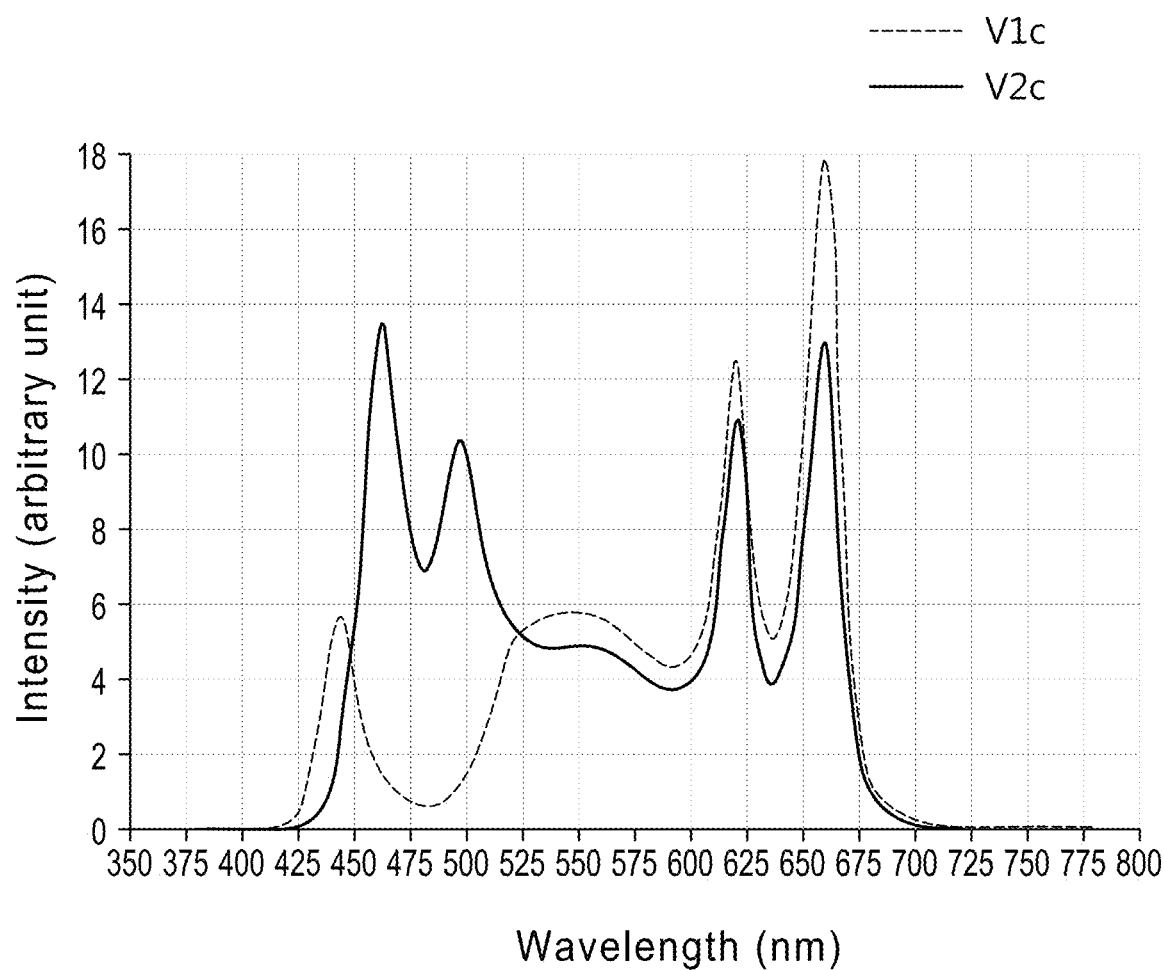
FIGS. 24A-24D are spectra of sub-lights emitted by light-emitters in FIG. 23 in four embodiments.
Figure 24B:
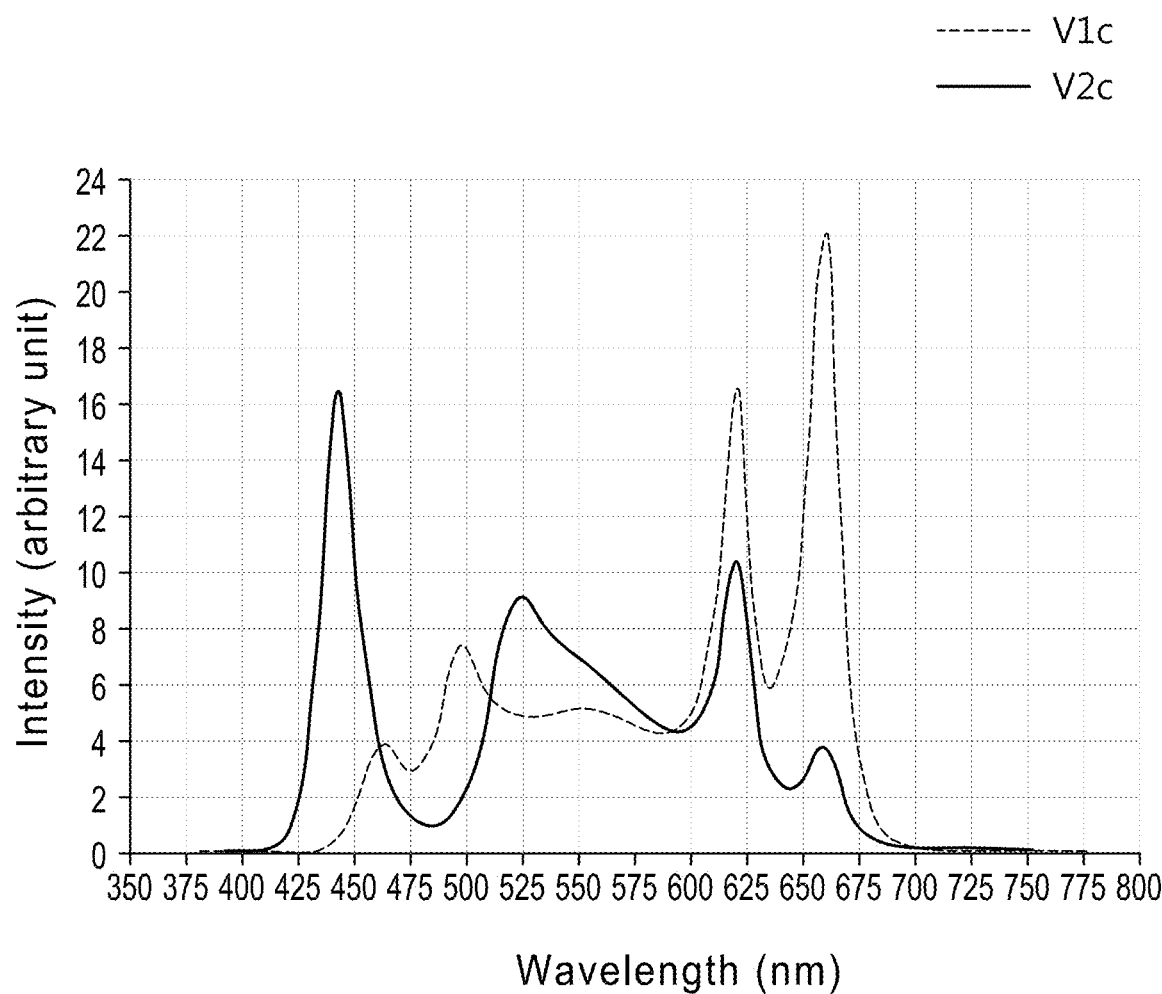
Figure 24C:
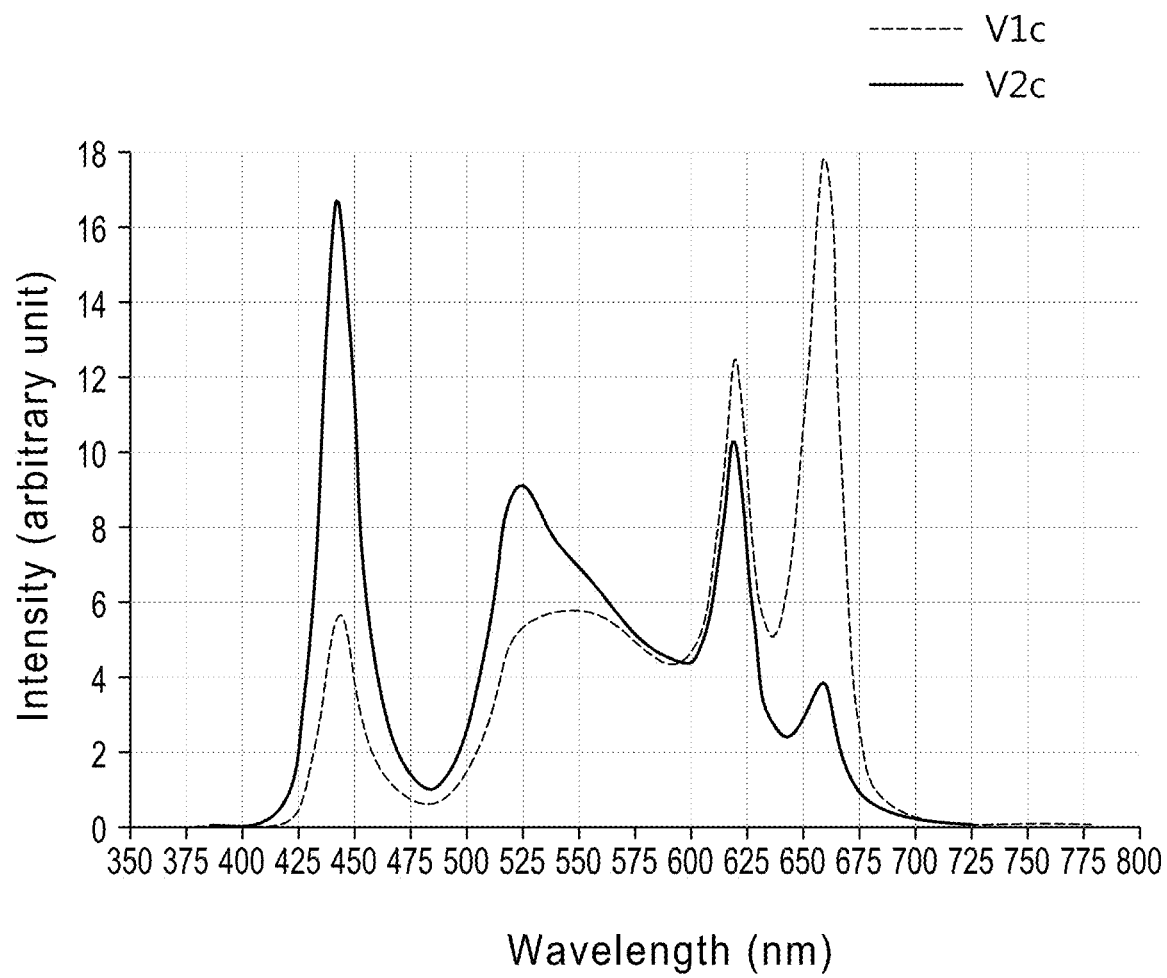
Figure 24D:
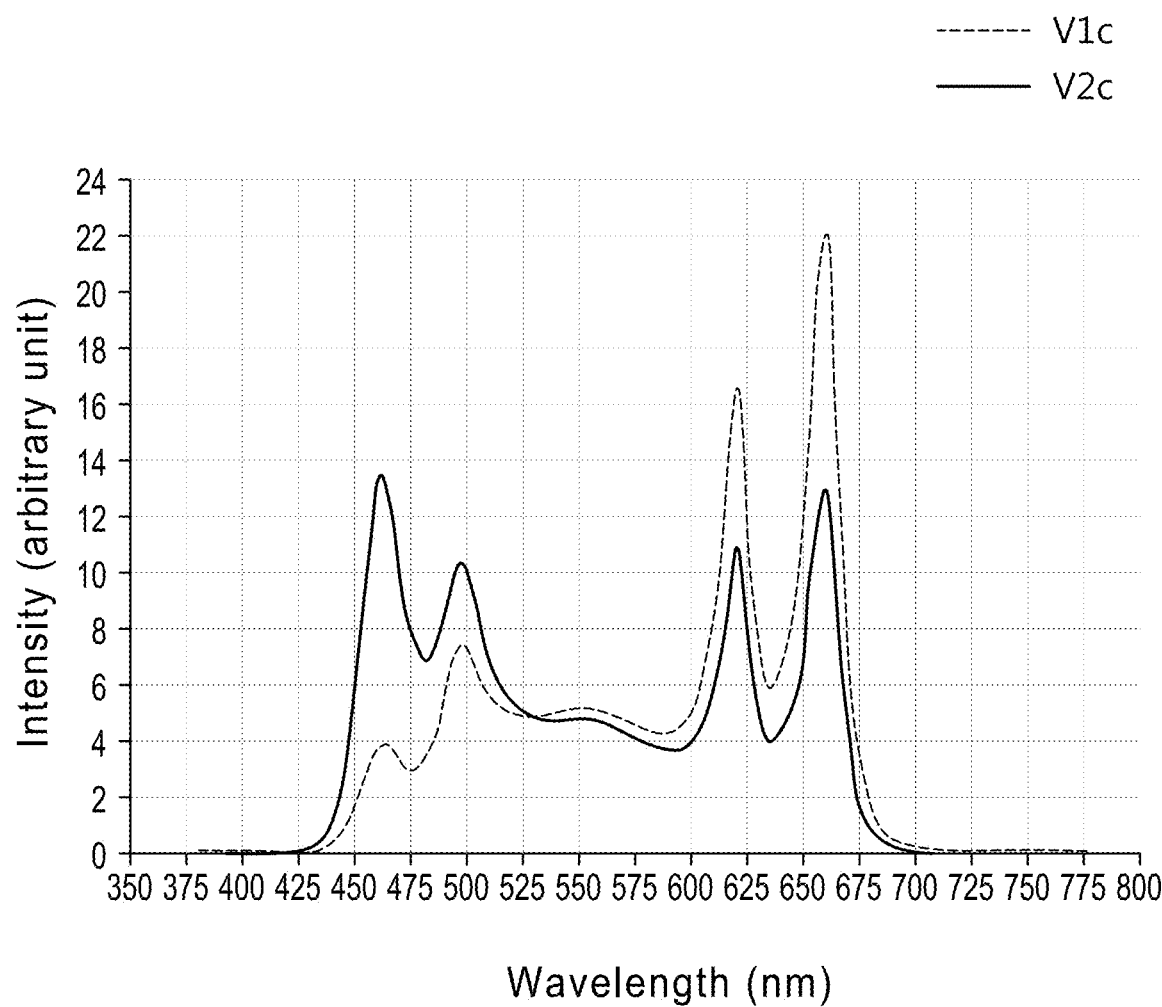
Figure 25A:
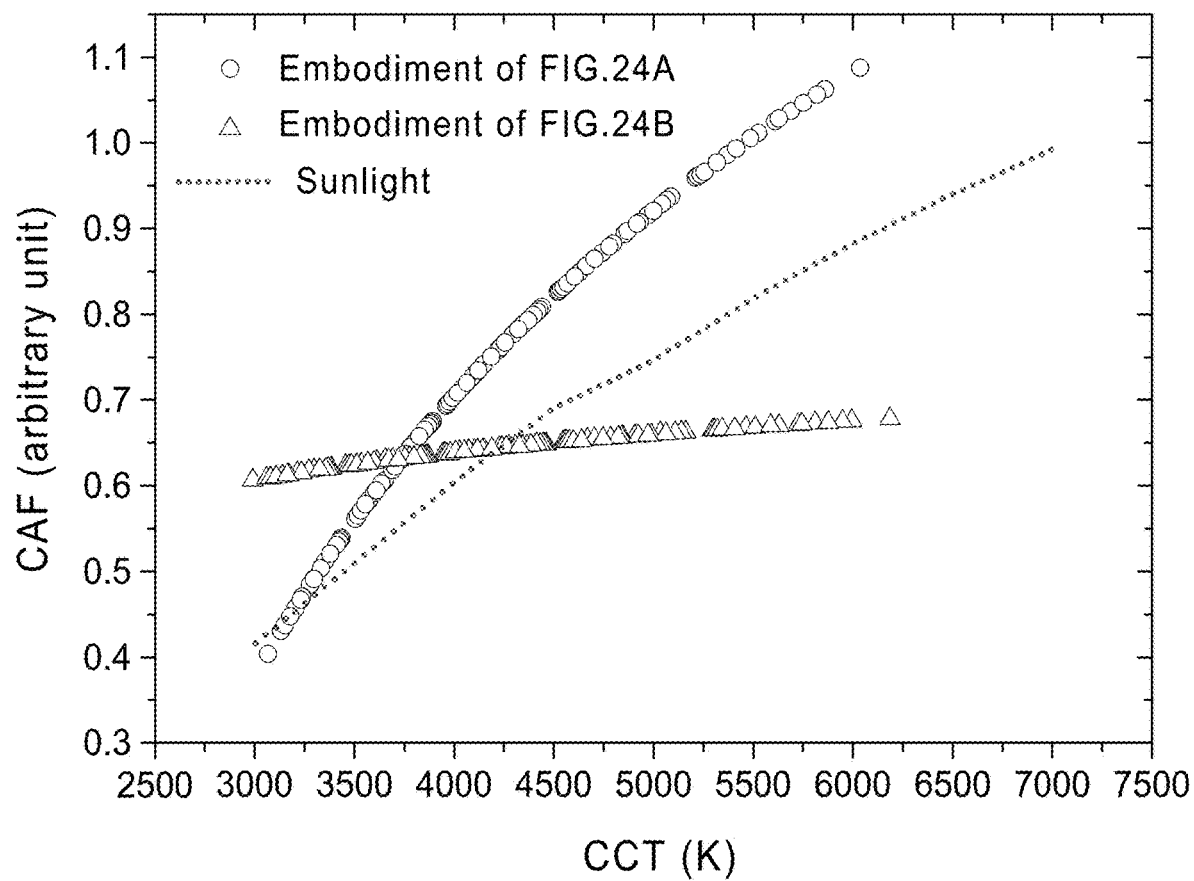
FIGS. 25A and 25B are graphs of the CAF vs. CCT of the light emitted from the light-emitting module in FIG. 23 and sunlight.
Figure 25B:
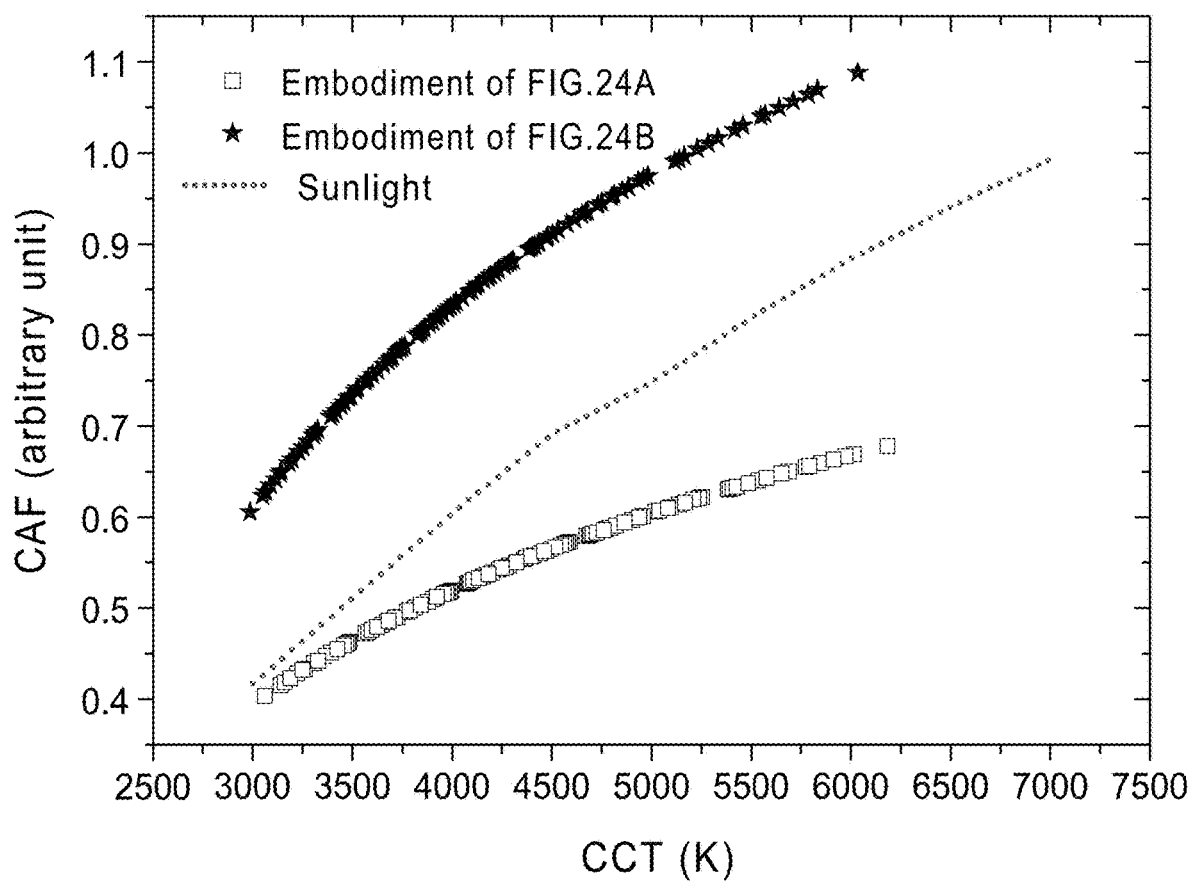

FIG. 23 is a schematic diagram of a light source apparatus in another embodiment of the disclosure, FIGS. 24A-24D are spectra of sub-lights emitted by light-emitters in FIG. 23 in four embodiments, and FIGS. 25A and 25B are graphs of the CAF vs. CCT of the light emitted from the light-emitting module in FIG. 23 and sunlight. Referring to FIGS. 23-25B, the light source apparatus 600c in this embodiment includes a light-emitting module 610c and a control unit 620c. The light-emitting module 610c is configured to provide a light B6c. The control unit 620c is configured to change proportion of a first sub-light V1c and a second sub-light V2c to form the light B6c so that a CAF and a CCT of the light varies along a CAF vs. CCT locus of the light B6c (e.g. the curve formed by triangles or circles in FIG. 25A) different from a CAF vs. CCT locus of sunlight (i.e. the dotted curve in FIG. 25A), wherein a CAF vs. CCT coordinate of one of the first sub-light V1c and the second sub-light V2c is below the CAF vs. CCT locus of sunlight, and a CAF vs. CCT coordinate of the other one of the first sub-light V1c and the second sub-light V2c is above the CAF vs. CCT locus of sunlight. For example, the CCT of the first sub-light V1c is less than that of the second sub-light V2c, the CAF vs. CCT coordinate of the left end of the curve formed by triangles in FIG. 25A means the CAF vs. CCT coordinate of the first sub-light V1c and is above the CAF vs. CCT locus of sunlight, and the CAF vs. CCT coordinate of the right end of the curve formed by triangles in FIG. 25A means the CAF vs. CCT coordinate of the second sub-light V2c and is below the CAF vs. CCT locus of sunlight. In another embodiment, the CAF vs. CCT coordinate of the left end of the curve formed by circles in FIG. 25A means the CAF vs. CCT coordinate of the first sub-light V1c and is below the CAF vs. CCT locus of sunlight, and the CAF vs. CCT coordinate of the right end of the curve formed by circles in FIG. 25A means the CAF vs. CCT coordinate of the second sub-light V2c and is above the CAF vs. CCT locus of sunlight.

In this embodiment, the light-emitting module 610c includes a plurality of light emitters E1c and E2c respectively emitting the first sub-light V1c and the second sub-light V2c. Each of the light emitters E1c and E2c may include at least one electroluminescent light-emitting element, at least one light-induced light-emitting element or a combination thereof. The electroluminescent light-emitting element is, for example, a light-emitting diode (LED) chip, and the light-induced light-emitting element is, for example, phosphor. In this embodiment, the first sub-light V1c and the second sub-light V2c may be white lights. The light emitter E1c may include a plurality of different color LED chips, e.g. a red LED chip, a green LED chip, and a blue LED chip, or at least one LED chip with at least one kind of phosphor, e.g. a blue LED chip wrapped by yellow phosphor. Similarly, the light emitter E2c may include a plurality of different color LED chips, e.g. a red LED chip, a green LED chip, and a blue LED chip, or at least one LED chip with phosphor, e.g. a blue LED chip wrapped by yellow phosphor. FIG. 24A shows the spectra of the first sub-light V1c and the second sub-light V2c in an embodiment, and FIG. 24B shows the spectra of the first sub-light V1c and the second sub-light V2c in another embodiment. In the embodiment of FIG. 24A, a CAF vs. CCT coordinate of the first sub-light V1c (i.e. the coordinate of the left end of the curve formed by circles in FIG. 25A) is below the CAF vs. CCT locus of sunlight, and a CAF vs. CCT coordinate of the second sub-light V2c (i.e. the coordinate of the right end of the curve formed by circles in FIG. 25A) is above the CAF vs. CCT locus of sunlight. Therefore, the light B6c may be adjusted to have a low CCT and a low CAF with respect to sunlight so as to maintain the natural circadian rhythm of the user especially at night, and may be adjusted to have a high CCT and a high CAF with respect to sunlight so as to stimulate the work of the user.

On the other hand, in the embodiment of FIG. 24B, a CAF vs. CCT coordinate of the first sub-light V1c (i.e. the coordinate of the left end of the curve formed by triangles in FIG. 25A) is above the CAF vs. CCT locus of sunlight, and a CAF vs. CCT coordinate of the second sub-light V2c (i.e. the coordinate of the right end of the curve formed by triangles in FIG. 25A) is below the CAF vs. CCT locus of sunlight. Therefore, the light B6c may be adjusted to have a low CCT and a high CAF with respect to sunlight so as to stimulate the work of the user at the low CCT, and may be adjusted to have a high CCT and a low CAF with respect to sunlight so as to maintain the natural circadian rhythm of the user at the high CCT.

FIG. 24C and FIG. 24D show the spectra of the first sub-light V1c and the second sub-light V2c in other two embodiments. In the embodiment of FIG. 24C, a CAF vs. CCT coordinate of the first sub-light V1c (i.e. the coordinate of the left end of the curve formed by squares in FIG. 25B) is below the CAF vs. CCT locus of sunlight, and a CAF vs. CCT coordinate of the second sub-light V2c (i.e. the coordinate of the right end of the curve formed by squares in FIG. 25B) is also below the CAF vs. CCT locus of sunlight. Therefore, the light B6c always has a low CAF with respect to sunlight when the CCT thereof is adjusted, so as to always maintain the natural circadian rhythm of the user.

On the other hand, in the embodiment of FIG. 24D, a CAF vs. CCT coordinate of the first sub-light V1c (i.e. the coordinate of the left end of the curve formed by stars in FIG. 25B) is above the CAF vs. CCT locus of sunlight, and a CAF vs. CCT coordinate of the second sub-light V2c (i.e. the coordinate of the right end of the curve formed by stars in FIG. 25B) is also above the CAF vs. CCT locus of sunlight. Therefore, the light B6c always has a high CAF with respect to sunlight when the CCT thereof is adjusted, so as to always stimulate the work of the user.

The following Table 3 shows the optical data corresponding to different proportions of the first sub-light V1c and the second sub-light V2c.

TABLE 3

| PWM 1 | PWM 2 | x | y | CCT | CAF | Duv | CRI |
|---|---|---|---|---|---|---|---|
| 10 | 0 | 0.430 | 0.397 | 3061 | 0.40 | 0.003 | 84 |
| 10 | 30 | 0.364 | 0.358 | 4387 | 0.56 | 0.005 | 83 |
| 70 | 180 | 0.345 | 0.348 | 5000 | 0.60 | 0.002 | 81 |
| 10 | 250 | 0.322 | 0.334 | 6017 | 0.67 | 0.002 | 80 |

In Table 3, the ratio of PWM 1 to PWM 2 means the ratio of the duty cycles of pulse width modulation (PWM) of the light emitters E1c and E2c, which is related to the ratio of intensities of the first sub-light V1c and the second sub-light V2c. Moreover, x and y in Table 2 means x and y chromaticity coordinates in the CIE 1931 color space chromaticity diagram.

Figure 26:
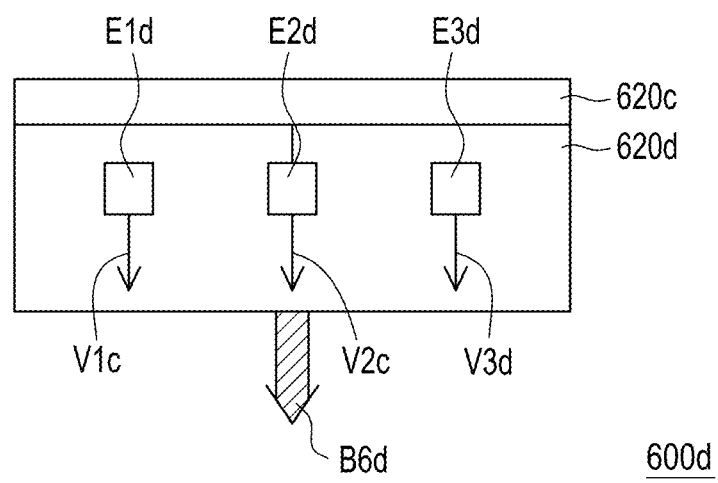
FIG. 26 is a schematic diagram of a light source apparatus in another embodiment of the disclosure.
Figure 27A:
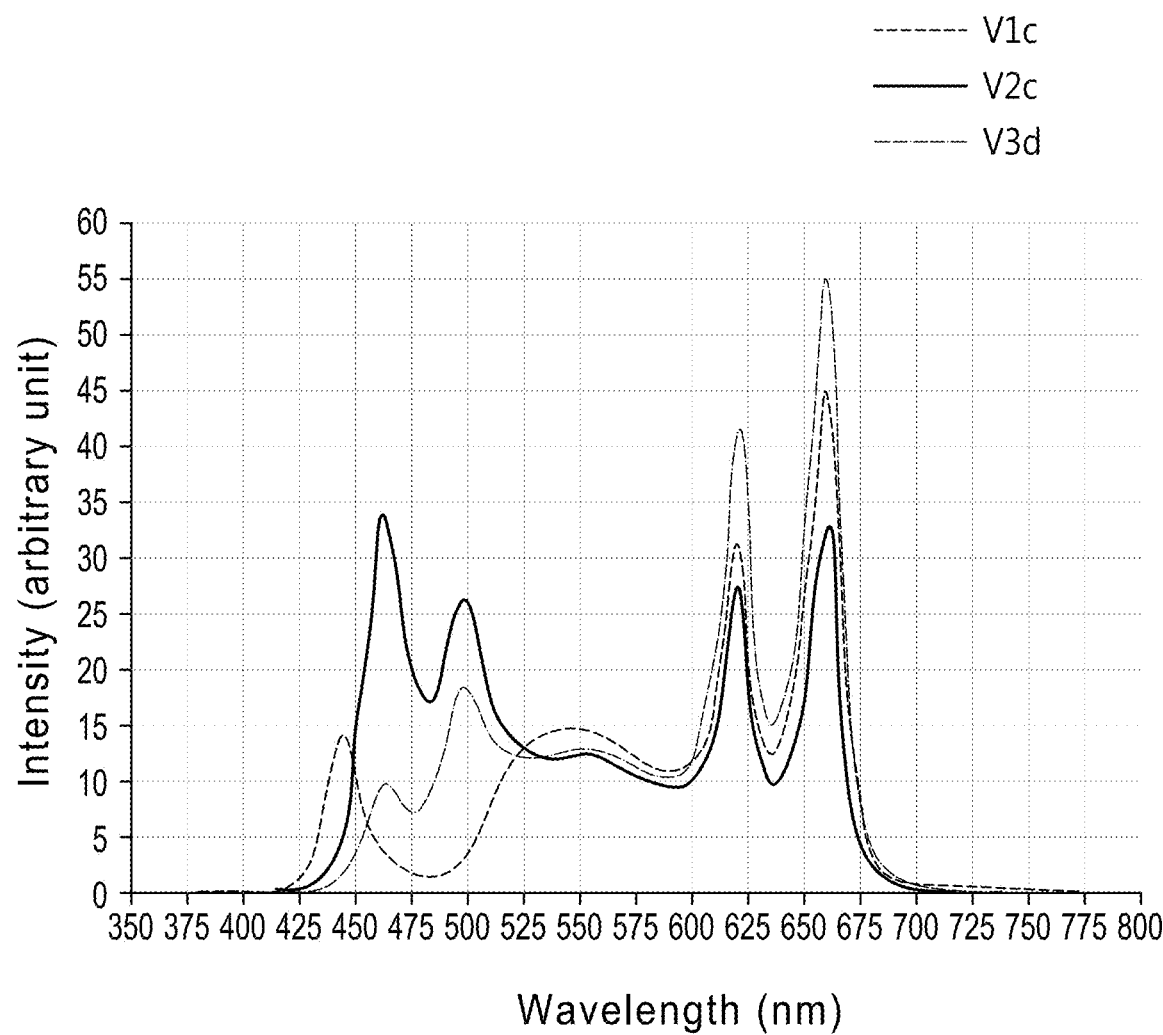
FIGS. 27A and 27B are spectra of sub-lights emitted by light-emitters in FIG. 26 in two embodiments.
Figure 27B:
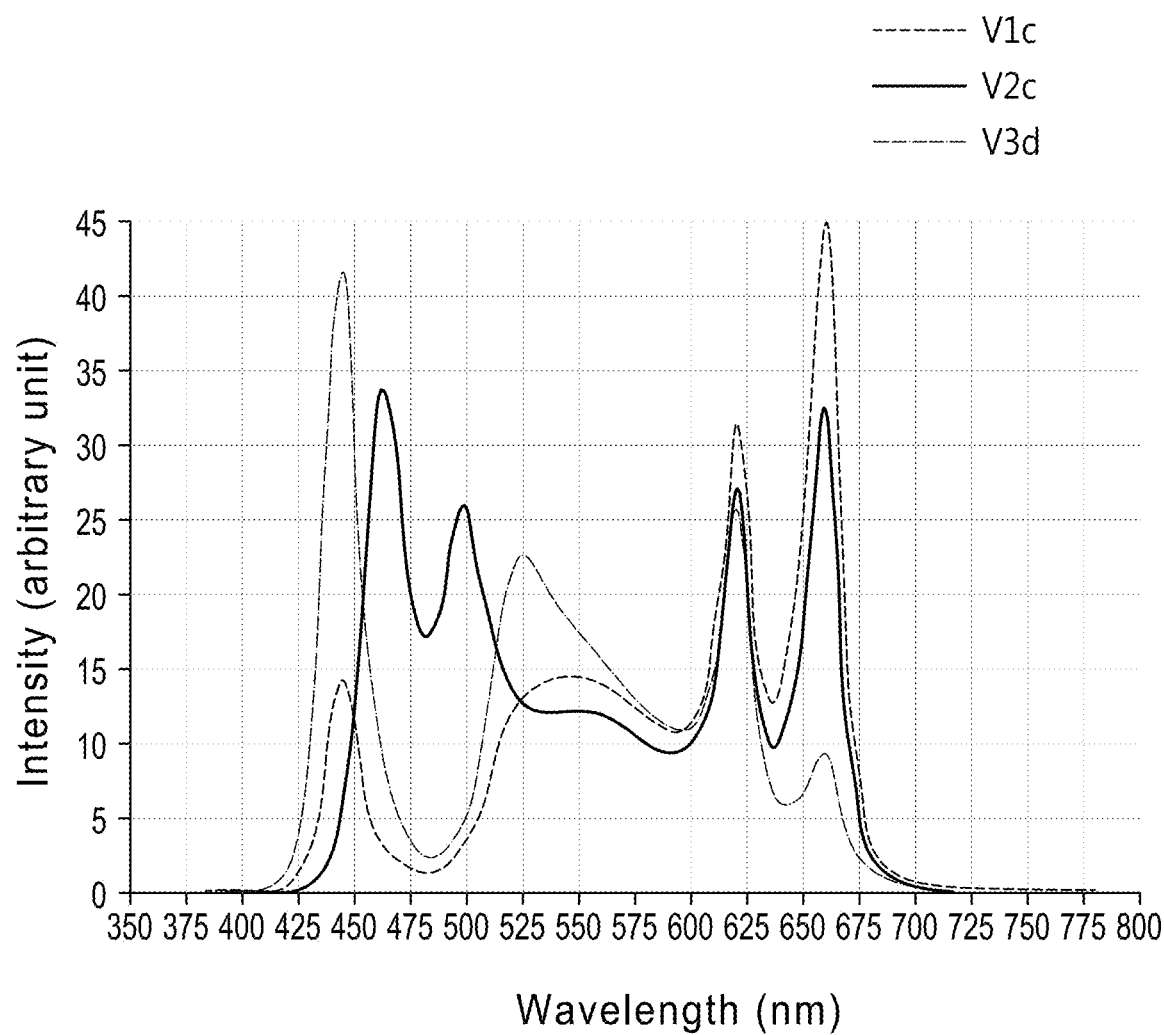
Figure 28A:
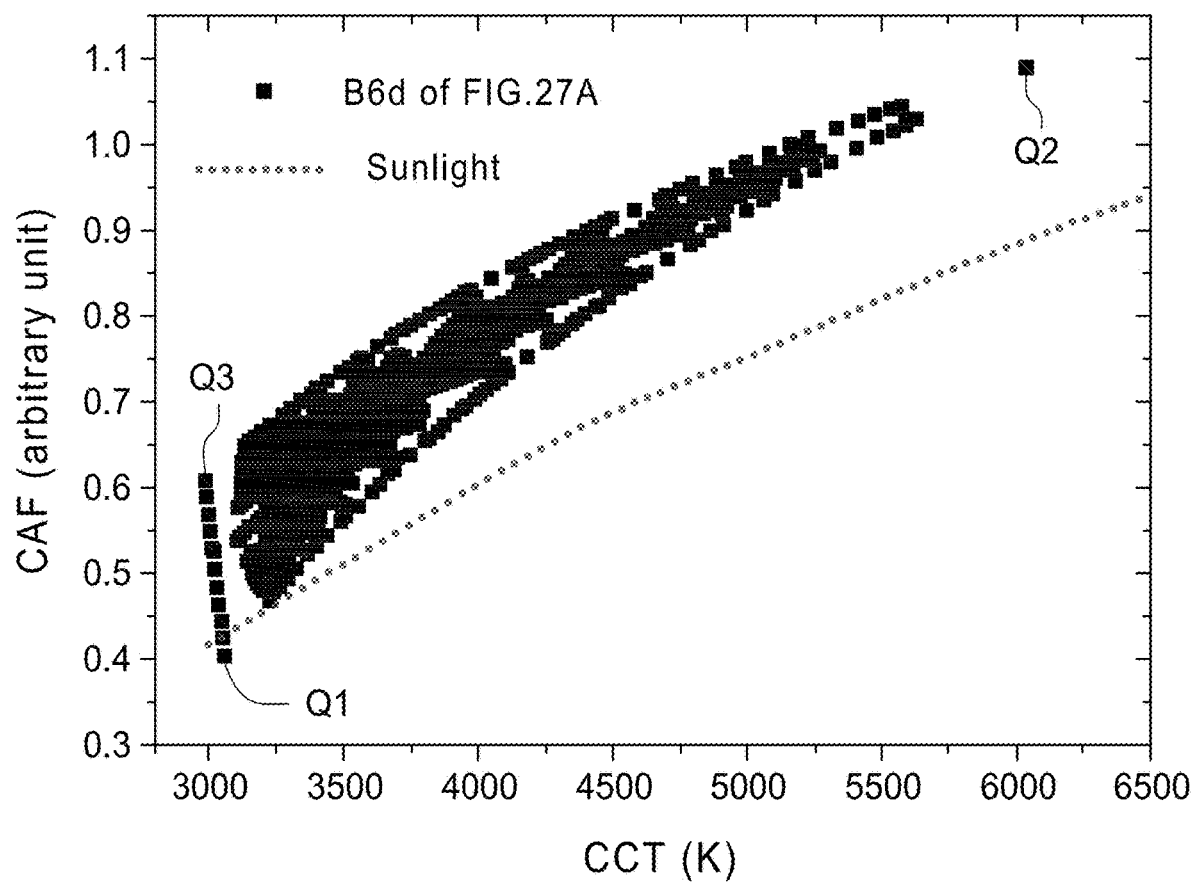
FIGS. 28A and 28B are graphs of the CAF vs. CCT of the light emitted from the light-emitting module in FIG. 26 and sunlight.
Figure 28B:
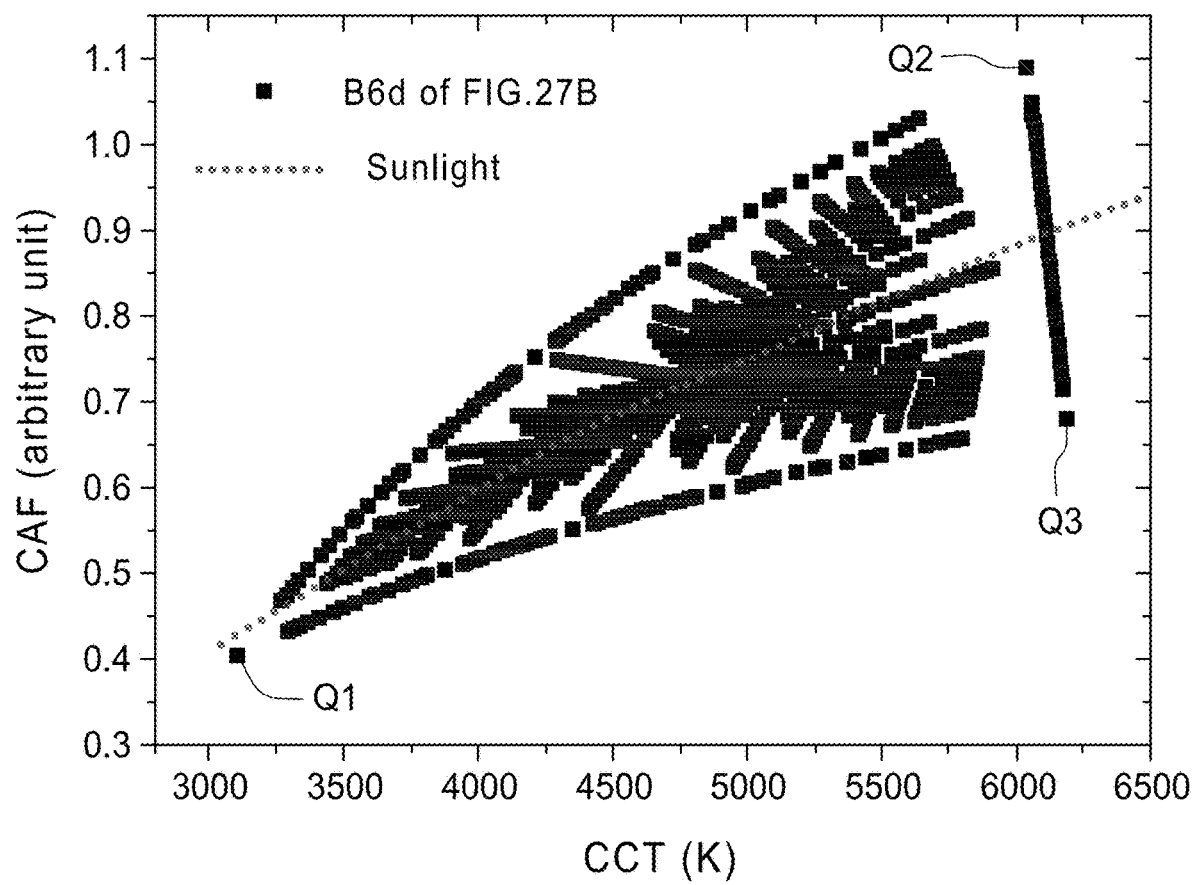

FIG. 26 is a schematic diagram of a light source apparatus in another embodiment of the disclosure, FIGS. 27A and 27B are spectra of sub-lights emitted by light-emitters in FIG. 26 in two embodiments, and FIGS. 28A and 28B are graphs of the CAF vs. CCT of the light emitted from the light-emitting module in FIG. 26 and sunlight. Referring to FIG. 26 to FIG. 28B, the light source apparatus 600d in FIG. 26 is similar to the light source apparatus 600c in FIG. 23, and the main difference therebetween is as follows. In this embodiment, the light-emitting module 610d of the light source apparatus 600d further includes a light emitter E3d emitting a third sub-light V3d. The light emitter E3d may include at least one electroluminescent light-emitting element, at least one light-induced light-emitting element or a combination thereof. The electroluminescent light-emitting element is, for example, a light-emitting diode (LED) chip, and the light-induced light-emitting element is, for example, phosphor. In this embodiment, the third sub-light V3d may be a white light. The light emitter E3d may include a plurality of different color LED chips, e.g. a red LED chip, a green LED chip, and a blue LED chip, or at least one LED chip with at least one kind of phosphor, e.g. a blue LED chip wrapped by yellow phosphor.

In this embodiment, the control unit 620c is configured to change proportion of the first sub-light V1c, the second sub-light V2c, and the third sub-light V3d to form the light B6d so that a CAF vs. CCT coordinate of the light B6d varies within an area having three vertices Q1, Q2, and Q3 respectively located at CAF vs. CCT coordinates of the first sub-light V1c, the second sub-light V2c, and the third sub-light V3d.

FIG. 27A shows the spectra of the first sub-light V1c, the second sub-light V2c, and the third sub-light V3d in an embodiment, and FIG. 27B shows the spectra of the first sub-light V1c, the second sub-light V2c, and the third sub-light V3d in another embodiment. Moreover, FIG. 28A corresponds to the embodiment of FIG. 27A, and FIG. 28B corresponds to the embodiment of FIG. 27B. In the embodiment of FIG. 27A, a CCT of the first sub-light V1c (i.e. the CCT of the vertex Q1) is less than that of the second sub-light V2c (i.e. the CCT of the vertex Q2), a CCT of the third sub-light V3d (i.e. the CCT of the vertex Q3) is less than that of the second sub-light V2c (i.e. the CCT of the vertex Q2). Moreover, the CAF vs. CCT coordinate of the first sub-light V1c (i.e. the coordinate of the vertex Q1) and the CAF vs. CCT coordinate of the third sub-light V3d (i.e. the coordinate of the vertex Q3) are respectively at two opposite sides of the CAF vs. CCT locus of sunlight. In this embodiment, the CAF vs. CCT coordinate of the first sub-light V1c (i.e. the coordinate of the vertex Q1) is below the CAF vs. CCT locus of sunlight, the CAF vs. CCT coordinate of the second sub-light V2c (i.e. the coordinate of the vertex Q2) is above the CAF vs. CCT locus of sunlight, and the CAF vs. CCT coordinate of the third sub-light V3d (i.e. the coordinate of the vertex Q3) is above the CAF vs. CCT locus of sunlight.

In the embodiment of FIG. 27B, a CCT of the first sub-light V1c (i.e. the CCT of the vertex Q1) is less than that of the second sub-light V2c (i.e. the CCT of the vertex Q2), a CCT of the third sub-light V3d (i.e. the CCT of the vertex Q3) is greater than that of the first sub-light V1c (i.e. the CCT of the vertex Q1). Moreover, the CAF vs. CCT coordinate of the second sub-light V2c (i.e. the coordinate of the vertex Q2) and the CAF vs. CCT coordinate of the third sub-light V3d (i.e. the coordinate of the vertex Q3) are respectively at two opposite sides of the CAF vs. CCT locus of sunlight. In this embodiment, the CAF vs. CCT coordinate of the first sub-light V1c (i.e. the coordinate of the vertex Q1) is below the CAF vs. CCT locus of sunlight, the CAF vs. CCT coordinate of the second sub-light V2c (i.e. the coordinate of the vertex Q2) is above the CAF vs. CCT locus of sunlight, and the CAF vs. CCT coordinate of the third sub-light V3d (i.e. the coordinate of the vertex Q3) is below the CAF vs. CCT locus of sunlight.

The following Table 4 shows the optical data corresponding to different proportions of the first sub-light V1c, the second sub-light V2c, and the third sub-light V3d.

TABLE 4

| PWM 1 | PWM 2 | PWM 3 | x | y | CCT | CAF | Duv | CRI |
|---|---|---|---|---|---|---|---|---|
| 25 | 0 | 0 | 0.430 | 0.397 | 3061 | 0.404 | 0.003 | 84 |
| 25 | 50 | 0 | 0.363 | 0.358 | 4404 | 0.557 | 0.004 | 83 |
| 100 | 100 | 175 | 0.345 | 0.344 | 5000 | 0.796 | 0.004 | 86 |
| 0 | 25 | 200 | 0.321 | 0.329 | 6074 | 0.986 | 0.001 | 80 |

In Table 4, the ratio of (PWM 1):(PWM 2):(PWM 3) means the ratio of the duty cycles of pulse width modulation (PWM) of the light emitters E1c, E2c, and E3d, which is related to the ratio of intensities of the first sub-light V1c, the second sub-light V2c, and the third sub-light V3d. Moreover, x and y in Table 4 means x and y chromaticity coordinates in the CIE 1931 color space chromaticity diagram.

Figure 29:
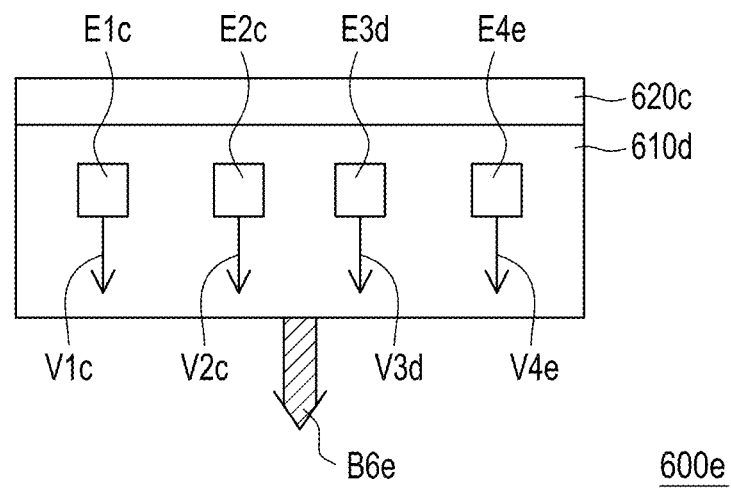
FIG. 29 is a schematic diagram of a light source apparatus in another embodiment of the disclosure.
Figure 30:
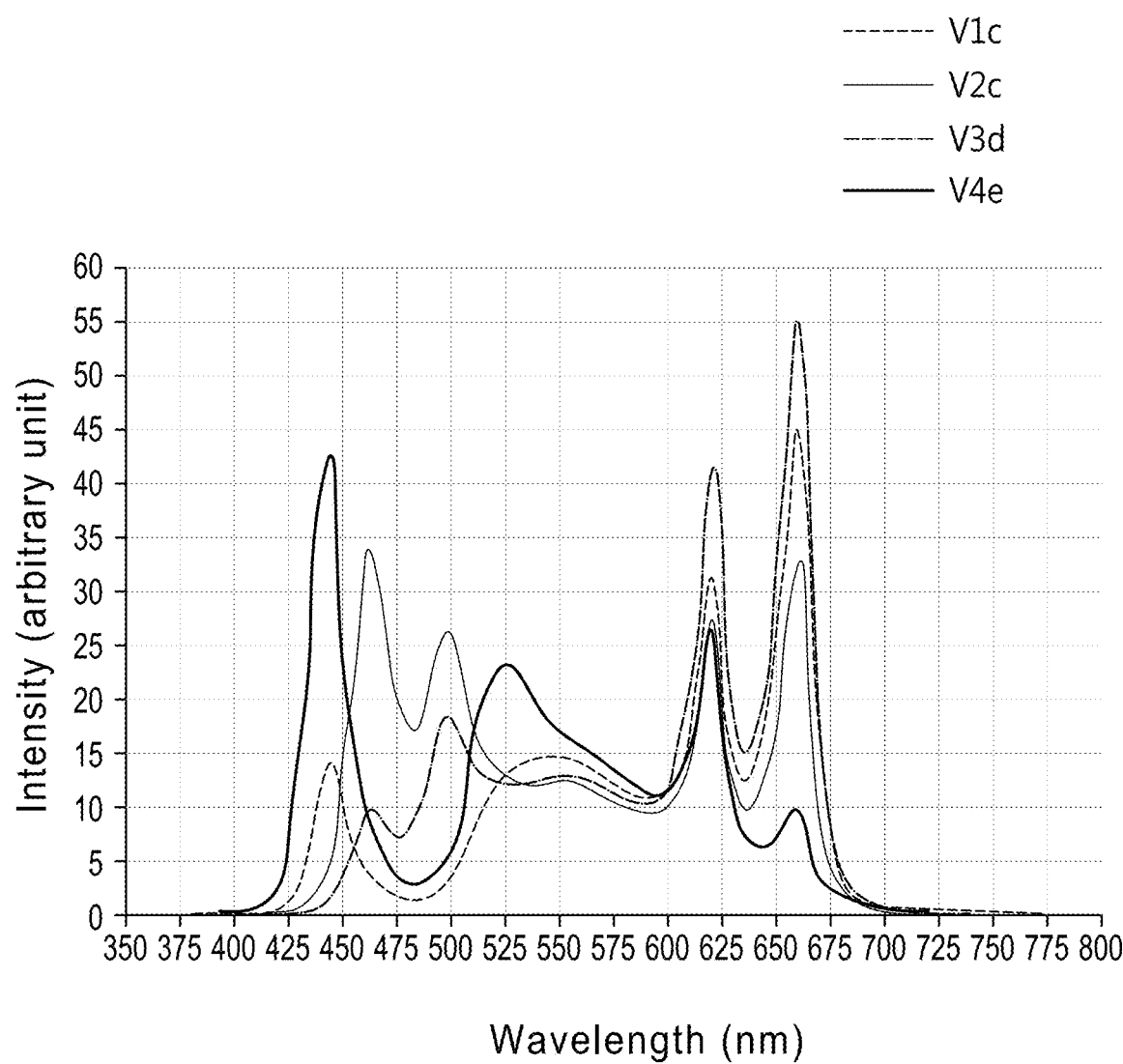
FIG. 30 are spectra of sub-lights emitted by light-emitters in FIG. 29.
Figure 31:
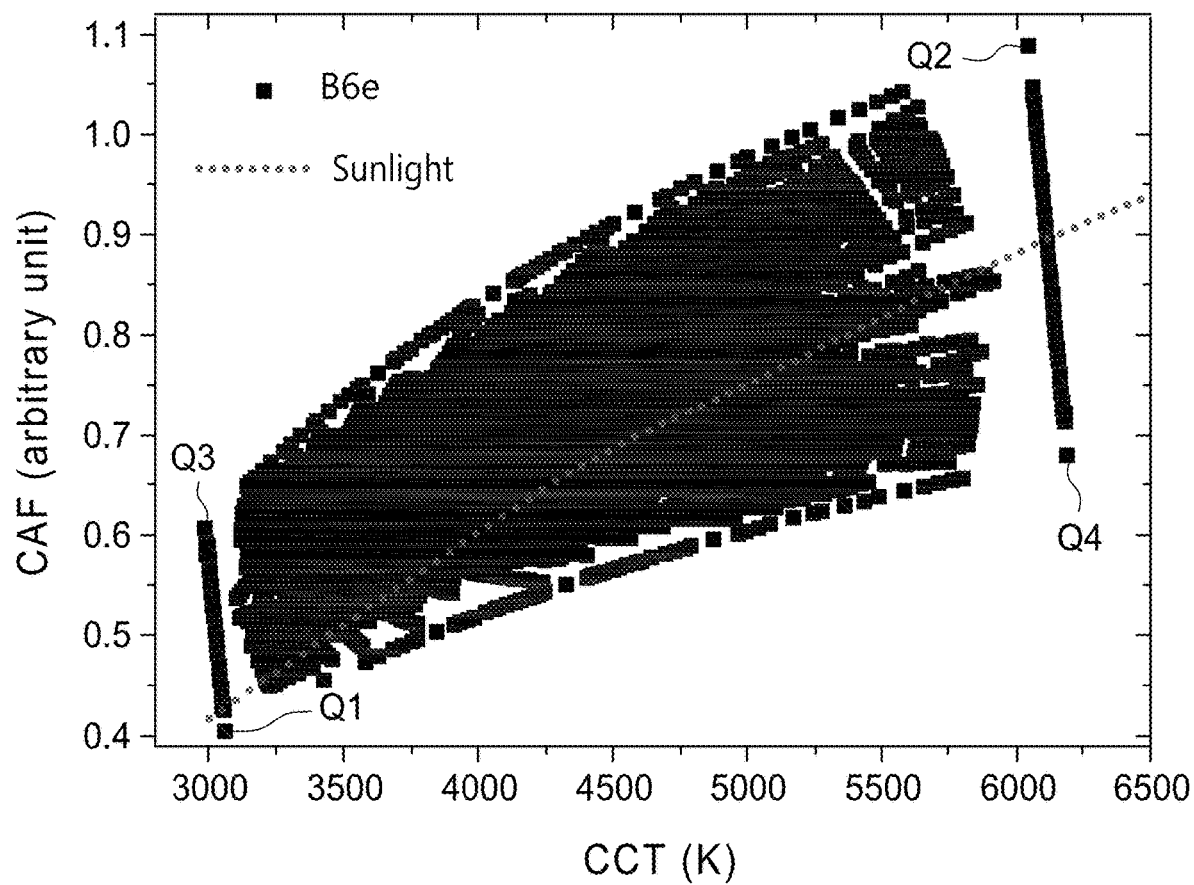
FIG. 31 is the graph of the CAF vs. CCT of the light emitted from the light-emitting module in FIG. 29 and sunlight.

FIG. 29 is a schematic diagram of a light source apparatus in another embodiment of the disclosure, FIG. 30 are spectra of sub-lights emitted by light-emitters in FIG. 29, and FIG. 31 is the graph of the CAF vs. CCT of the light emitted from the light-emitting module in FIG. 29 and sunlight. Referring to FIG. 29 to FIG. 31, the light source apparatus 600e in FIG. 29 is similar to the light source apparatus 600d in FIG. 26, and the main difference therebetween is as follows. In this embodiment, the light-emitting module 610e of the light source apparatus 600e further includes a light emitter E4e emitting a fourth sub-light V4e. The light emitter E4e may include at least one electroluminescent light-emitting element, at least one light-induced light-emitting element or a combination thereof. The electroluminescent light-emitting element is, for example, a light-emitting diode (LED) chip, and the light-induced light-emitting element is, for example, phosphor. In this embodiment, the fourth sub-light V4e may be a white light. The light emitter E4e may include a plurality of different color LED chips, e.g. a red LED chip, a green LED chip, and a blue LED chip, or at least one LED chip with at least one kind of phosphor, e.g. a blue LED chip wrapped by yellow phosphor.

In this embodiment, the control unit 620c is configured to change proportion of the first sub-light V1c, the second sub-light V2c, a third sub-light V3d, and the fourth sub-light V4e to form the light B6e so that a CAF vs. CCT coordinate of the light B6e varies within an area having fourth vertices Q1, Q2, Q3, and Q4 respectively located at CAF vs. CCT coordinates of the first sub-light V1c, the second sub-light V2c, the third sub-light V3d, and the fourth sub-light V4e.

FIG. 30 shows the spectra of the first sub-light V1c, the second sub-light V2c, and the third sub-light V3d, and the fourth sub-light V4e in FIG. 29. In this embodiment, a CCT of the first sub-light V1c (i.e. the CCT of the vertex Q1) is less than that of the second sub-light V2c (i.e. the CCT of the vertex Q2) and less than that of the fourth sub-light V4e (i.e. the CCT of the vertex Q4), and a CCT of the third sub-light V3d (i.e. the CCT of the vertex Q3) is less than that of the second sub-light V2c (i.e. the CCT of the vertex Q2) and less than that of the fourth sub-light V4e (i.e. the CCT of the vertex Q4). The CAF vs. CCT coordinate of the first sub-light V1c (i.e. the coordinate of the vertex Q1) and the CAF vs. CCT coordinate of the third sub-light V3d (i.e. the coordinate of the vertex Q3) are respectively at two opposite sides of the CAF vs. CCT locus of sunlight, and the CAF vs. CCT coordinate of the second sub-light V2c (i.e. the coordinate of the vertex Q2) and the CAF vs. CCT coordinate of the fourth sub-light V4e (i.e. the coordinate of the vertex Q4) are respectively at two opposite sides of the CAF vs. CCT locus of sunlight. In this embodiment, the CAF vs. CCT coordinate of the first sub-light V1c (i.e. the coordinate of the vertex Q1) is below the CAF vs. CCT locus of sunlight, the CAF vs. CCT coordinate of the second sub-light V2c (i.e. the coordinate of the vertex Q2) is above the CAF vs. CCT locus of sunlight, the CAF vs. CCT coordinate of the third sub-light V3d (i.e. the coordinate of the vertex Q3) is above the CAF vs. CCT locus of sunlight, and the CAF vs. CCT coordinate of the fourth sub-light V4e (i.e. the coordinate of the vertex Q4) is below the CAF vs. CCT locus of sunlight.

The following Table 5 shows the optical data corresponding to different proportions of the first sub-light V1c, the second sub-light V2c, the third sub-light V3d, and the fourth sub-light V4e.

TABLE 5

| PWM 1 | PWM 2 | PWM 3 | PWM 4 | x | y | CCT | CAF | Duv | CRI |
|---|---|---|---|---|---|---|---|---|---|
| 100 | 150 | 0 | 0 | 0.436 | 0.403 | 3015 | 0.53 | 0.001 | 80 |
| 25 | 225 | 200 | 100 | 0.379 | 0.368 | 4001 | 0.67 | 0.005 | 83 |

TABLE 5-continued

| PWM 1 | PWM 2 | PWM 3 | PWM 4 | x | y | CCT | CAF | Duv | CRI |
|---|---|---|---|---|---|---|---|---|---|
| 100 | 200 | 250 | 200 | 0.345 | 0.347 | 5000 | 0.72 | 0.003 | 87 |
| 0 | 0 | 25 | 200 | 0.321 | 0.329 | 6074 | 0.99 | 0.001 | 80 |

In Table 5, the ratio of (PWM 1):(PWM 2):(PWM 3):(PWM 4) means the ratio of the duty cycles of pulse width modulation (PWM) of the light emitters E1c, E2c, E3d, and E4e which is related to the ratio of intensities of the first sub-light V1c, the second sub-light V2c, the third sub-light V3d, and the fourth sub-light V4e. Moreover, x and y in Table 4 means x and y chromaticity coordinates in the CIE 1931 color space chromaticity diagram.

Figure 32:
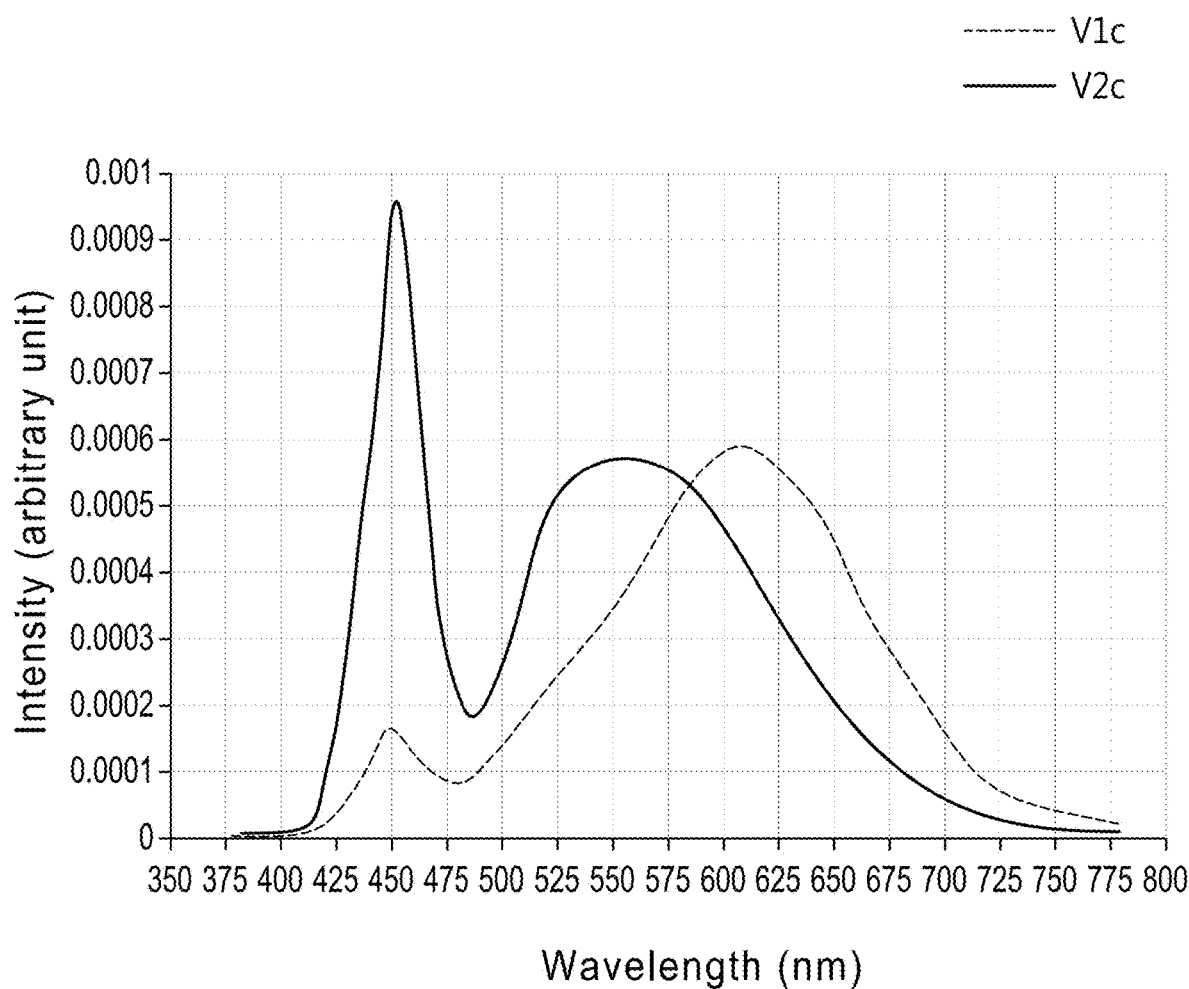
FIG. 32 is spectra of sub-lights emitted by light-emitters in FIG. 23 in another embodiment.
Figure 33:
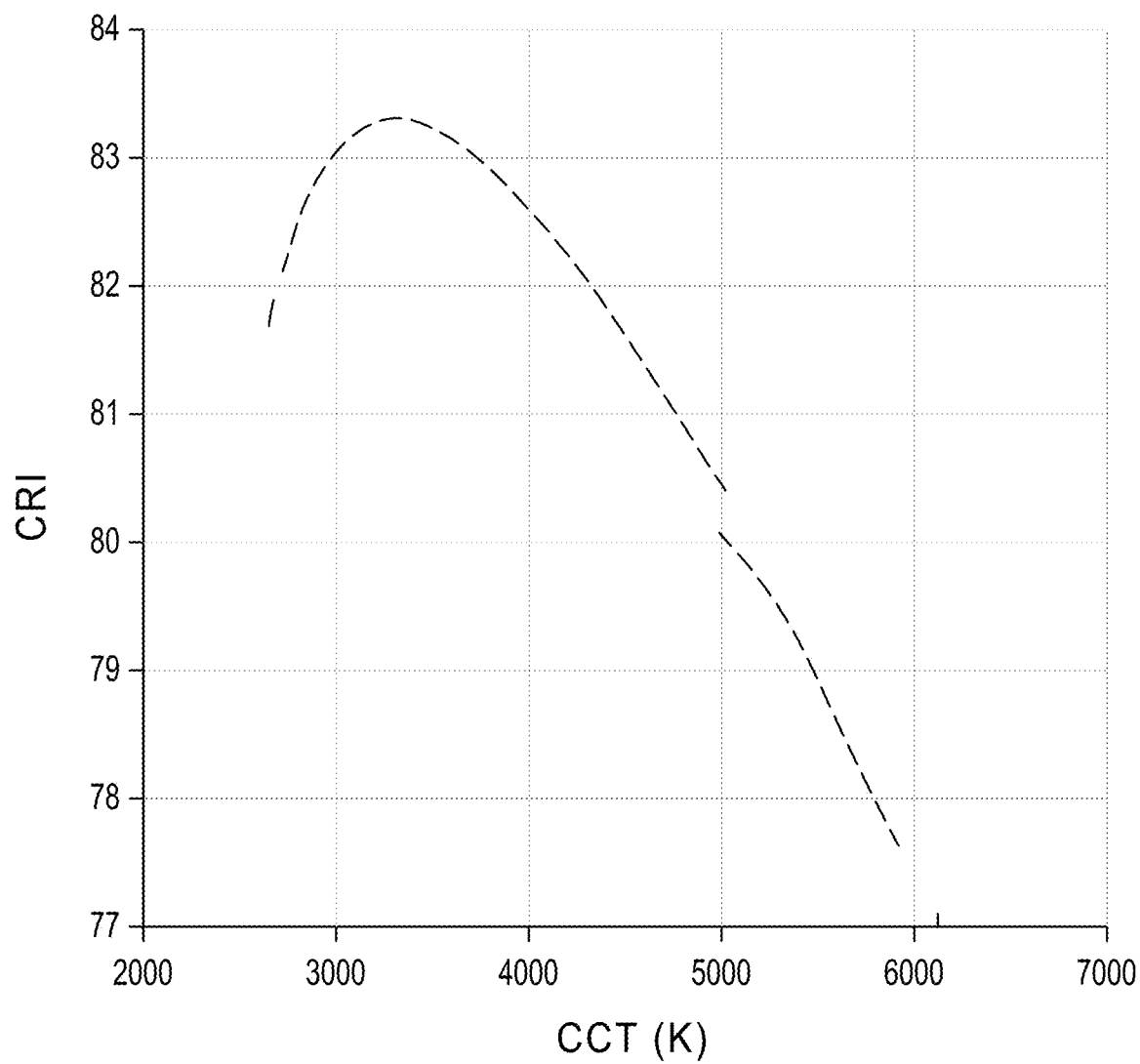
FIG. 33 is a graph of the CRI vs. CCT of the light emitted from the light-emitting module in the embodiment of FIG. 32.
Figure 34A:
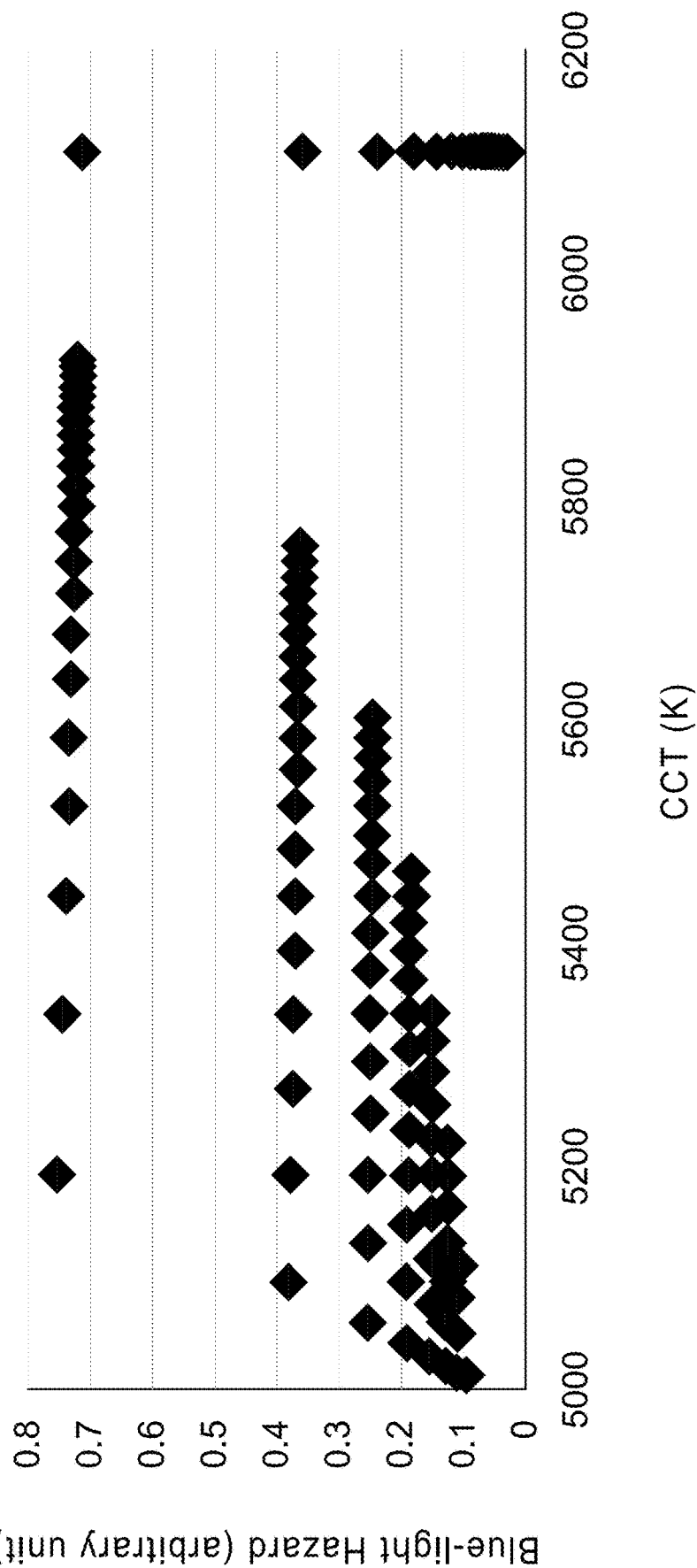
FIG. 34A is a graph of the blue-light hazard vs. CCT of the light emitted from the light-emitting module in the embodiment of FIG. 32 when the CCT is greater than 5000 K.
Figure 34B:
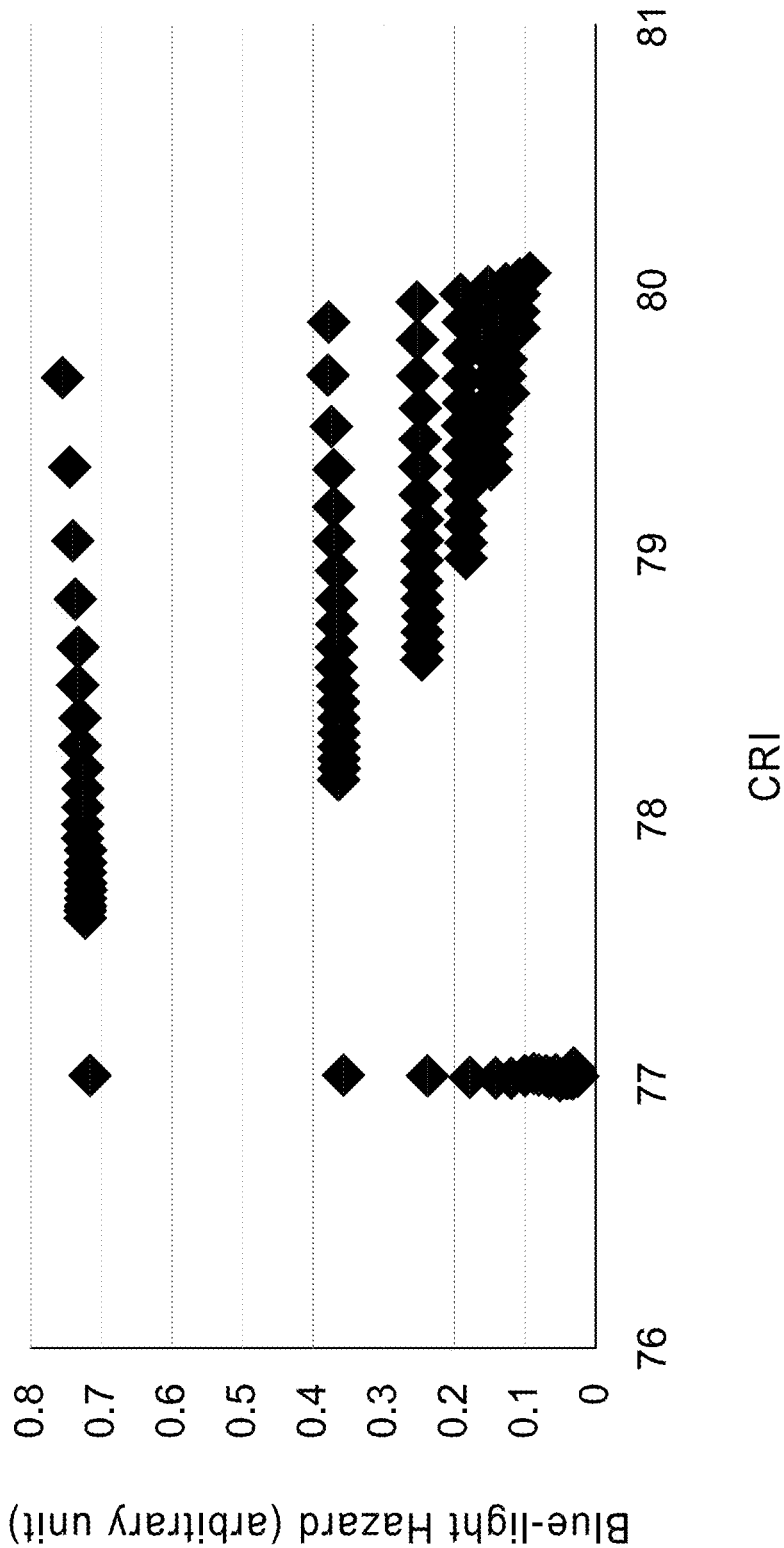
FIG. 34B is a graph of the blue-light hazard vs. CRI of the light emitted from the light-emitting module in the embodiment of FIG. 32 when the CCT is greater than 5000 K.

FIG. 32 is spectra of sub-lights emitted by light-emitters in FIG. 23 in another embodiment. FIG. 33 is a graph of the CRI vs. CCT of the light emitted from the light-emitting module in the embodiment of FIG. 32. FIG. 34A is a graph of the blue-light hazard vs. CCT of the light emitted from the light-emitting module in the embodiment of FIG. 32 when the CCT is greater than 5000 K. FIG. 34B is a graph of the blue-light hazard vs. CRI of the light emitted from the light-emitting module in the embodiment of FIG. 32 when the CCT is greater than 5000 K. Referring to FIG. 23 and FIGS. 32 to 34B, the embodiment of FIG. 32 is similar to the embodiment of FIG. 24A, and the difference therebetween is as follows. in this embodiment, the control unit 620c is configured to change proportion of the first sub-light V1c and the second sub-light V2c to form the light B6c so that a correlated color temperature (CCT) and a blue-light hazard of the light B6c are changed, wherein the blue-light hazard of the light B6c is changeable at a same CCT. For example, a vertical line meaning the same CCT may pass through a plurality of blue-light hazard vs. CCT coordinates of the light B6c (i.e. diamond dots) respectively having different blue-light hazards in FIG. 34A. In this embodiment, the CCT of the first sub-light V1c is less than the CCT of the second sub-light V2c, and the first sub-light and the second sub-light are white lights.

Moreover, in this embodiment, a color rendering index (CRI) of the light B6c is changeable at a same blue-light hazard. For example, a horizontal line meaning the same blue-light hazard may pass through a plurality of blue-light hazard vs. CCT coordinates of the light B6c (i.e. diamond dots) respectively having different CRIs in FIG. 34B. Therefore, when a blue-light hazard is used, a plurality of CRIs may be selected by the user.

Figure 35:
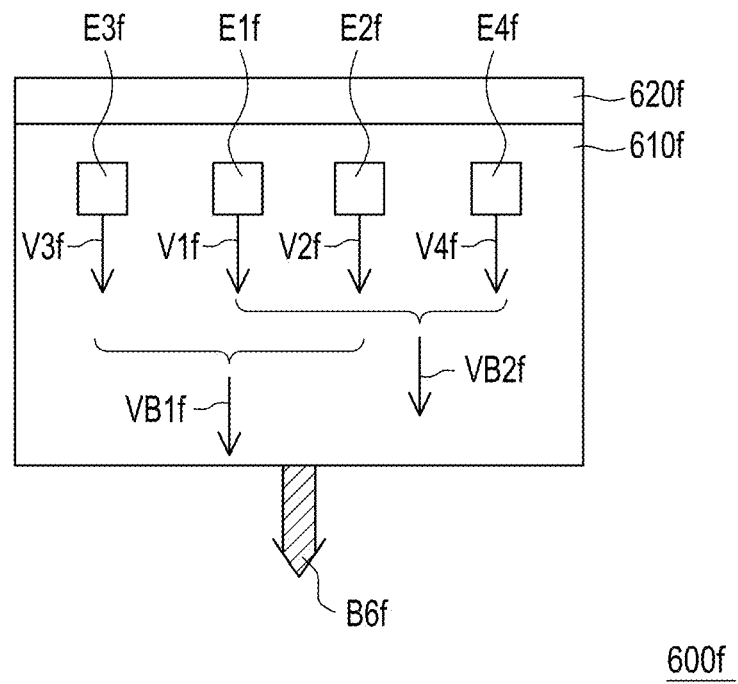
FIG. 35 is a schematic diagram of a light source apparatus in another embodiment of the disclosure.
Figure 36A:
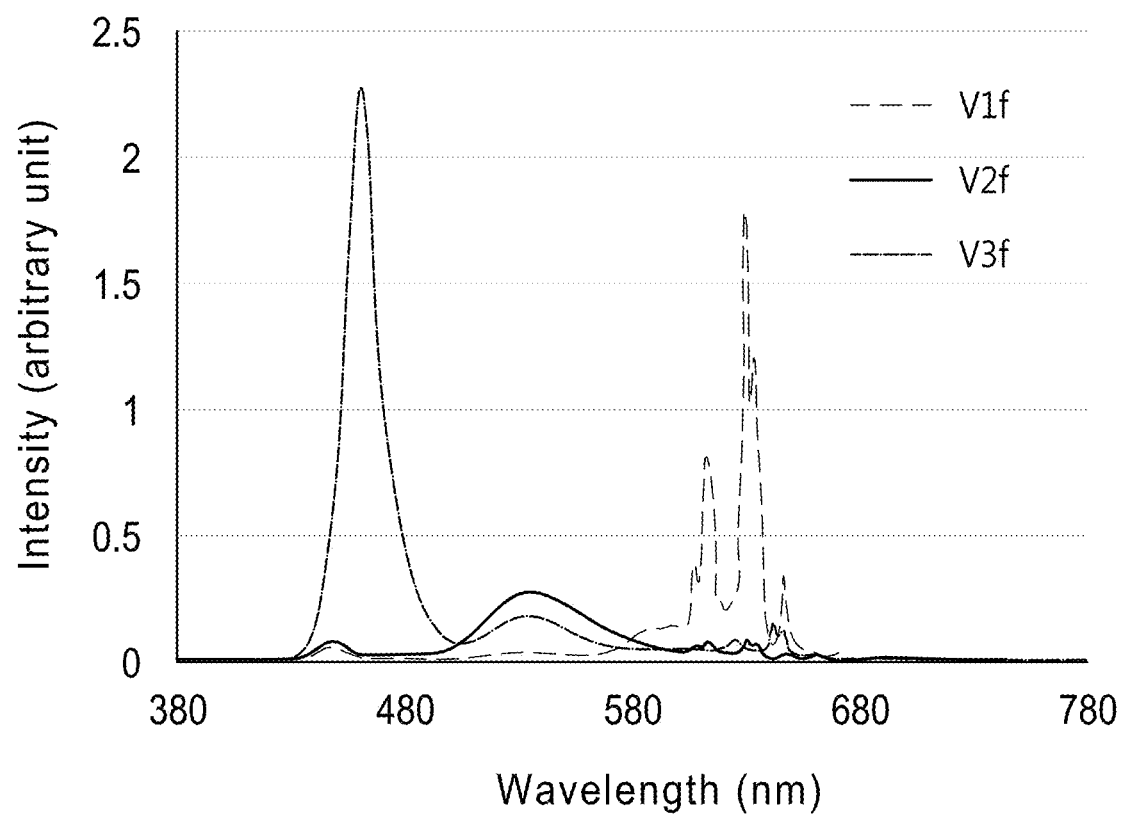
FIG. 36A is spectra of the red sub-light V1f, the green sub-light V2f, and the first blue sub-light V3f emitted by light-emitters E1f, E2f, and E3f in FIG. 35.
Figure 36B:
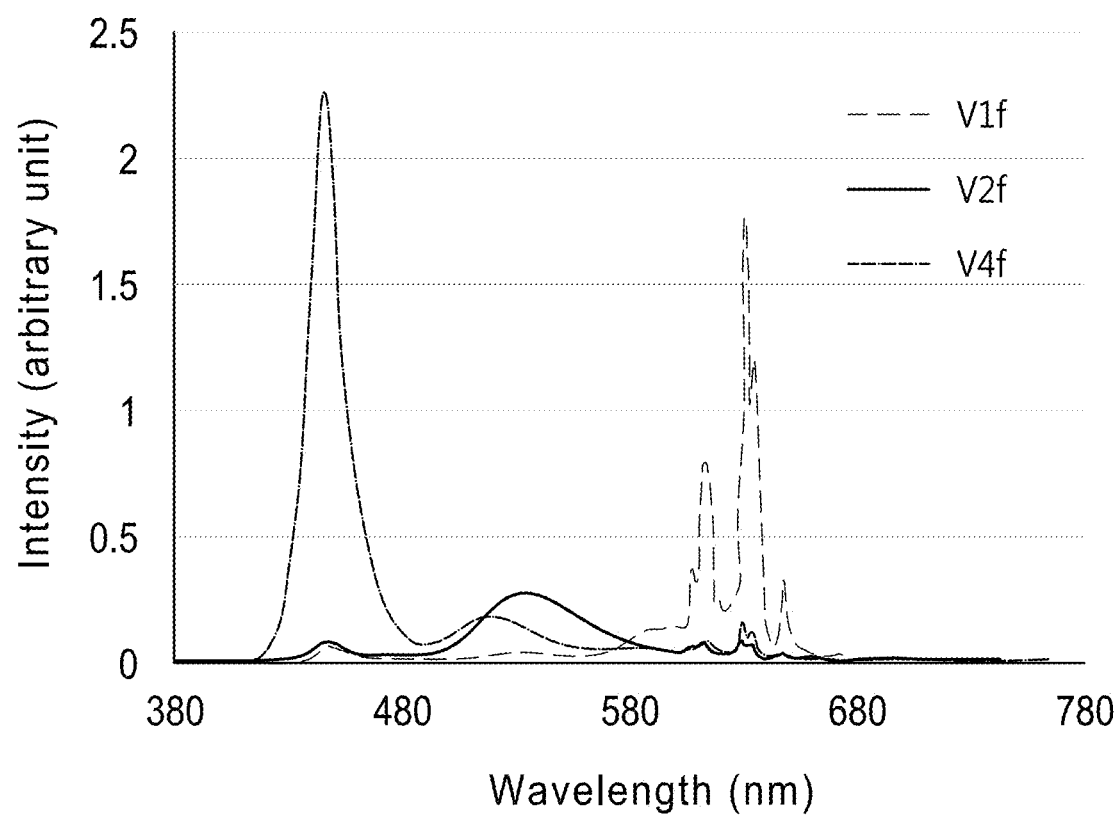
FIG. 36B is spectra of the red sub-light V1f, the green sub-light V2f, and the second blue sub-light V4f emitted by light-emitters E1f, E2f, and E4f in FIG. 35.
Figure 37A:
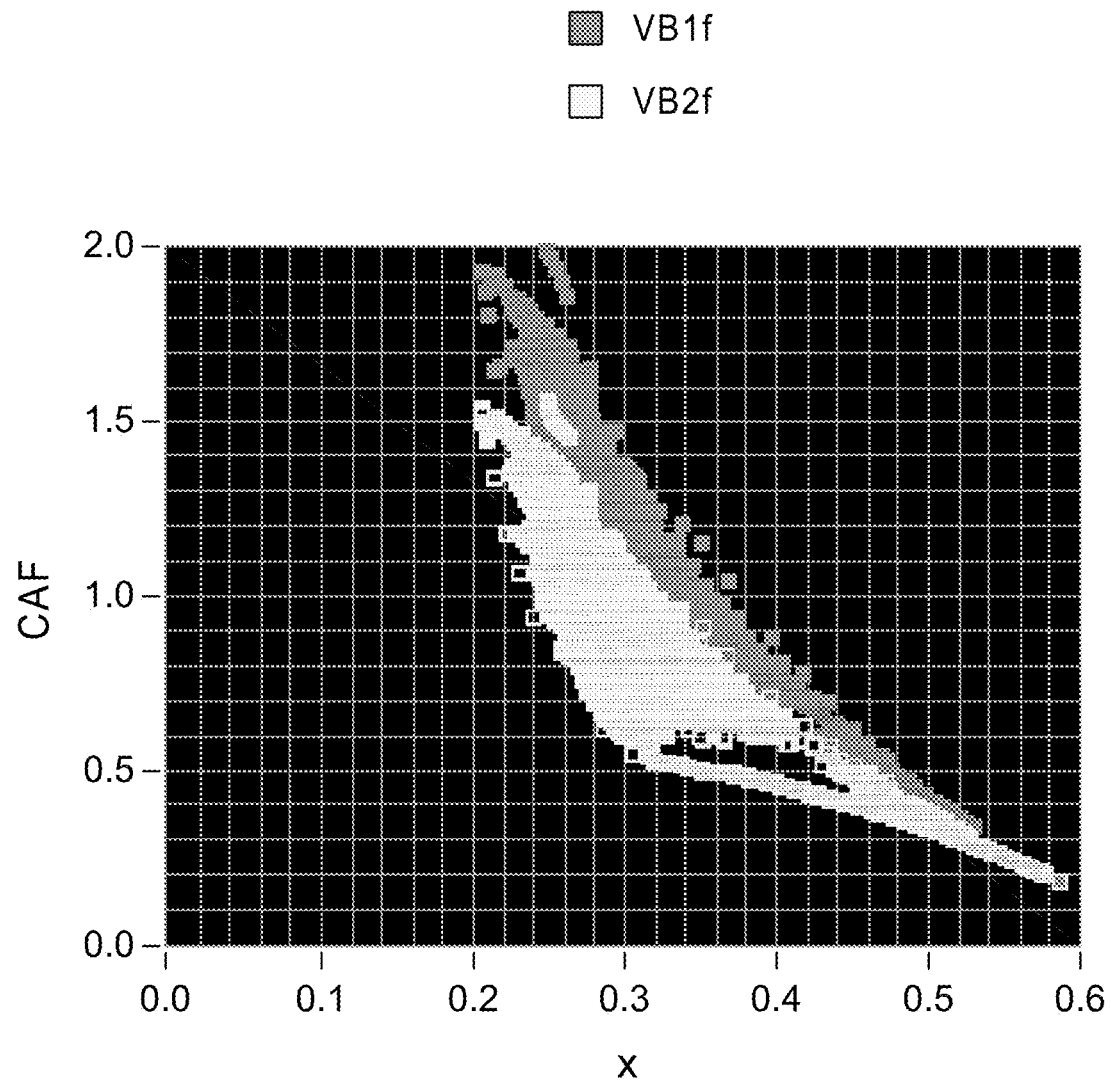
FIG. 37A is a graph of the CAF vs. x chromaticity coordinate of the first light VB1f and the second light VF2f respectively emitted by the light emitters E1f, E2f, and E3f and the light emitters E1f, E2f, and E4f in FIG. 35.
Figure 37B:
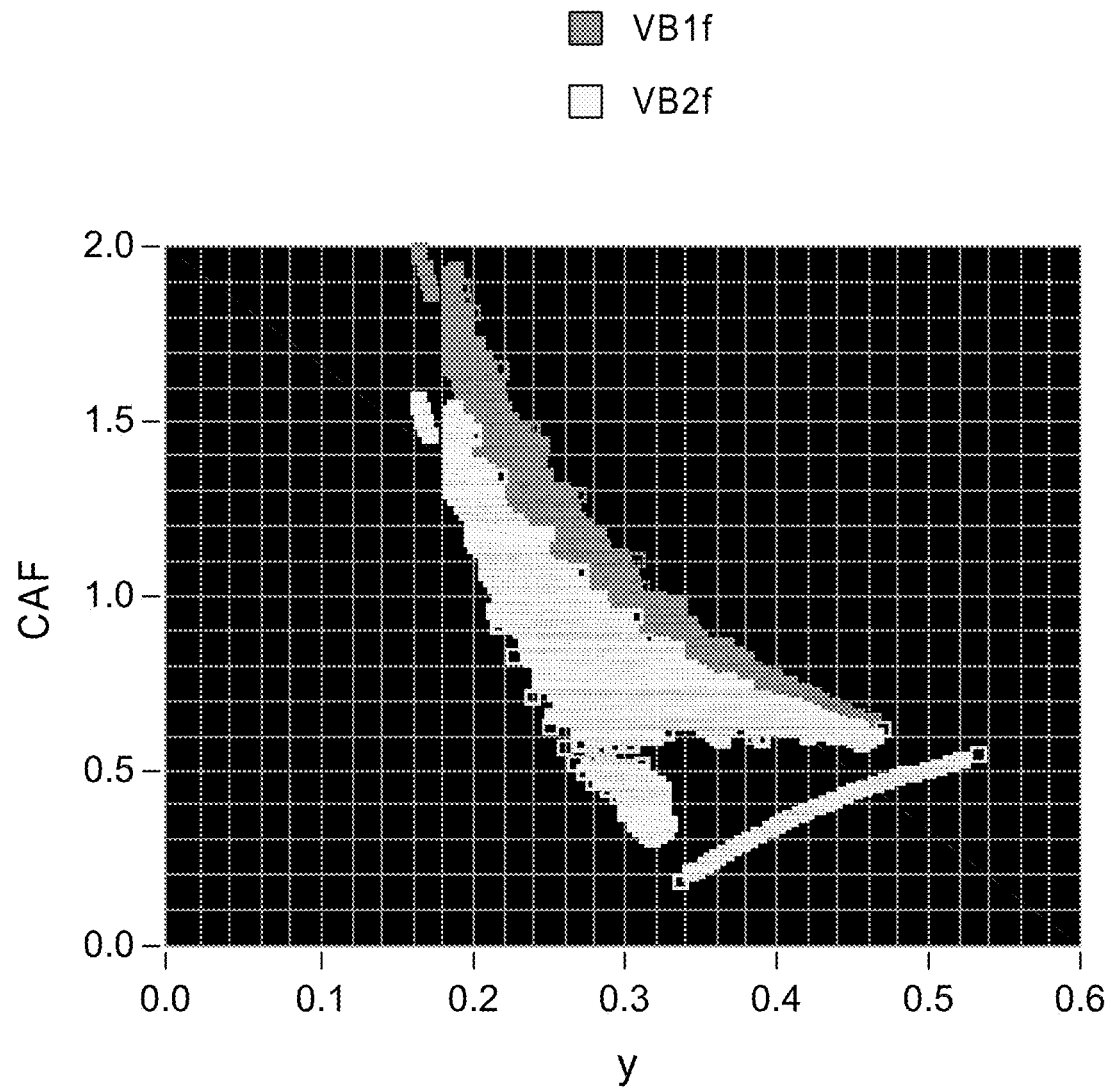
FIG. 37B is a graph of the CAF vs. y chromaticity coordinate of the first light VB1f and the second light VF2f respectively emitted by the light emitters E1f, E2f, and E3f and the light emitters E1f, E2f, and E4f in FIG. 35.
Figure 38A:
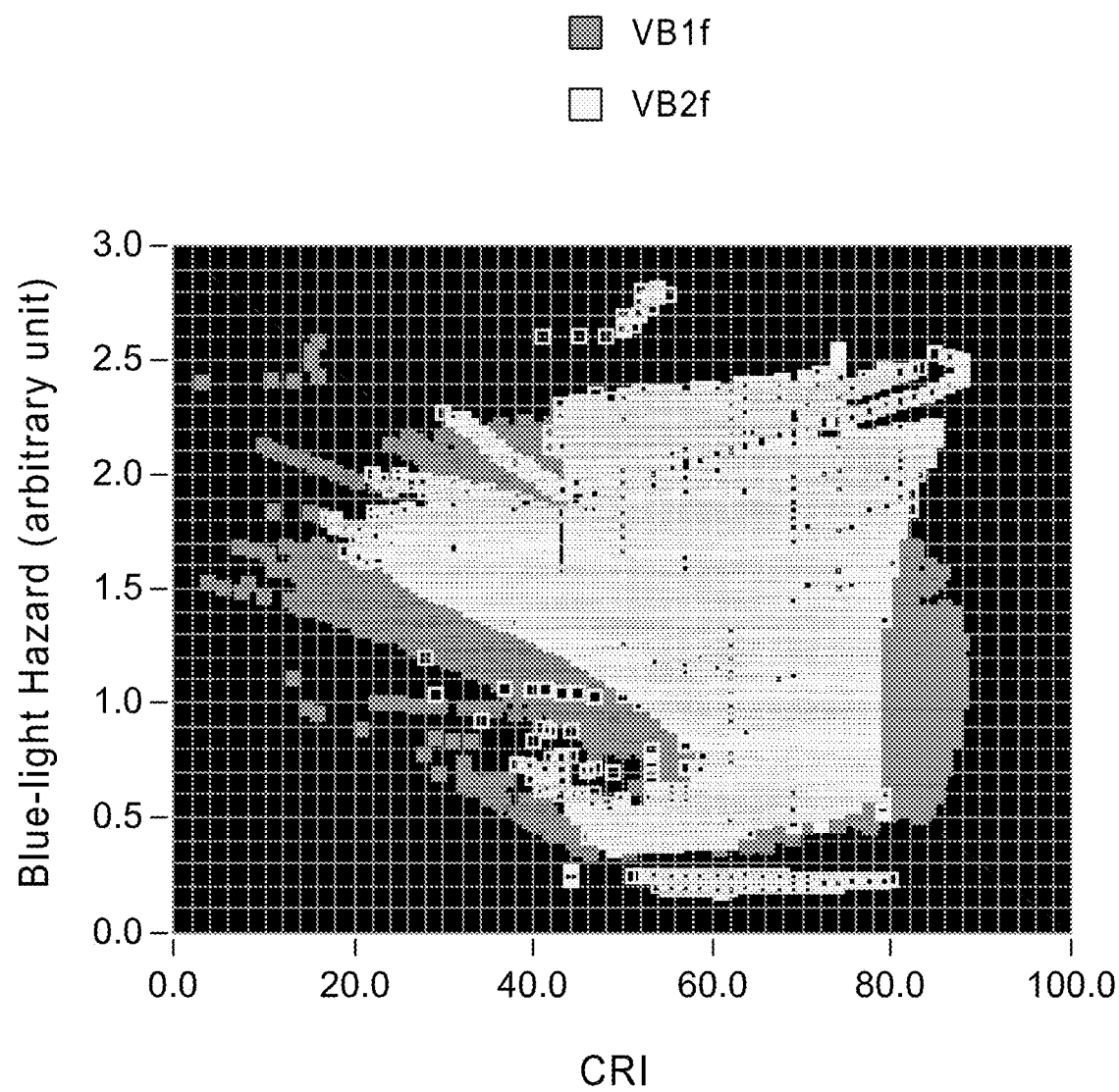
FIG. 38A is a graph of the blue-light hazard vs. CRI of the first light VB1*f* and the second light VF2*f* respectively emitted by the light emitters E1*f*, E2*f*, and E3*f* and the light emitters E1*f*, E2*f*, and E4*f* in FIG. 35.
Figure 38B:
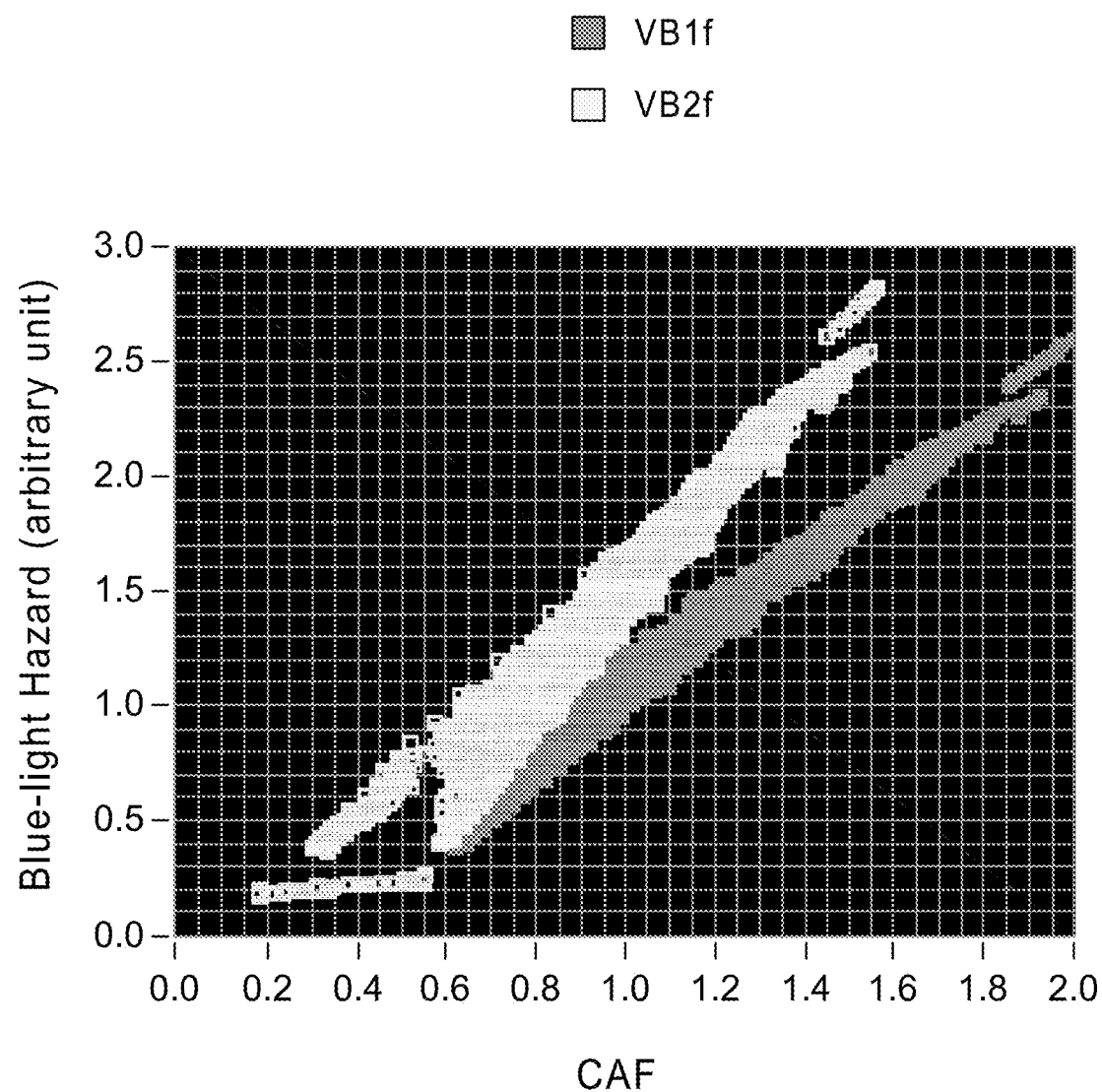
FIG. 38B is a graph of the blue-light hazard vs. CAF of the first light VB1*f* and the second light VF2*f* respectively emitted by the light emitters E1*f*, E2*f*, and E3*f* and the light emitters E1*f*, E2*f*, and E4*f* in FIG. 35.

FIG. 35 is a schematic diagram of a light source apparatus in another embodiment of the disclosure, FIG. 36A is spectra of the red sub-light V1f, the green sub-light V2f, and the first blue sub-light V3f emitted by light-emitters E1f, E2f, and E3f in FIG. 35, and FIG. 36B is spectra of the red sub-light V1f, the green sub-light V2f, and the second blue sub-light V4f emitted by light-emitters E1f, E2f, and E4f in FIG. 35. FIG. 37A is a graph of the CAF vs. x chromaticity coordinate of the first light VB1f and the second light VF2f respectively emitted by the light emitters E1f, E2f, and E3f and the light emitters E1f, E2f, and E4f in FIG. 35. FIG. 37B is a graph of the CAF vs. y chromaticity coordinate of the first light VB1f and the second light VF2f respectively emitted by the light emitters E1f, E2f, and E3f and the light emitters E1f, E2f, and E4f in FIG. 35. FIG. 38A is a graph of the blue-light hazard vs. CRI of the first light VB1f and the second light VF2f respectively emitted by the light emitters E1f, E2f, and E3f and the light emitters E1f, E2f, and E4f in FIG. 35. FIG. 38B is a graph of the blue-light hazard vs. CAF of the first light VB1f and the second light VF2f respectively emitted by the light emitters E1f, E2f, and E3f and the light emitters E1f, E2f, and E4f in FIG. 35.

Referring to FIGS. 35 to 38B, the light source apparatus 600f in FIG. 35 is similar to the light source apparatus 600c in FIG. 23, and the main difference therebetween is as follows. In this embodiment, the light-emitting module 610f is configured to provide a light B6f. The control unit 620f is configured to make the light B6f switched between a first light VB1f and a second light VF2f so that at least one of a blue-light hazard and a circadian action factor (CAF) of the light B6f is changed. FIG. 36A shows the spectrum of the first light VB1f, and FIG. 36B shows the spectrum of the second light VB2f. A wavelength of a blue light main peak (e.g. 460 nm in FIG. 36A) in a spectrum of the first light VB1f (see FIG. 36A) is greater than a wavelength of a blue light main peak (e.g. 447 nm) in a spectrum of the second light VF2f (see FIG. 36B).

In this embodiment, the first light VB1f includes a red sub-light V1f, a green sub-light V2f, and a first blue sub-light V3f. The second light VF2f includes the red sub-light V1f, the green sub-light V2f, and a second blue sub-light V4f. A wavelength of a main peak (e.g. 460 nm) in a spectrum of the first blue sub-light V3f (see FIG. 36A) is greater than a wavelength of a main peak (e.g. 447 nm) in a spectrum of the second blue sub-light V4f (see FIG. 36B). The control unit 620f is configured to change proportion of the red sub-light V1f, the green sub-light V2f, the first blue sub-light V3f and change proportion of the red sub-light V1f, the green sub-light V2f, and the second blue sub-light V4f so as to change at least one of blue-light hazards, CAFs, and color rendering indices (CRIs) of the first light VB1f and the second light VB2f.

In this embodiment, the light-emitting module 610f includes a plurality of light emitters E1f, E2f, E3f, and E4f respectively emitting the red sub-light V1f, the green sub-light V2f, the first blue sub-light V3f, and the second blue sub-light V4f. Each of the light emitters E1c and E2c may include at least one electroluminescent light-emitting element, at least one light-induced light-emitting element, at least one color filter or a combination thereof. The electroluminescent light-emitting element is, for example, a light-emitting diode (LED) chip or an organic light-emitting diode (OLED), and the light-induced light-emitting element is, for example, phosphor. The light source apparatus 600f may be a display, e.g. an OLED display, a liquid crystal display, a micro-LED display, or any other appropriate display, and the light-emitting module 610f may include a plurality of light emitters E1f, a plurality of light emitters E2f, a plurality of light emitters E3f, and a plurality of light emitters E4f arranged alternately to form sub-pixels of the display. However, in other embodiments, the light source apparatus 600f may be an illumination lamp.

In this embodiment, the CAF of the first light VB1f is greater than the CAF of the second light VF2f at same x and y chromaticity coordinates and at same intensity, as shown in FIG. 37A and FIG. 37B. Therefore, the user may select the first light VB1f or the second light VF2f according to the requirement for the CAF. In this embodiment, the CRI of the first light VB1$f$ is greater than the CRI of the second light VF2$f$ at a same blue-light hazard, as shown in FIG. 38A. Therefore, the user may select the first light VB if or the second light VF2$f$ according to the requirement for the CRI. Moreover, in this embodiment, the blue-light hazard of the first light VB1$f$ is less than the blue-light hazard of the second light VF2$f$ at a same CAF. Therefore the user may select the first light VB1$f$ or the second light VF2$f$ according to the requirement for the blue-light hazard.

In another embodiment, the light emitting module 610$f$ of the light source apparatus 600$f$ may include the light emitter E1$f$, the light emitter E2$f$, and the light emitter E3$f$ respectively providing the red sub-light V1$f$, the green sub-light V2$f$, and the first blue sub-light V3$f$ (i.e. a blue sub-light), but not include the light emitter E4$f$. Moreover, the control unit 620$f$ is configured to change proportion of the red sub-light V1$f$, the green sub-light V2$f$, and the first blue sub-light V3$f$ so as to form different white lights (i.e. respectively corresponding to different optical data of the first light VB1$f$ in FIG. 37A, FIG. 37B, FIG. 38A, and FIG. 38B). Furthermore, in this embodiment, the wavelength of the main peak in the spectrum of the first blue sub-light V3$f$ is within a range of 460 nanometer to 480 nanometer. In this embodiment, the light source apparatus 600$f$ in this embodiment may provide the light B6$f$ having a high CAF and a high CRI.

In yet another embodiment, the light emitting module 610$f$ of the light source apparatus 600$f$ may include the light emitter E1$f$, the light emitter E2$f$, and the light emitter E4$f$ respectively providing the red sub-light V1$f$, the green sub-light V2$f$, and the second blue sub-light V4$f$ (i.e. a blue sub-light), but not include the light emitter E3$f$. Moreover, the control unit 620$f$ is configured to change proportion of the red sub-light V1$f$, the green sub-light V2$f$, and the second blue sub-light V4$f$ so as to form different white lights (i.e. respectively corresponding to different optical data of the second light VF2$f$ in FIG. 37A, FIG. 37B, FIG. 38A, and FIG. 38B). Furthermore, in this embodiment, the wavelength of the main peak in the spectrum of the second blue sub-light V4$f$ is within a range of 440 nanometer to 450 nanometer. In this embodiment, the light source apparatus 600$f$ in this embodiment may provide the light B6$f$ having a low CAF and a low CRI.

Figure 39:
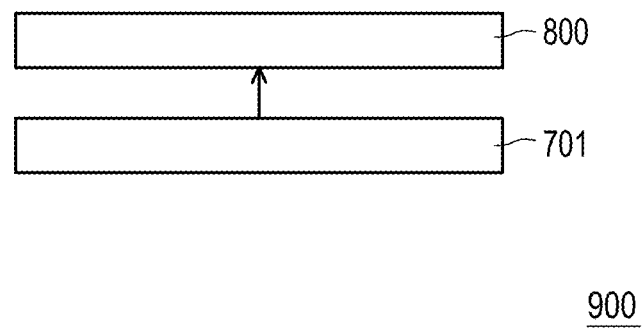
FIG. 39 is a schematic view of a display apparatus according to an embodiment of the disclosure.

FIG. 39 is a schematic view of a display apparatus according to an embodiment of the disclosure. Referring to FIG. 39, the display apparatus 900 in this embodiment includes a display 800 and a backlight device 701. The display 800 may be a liquid crystal display panel or any other appropriate spatial light modulator. The backlight device 701 may be any one of the aforementioned light source apparatuses and configured to illuminate the display 800.

Figure 40:
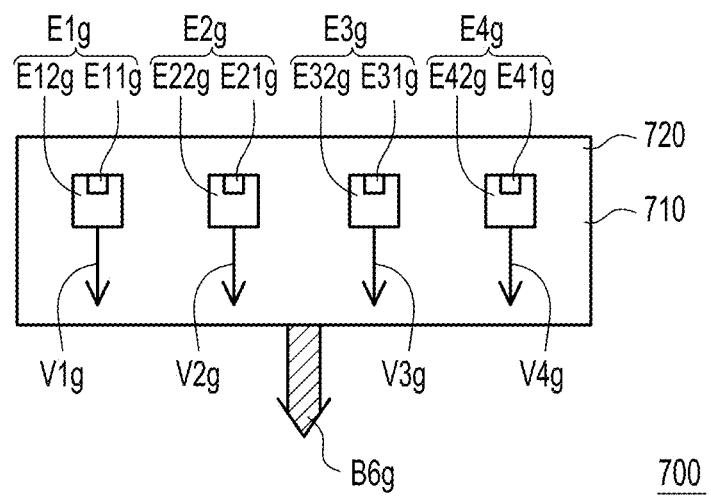
FIG. 40 is a schematic diagram of a light source apparatus in another embodiment of the disclosure.
Figure 41A:
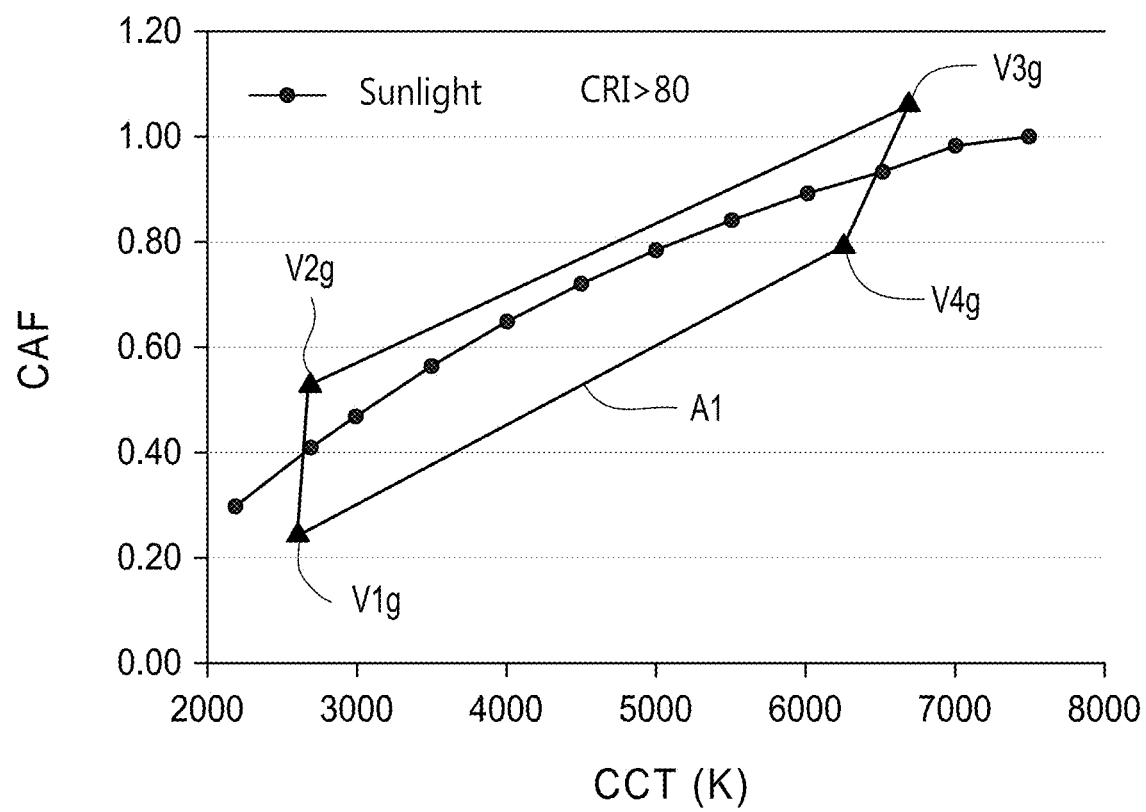
FIG. 41A is a graph of the CAF vs. CCT of the sub-lights provided by light sub-sources of the first light source in FIG. 40 and sunlight.
Figure 41B:
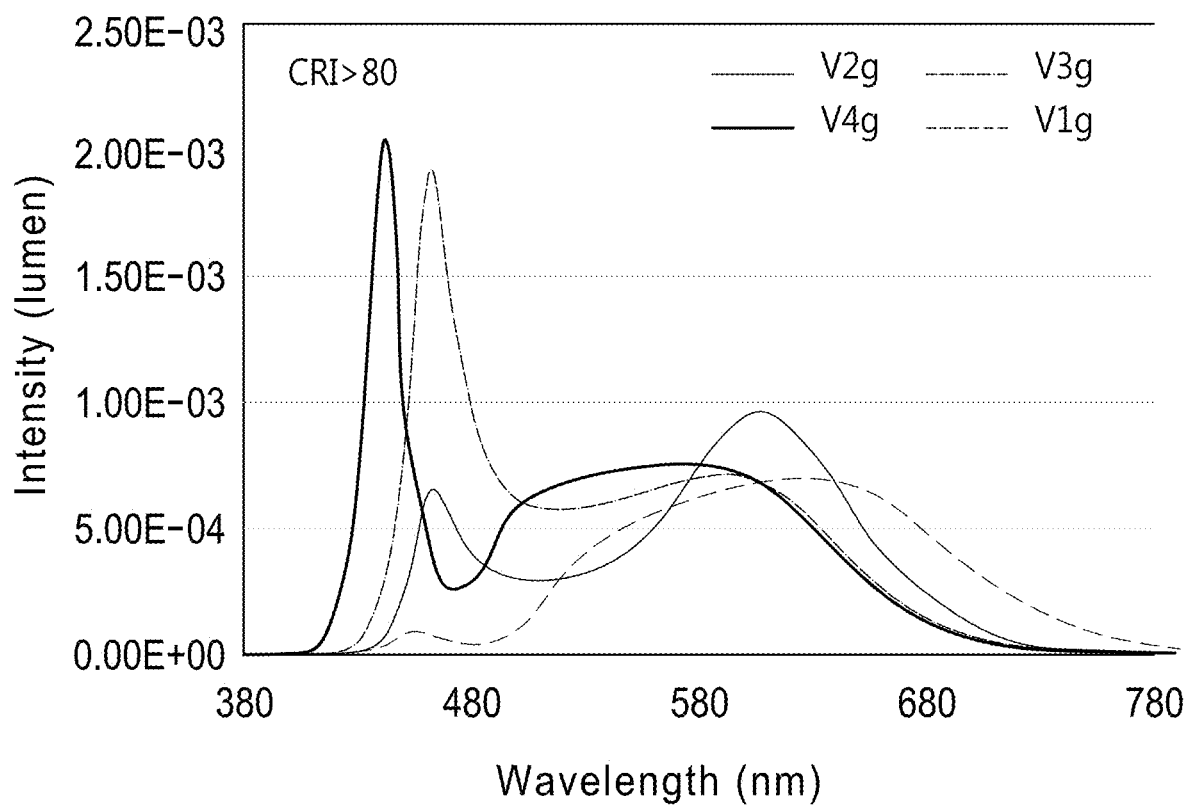
FIG. 41B are spectra of sub-lights emitted by the light sub-sources in FIG. 40.
Figure 41C:
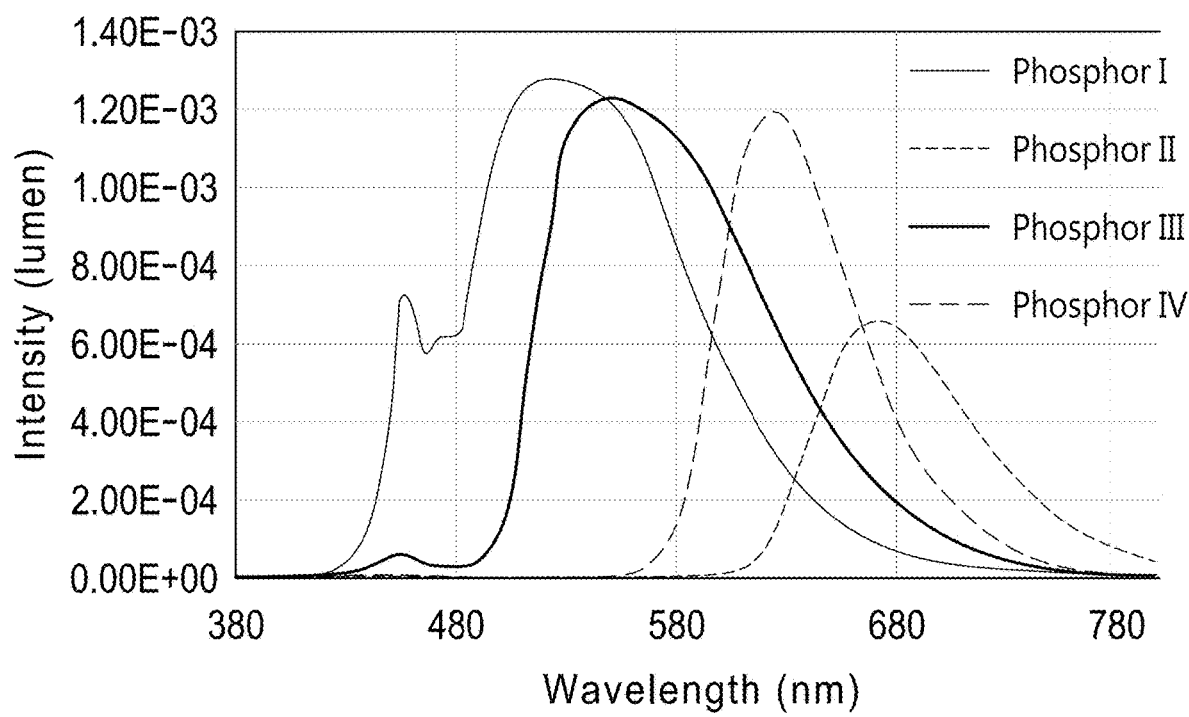
FIG. 41C are spectra of phosphor I, phosphor II, phosphor III, and phosphor IV in the light sub-sources in FIG. 40.
Figure 41D:
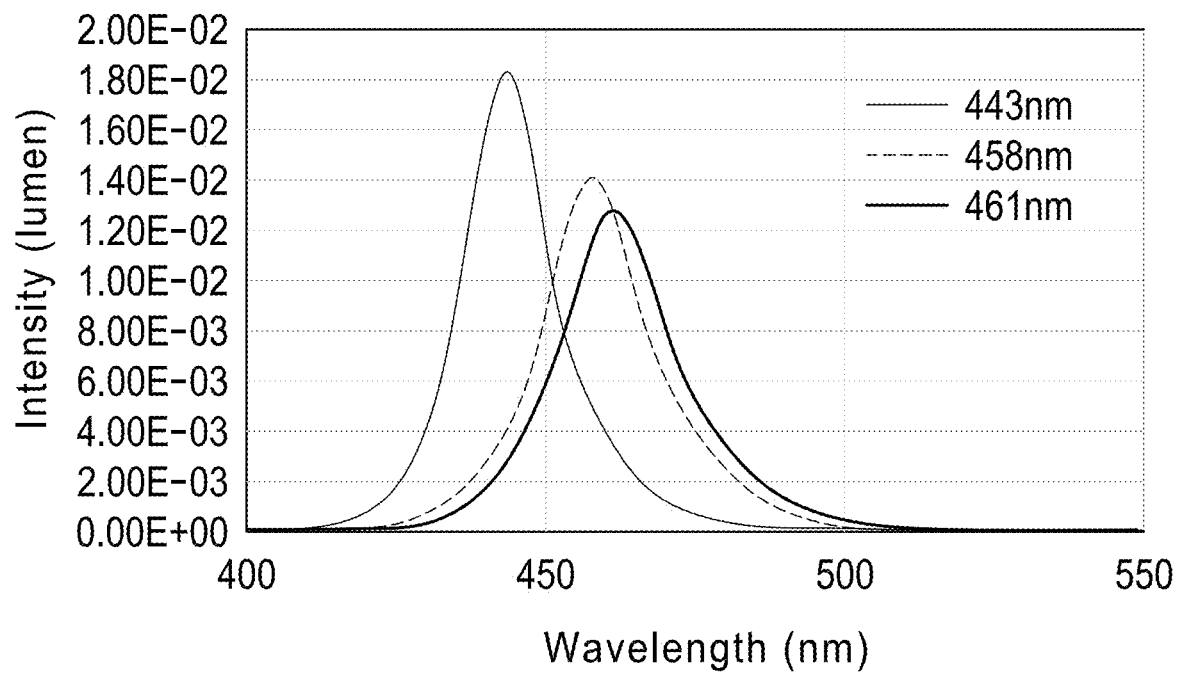
FIG. 41D are spectra of blue LED chips having peak wavelengths of 443 nm, 458 nm, and 461 nm in the light sub-sources in FIG. 40.

FIG. 40 is a schematic diagram of a light source apparatus in another embodiment of the disclosure. FIG. 41A is a graph of the CAF vs. CCT of the sub-lights provided by light sub-sources of the first light source in FIG. 40 and sunlight. FIG. 41B are spectra of sub-lights emitted by the light sub-sources in FIG. 40. FIG. 41C are spectra of phosphor I, phosphor II, phosphor III, and phosphor IV in the light sub-sources in FIG. 40. FIG. 41D are spectra of blue LED chips having peak wavelengths of 443 nm, 458 nm, and 461 nm in the light sub-sources in FIG. 40. Referring to FIG. 40 to FIG. 41D, the light source apparatus 700 in this embodiment is similar to the light source apparatus 600$c$ in FIG. 23, and the main difference therebetween is as follows. In this embodiment, the light source apparatus 700 includes a first light source 710 configured to provide a first light B6$g$. In this embodiment, the first light source 710 includes a light sub-source E1$g$, a light sub-source E2$g$, a light sub-source E3$g$, and a light sub-source E4$g$. The light sub-source E1$g$ includes a light-emitter E11$g$ and a light-emitter E12$g$ wrapping the light-emitter E11$g$, the light sub-source E2$g$ includes a light-emitter E21$g$ and a light-emitter E22$g$ wrapping the light-emitter E21$g$, the light sub-source E3$g$ includes a light-emitter E31$g$ and a light-emitter E32$g$ wrapping the light-emitter E31$g$, and the light sub-source E4$g$ includes a light-emitter E41$g$ and a light-emitter E42$g$ wrapping the light-emitter E41$g$. In this embodiment, the light-emitter E11$g$ is a blue LED chip with peak wavelength of 458 nm, and the light-emitter E12$g$ has resin having 15 percentage by weight (wt %) of the light-emitter E12$g$ and phosphors having 85 wt % of the light-emitter E12$g$ and including phosphor III having 95 wt % of the phosphors and phosphor II having 5 wt % of the phosphors. The light-emitter E21$g$ is a blue LED chip with peak wavelength of 461 nm, and the light-emitter E22$g$ has resin having 15 wt % of the light-emitter E22$g$ and phosphors having 85 wt % of the light-emitter E22$g$ and including phosphor I having 90 wt % of the phosphors and phosphor IV having 10 wt % of the phosphors. The light-emitter E31$g$ is a blue LED chip with peak wavelength of 461 nm, and the light-emitter E32$g$ has resin having 12 wt % of the light-emitter E32$g$ and phosphors having 88 wt % of the light-emitter E32$g$ and including phosphor I having 95 wt % of the phosphors and phosphor IV having 5 wt % of the phosphors. The light-emitter E41$g$ is a blue LED chip with peak wavelength of 443 nm, and the light-emitter E42$g$ has resin having 10 wt % of the light-emitter E42$g$ and phosphors having 90 wt % of the light-emitter E42$g$ and including phosphor I having 95 wt % of the phosphors and phosphor IV having 5 wt % of the phosphors.

In this embodiment, the light sub-source E1$g$ emits a sub-light V1$g$, the light sub-source E2$g$ emits a sub-light V2$g$, the light sub-source E3$g$ emits a sub-light V3$g$, and the light sub-source E4$g$ emits a sub-light V4$g$. The sub-lights V1$g$, V2$g$, V3$g$, and V4$g$ are, for example, white lights. The sub-lights V1$g$, V2$g$, V3$g$, and V4$g$ are combined to form the first light B6$g$.

However, in other embodiments, the light sub-source E1$g$, E2$g$, E3$g$, or E4$g$ may include a plurality of LED chips having different light colors, e.g. a red LED chip, a green LED chip, and a blue LED chip configured to emit a red sub-light, a green sub-light, and a blue sub-light, which are combined to form a white light. In other embodiment, the light sub-source E1$g$, E2$g$, E3$g$, or E4$g$ may include a plurality of LED chips having different light colors and a plurality of kinds of phosphor, having different light colors, wrapping at least one of the LED chips.

In this embodiment, the CRI of the first light B6$g$ is greater than 80, and CAF vs. CCT coordinates (CCT, CAF) of the sub-lights V1$g$, V2$g$, V3$g$, and V4$g$ are shown in FIG. 41A. Spectra of the sub-lights V1$g$, V2$g$, V3$g$, and V4$g$ are shown in FIG. 41B. Spectra of phosphors I, II, III, and IV are shown in FIG. 41C. Spectra of the blue LED chips respectively having peak wavelengths of 443 nm, 458 nm, and 461 nm are shown in FIG. 41D.

In this embodiment, the light source apparatus 700 further includes a control unit 720 electrically connected to the light-emitters E11$g$, E21$g$, E31$g$, and E41$g$, and configured to adjust proportion of the sub-lights V1$g$, V2$g$, V3$g$, and V4$g$. Therefore, the CAF vs. CCT coordinate (CCT, CAF) of the first light B6$b$ may be any coordinate within the area A1 defined by the CAF vs. CCT coordinates (CCT, CAF) of the sub-lights V1g, V2g, V3g, and V4g as vertices (e.g. an polygonal area). The CAF vs. CCT coordinates (CCT, CAF) of the sub-lights V1g, V2g, V3g, and V4g are, for example, (2700±100 K, 0.24), (2700±100 K, 0.53), (6500±300 K, 1.06), and (6500±300 K, 0.788). However, in other embodiments, the first light source 710 may include one light sub-source emitting a sub-light as the first light B6g, and by adjusting the composition of phosphor and the type of blue LED chip of this light sub-source, the CAF vs. CCT coordinate (CCT, CAF) of the first light B6g may be any coordinate within the area A1. Moreover, in still other embodiments, the first light source 710 may include two light sub-sources, three light sub-sources, or five or more light sub-sources emitting sub-lights combined to form the first light B6g, and by adjusting the composition of phosphors and the type of blue LED chips of the light sub-sources, the CAF vs. CCT coordinate (CCT, CAF) of the first light B6b may be any coordinate within the area A1.

In this embodiment, the CRIs of the sub-lights V1g, V2g, V3g, and V4g are, for example, 81, 81, 81, and 84, respectively. The CCTs of the sub-lights V1g, V2g, V3g, and V4g are, for example, 2614 K, 2689 K, 6691 K, and 6245 K, respectively. The CAFs of the sub-lights V1g, V2g, V3g, and V4g are, for example, 0.242, 0.534, 1.060, and 0.788, respectively. The Duv values of the sub-lights V1g, V2g, V3g, and V4g are, for example, 0.01, −0.01, −0.00, −0.01, respectively.

In this embodiment, the CAF vs. CCT coordinate of the first light B6g may be at any position in the area A1, so that the light source apparatus 700 may comply with various requirements of usage.

Figure 42:
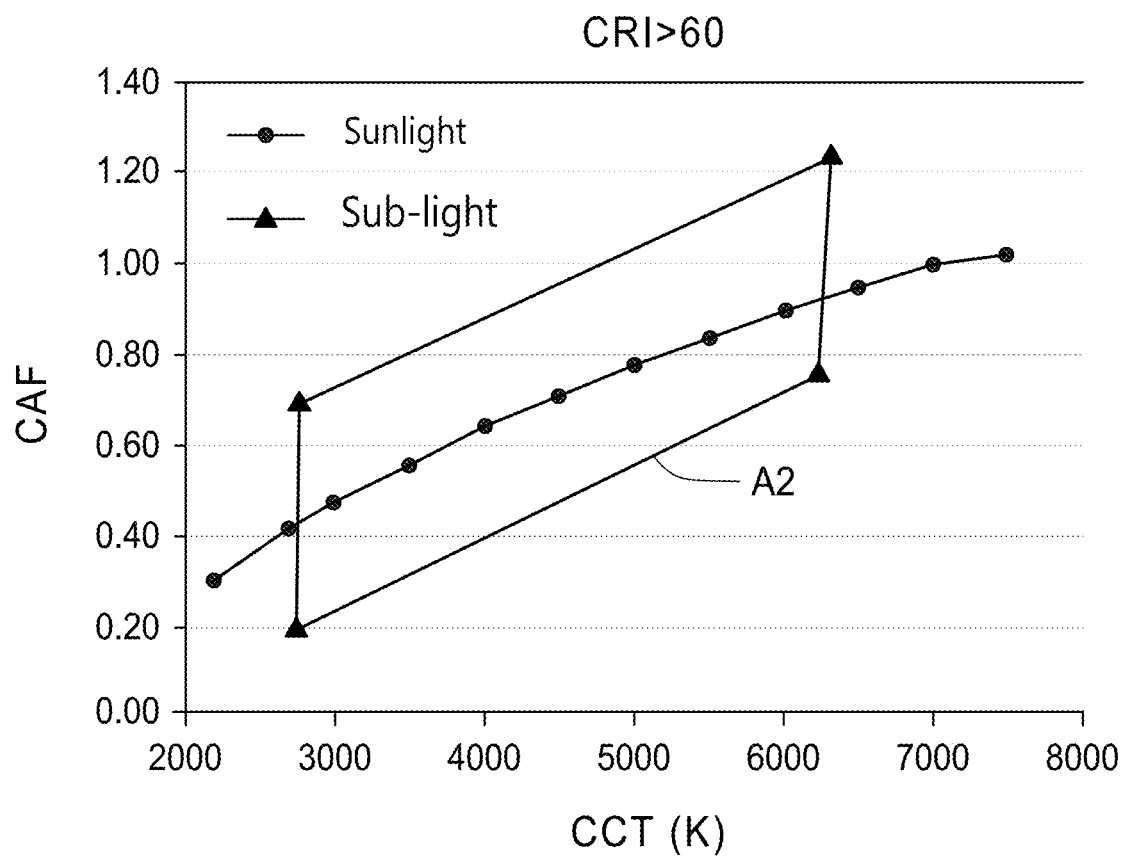
FIG. 42 is a graph of the CAF vs. CCT of the sub-lights provided by light sub-sources of the first light source in a light source apparatus according to another embodiment of the disclosure and sunlight.

FIG. 42 is a graph of the CAF vs. CCT of the sub-lights provided by light sub-sources of the first light source in a light source apparatus according to another embodiment of the disclosure and sunlight. Referring to FIG. 42, the light source apparatus according to this embodiment is similar to the light source apparatus 700 in FIG. 40, and the main difference therebetween is as follows. In this embodiment, the CRI of the first light B6g is greater than 60, and a CAF vs. CCT coordinate (CCT, CAF) of the first light B6g is within an area A2 formed by four CAF vs. CCT coordinates (2700±100 K, 0.696), (2700±100 K, 0.197), (6500±300 K, 0.759), and (6500±300 K, 1.229) as vertices shown in FIG. 42. In this embodiment, the first light B6g is formed by four sub-lights having CAF vs. CCT coordinates at the four vertices, respectively, shown in FIG. 42. However, in other embodiments, the first light B6g may be formed by one sub light, two sub-lights, or three or more sub-lights emitted by one light sub-source, two light sub-sources, or three or more light sub-sources, and the CAF vs. CCT coordinate of the first light B6g may be determined by adjusting the composition of phosphor(s) and the type(s) of blue LED chip(s) of the light sub-source(s).

Figure 43:
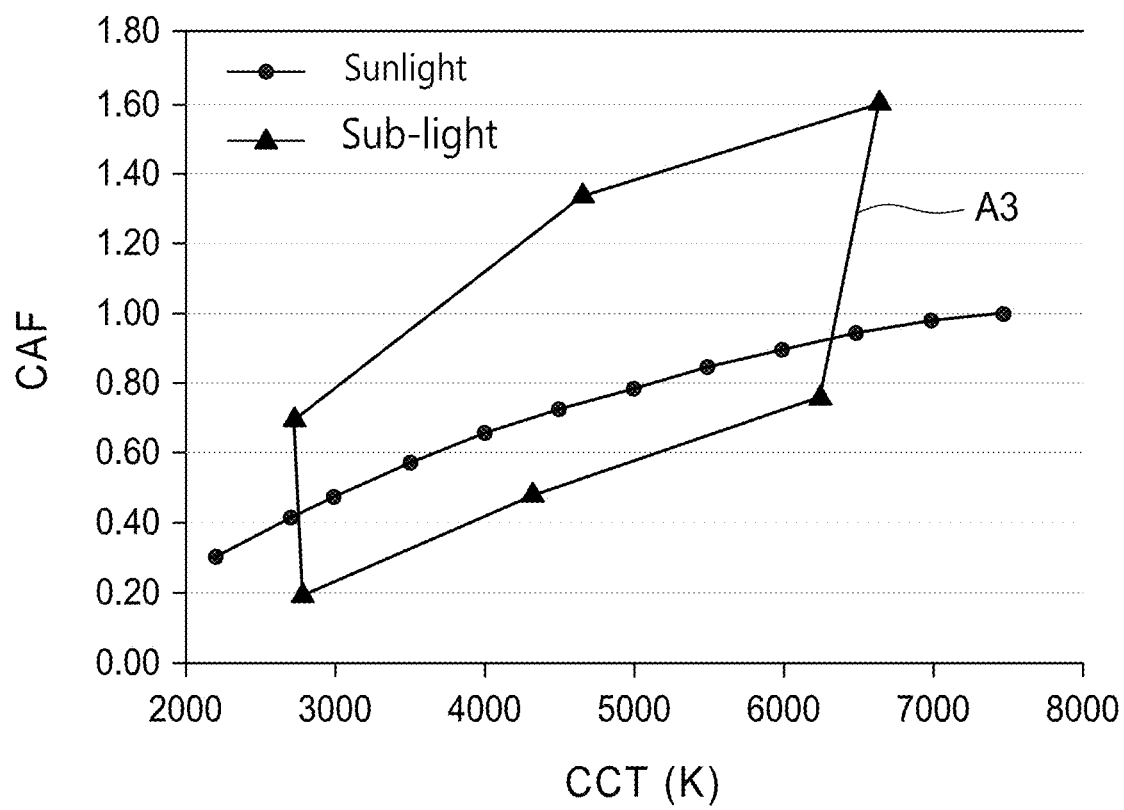
FIG. 43 is a graph of the CAF vs. CCT of the sub-lights provided by light sub-sources of the first light source in a light source apparatus according to another embodiment of the disclosure and sunlight.

FIG. 43 is a graph of the CAF vs. CCT of the sub-lights provided by light sub-sources of the first light source in a light source apparatus according to another embodiment of the disclosure and sunlight. Referring to FIG. 43, the light source apparatus according to this embodiment is similar to the light source apparatus 700 in FIG. 40, and the main difference therebetween is as follows. In this embodiment, the CRI of the first light B6g is not limited, and a CAF vs. CCT coordinate (CCT, CAF) of the first light B6g is within an area A3 formed by six CAF vs. CCT coordinates (2700±100 K, 0.197), (2700±100 K, 0.696), (4500±200 K, 0.474), (4500±200 K, 1.348), (6500±300 K, 0.759), and (6500±300 K, 1.604) as vertices shown in FIG. 43. In this embodiment, the first light B6g is formed by six sub-lights having CAF vs. CCT coordinates at the six vertices, respectively, shown in FIG. 43. However, in other embodiments, the first light B6g may be formed by one sub light, two sub-lights, or three or more sub-lights emitted by one light sub-source, two light sub-sources, or three or more light sub-sources, and the CAF vs. CCT coordinate of the first light B6g may be determined by adjusting the composition of phosphor(s) and the type(s) of blue LED chip(s) of the light sub-source(s).

Figure 44:
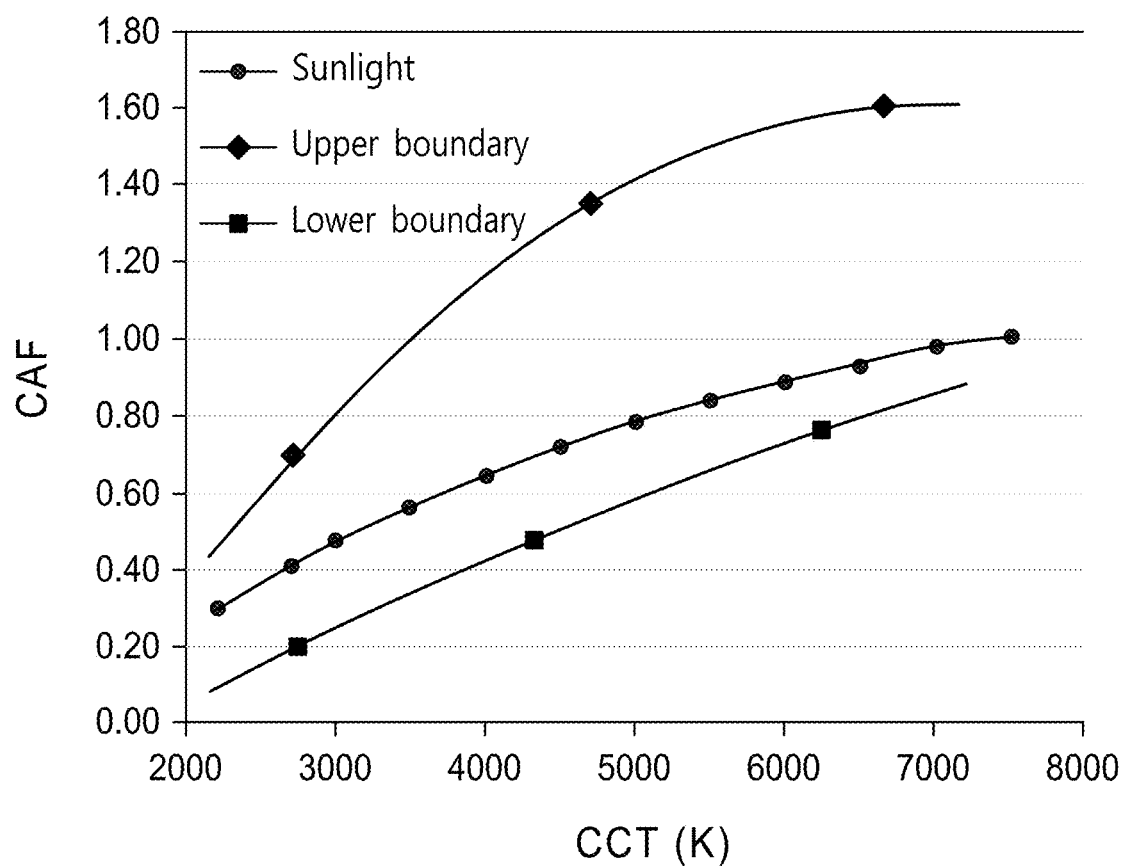
FIG. 44 is a graph of the CAF vs. CCT of the upper boundary and the lower boundary of the first light provided by the first light source in a light source apparatus according to another embodiment of the disclosure and sunlight.

FIG. 44 is a graph of the CAF vs. CCT of the upper boundary and the lower boundary of the first light provided by the first light source in a light source apparatus according to another embodiment of the disclosure and sunlight. Referring to FIG. 44, the light source apparatus in the embodiment of FIG. 44 is similar to the light source apparatus in the embodiment of FIG. 43, and the main difference therebetween is as follows. In this embodiment, a CAF vs. CCT coordinate (CCT, CAF) of the first light B6g is within an area having an upper boundary, a lower boundary, and coordinates between the upper boundary and the lower boundary. In this embodiments, the upper boundary is found by fitting a quadratic function to the upper three vertices of FIG. 43, and the coefficient of determination $R^2$ thereof is, for example, 1. For example, the upper boundary is a function of CAF=−5E−08×(CCT)$^2$+0.0007×(CCT)−0.8439. Moreover, the lower boundary is found by fitting a quadratic function to the lower three vertices of FIG. 43, and the coefficient of determination $R^2$ thereof is, for example, 1. For example, the lower boundary is a function of CAF=−8E−09×(CCT)$^2$+0.0002×(CCT)−0.3804.

Figure 45:
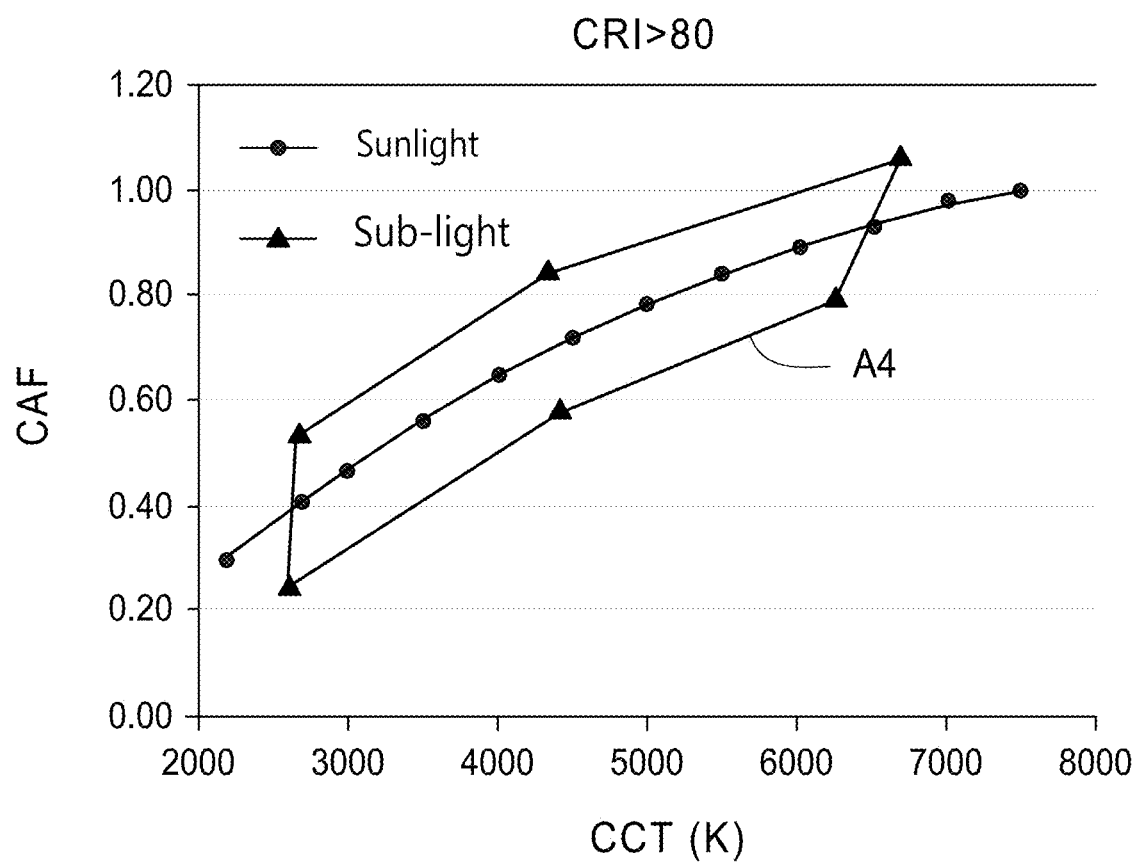
FIG. 45 is a graph of the CAF vs. CCT of the sub-lights provided by light sub-sources of the first light source in a light source apparatus according to another embodiment of the disclosure and sunlight.

FIG. 45 is a graph of the CAF vs. CCT of the sub-lights provided by light sub-sources of the first light source in a light source apparatus according to another embodiment of the disclosure and sunlight. Referring to FIG. 45, the light source apparatus according to this embodiment is similar to the light source apparatus 700 in FIG. 40, and the main difference therebetween is as follows. In this embodiment, a CRI of the first light B6g is greater than 80, and a CAF vs. CCT coordinate (CCT, CAF) of the first light B6g is within an area A4 formed by six CAF vs. CCT coordinates (2700±100 K, 0.242), (2700±100 K, 0.534), (4500±200 K, 0.580), (4500±200 K, 0.841), (6500±300 K, 0.788), and (6500±300 K, 1.060) as vertices shown in FIG. 45. In this embodiment, the first light B6g is formed by six sub-lights having CAF vs. CCT coordinates at the six vertices, respectively, shown in FIG. 45. However, in other embodiments, the first light B6g may be formed by one sub light, two sub-lights, or three or more sub-lights emitted by one light sub-source, two light sub-sources, or three or more light sub-sources, and the CAF vs. CCT coordinate of the first light B6g may be determined by adjusting the composition of phosphor(s) and the type(s) of blue LED chip(s) of the light sub-source(s).

In this embodiment, in the same CCT, the CAF of the first light B6g falls within the range of ±0.15 of the CAF of sunlight.

Figure 46:
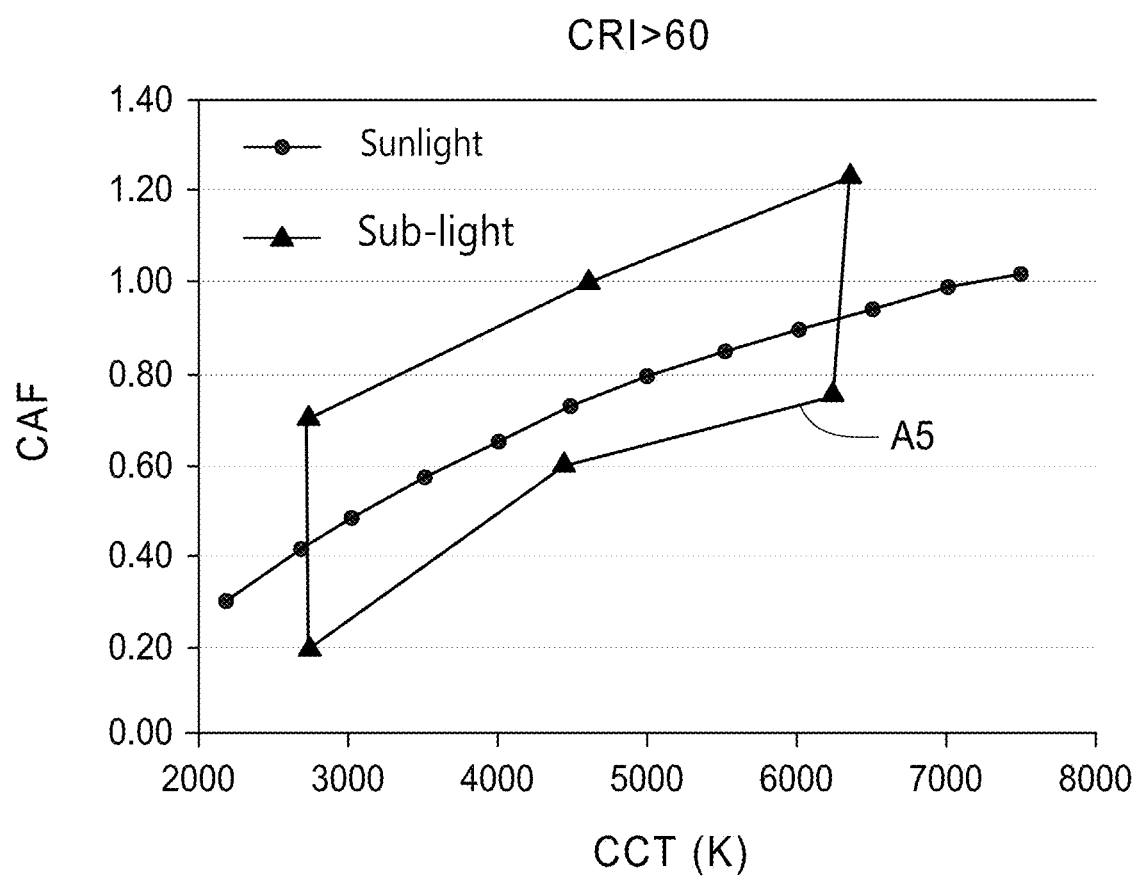
FIG. 46 is a graph of the CAF vs. CCT of the sub-lights provided by light sub-sources of the first light source in a light source apparatus according to another embodiment of the disclosure and sunlight.

FIG. 46 is a graph of the CAF vs. CCT of the sub-lights provided by light sub-sources of the first light source in a light source apparatus according to another embodiment of the disclosure and sunlight. Referring to FIG. 46, the light source apparatus according to this embodiment is similar to the light source apparatus according to the embodiment of FIG. 45, and the main difference therebetween is as follows. In this embodiment, a CRI of the first light B6g is greater than 60, and a CAF vs. CCT coordinate (CCT, CAF) of the first light B6g is within an area A5 formed by six CAF vs. CCT coordinates as vertices shown in FIG. 46. In this embodiment, the first light B6g is formed by six sub-lights having CAF vs. CCT coordinates at the six vertices, respectively, shown in FIG. 46. However, in other embodiments, the first light B6g may be formed by one sub light, two sub-lights, or three or more sub-lights emitted by one light sub-source, two light sub-sources, or three or more light sub-sources, and the CAF vs. CCT coordinate of the first light B6g may be determined by adjusting the composition of phosphor(s) and the type(s) of blue LED chip(s) of the light sub-source(s).

Referring to FIG. 23 again, in an embodiment, the light-emitter E1c may be the first light source 710 in any one of the embodiments of FIG. 40 to FIG. 46, the first sub-light V1c may be the first light B6g in any one of the embodiments of FIG. 40 to FIG. 46, the light-emitter E2c may be a second light source, and the second sub-light V2c may be a second light. The second light source is similar to the first light source 710, and a CAF vs. CCT coordinate (CCT, CAF) of the second light may be within the area A1, A2, A3, A4, or A5 in FIG. 41A, FIG. 42, FIG. 43, FIG. 45, or FIG. 46, or the area defined by the upper boundary and the lower boundary in FIG. 44, and the difference therebetween is that the CAF vs. CCT coordinate (CCT, CAF) of the second light is different from that of the first light B6g.

Moreover, in this embodiment, the control unit 620c is configured to control the first light source 710 (i.e. the light-emitter E1c) and the second light source (i.e. the light-emitter E2c), so as to combine the first light B6g (i.e. the first sub-light V1c) and the second light (i.e. the second sub-light V2c) to output a third light (i.e. the light B6c).

In this embodiment, the CAF vs. CCT coordinate (CCT, CAF) of one of the first light B6g (i.e. the first sub-light V1c) and the second light (i.e. the second sub-light V2c) is below the CAF vs. CCT locus of sunlight as shown in FIG. 25A, and the CAF vs. CCT coordinate (CCT, CAF) of the other one of the first light B6g (i.e. the first sub-light V1c) and the second light (i.e. the second sub-light V2c) is above the CAF vs. CCT locus of sunlight as shown in FIG. 25A.

In an embodiment, the CAF vs. CCT coordinate (CCT, CAF) of the third light (i.e. the light B6c) is below the CAF vs. CCT locus of sunlight, for example, the circles or the triangles below the CAF vs. CCT locus of sunlight in FIG. 25A. In another embodiment, the CAF vs. CCT coordinate (CCT, CAF) of the third light (i.e. the light B6c) is above the CAF vs. CCT locus of sunlight, for example, the circles or the triangles above the CAF vs. CCT locus of sunlight in FIG. 25A. In still another embodiment, the CAF vs. CCT coordinate (CCT, CAF) of the third light (i.e. the light B6c) is on the CAF vs. CCT locus of sunlight, for example, the circle or the triangle on the CAF vs. CCT locus of sunlight in FIG. 25A.

The aforementioned control unit includes, for example, a central processing unit (CPU), a microprocessor, a digital signal processor (DSP), a programmable controller, a programmable logic device (PLD), or other similar devices, or a combination of the said devices, which are not particularly limited by the disclosure. Further, in an embodiment, each of the functions performed by the control unit may be implemented as a plurality of program codes. These program codes will be stored in a memory, so that these program codes may be executed by the control unit. Alternatively, in an embodiment, each of the functions performed by the control unit may be implemented as one or more circuits. The disclosure is not intended to limit whether each of the functions performed by the control unit is implemented by ways of software or hardware.

The aforementioned "circadian stimulus value" may be a CS/P value, a circadian action factor (CAF), or an equivalent melanopic lux (EML), wherein EML=R×(CAF)×(Lux), where R is a constant, R is 1.218 when considering the response intensity of CS($\lambda$) and P($\lambda$); Lux is an illuminance when the light source apparatus is an illumination apparatus, but may be a luminance when the light source apparatus is a display. The CS/P value in the aforementioned embodiment may be replaced by a CAF or an EML. The CAF in the aforementioned embodiment may be replaced by a CS/P value or an EML.

In summary, the light source apparatus in the embodiments of the disclosure can use the control unit to control the light-emitting module for providing lights with the same color temperature and different CS/P values. The light-emitting module can also provide lights with a plurality of sets of color temperatures through a plurality of sets of light-emitting units, and the light of each set of the same color temperatures can be switched between different lights with different CS/P values. In addition, the light source apparatus in the embodiments of the disclosure can provide lights with over 5% difference of CS/P values by controlling the light-emitting module through the control unit, in which the lights can have totally different color temperatures, or a part of the lights has the same color temperature. In this way, the light source apparatus can select light sources with different CS/P values according to the real application environment, the time and the goal so as to maintain the natural circadian rhythm of the user and meanwhile provide enough light sources. The light source apparatus of the disclosure can serve as an illumination device or a backlight device of a display, which the disclosure is not limited to.

Moreover, in the light source apparatus according to the embodiments, since the color temperatures of the first light and the second light are substantially the same as each other and the spectra of the first light and the second light are different, when a plurality of light source apparatuses or light-emitting modules are disposed in the same exhibition space and respectively emit the first light and the second light, the light color of the light source apparatuses or light-emitting modules is uniform, and the first light and the second light may respectively achieve different functions.

Additionally, in the light source apparatus according to the embodiments, since correlated color temperatures of the plurality of kinds of first light are different from each other, and circadian action factors of the plurality of kinds of first light are substantially the same as each other, so that the light source apparatus may have more applications.

Besides, in the light source apparatus according to the embodiments, the proportion of the first sub-light and the second sub-light can be changed, so that the CAF and the CCT of the light varies along a CAF vs. CCT locus of the light different from a CAF vs. CCT locus of sunlight. Therefore, the light source apparatus may have more applications. In the light source apparatus according to the embodiments, the light may be switched between a first light and a second light so that at least one of a blue-light hazard and a CAF of the light is changed. Therefore, the light source apparatus may have more applications. In the light source apparatus according to the embodiments, proportion of the first sub-light and the second sub-light may be changed so that a CCT and a blue-light hazard of the light are changed, wherein the blue-light hazard of the light is changeable at a same CCT, so that the user may select a suitable blue-light hazard according to requirements.

Furthermore, in the light source apparatus according to the embodiments, the CAF vs. CCT coordinate of the first light emitted by the first light source may be at any position in an area in the CAF vs. CCT graph, so that the light source apparatus according to the embodiments may comply with various requirements of usage.

Figure 47:
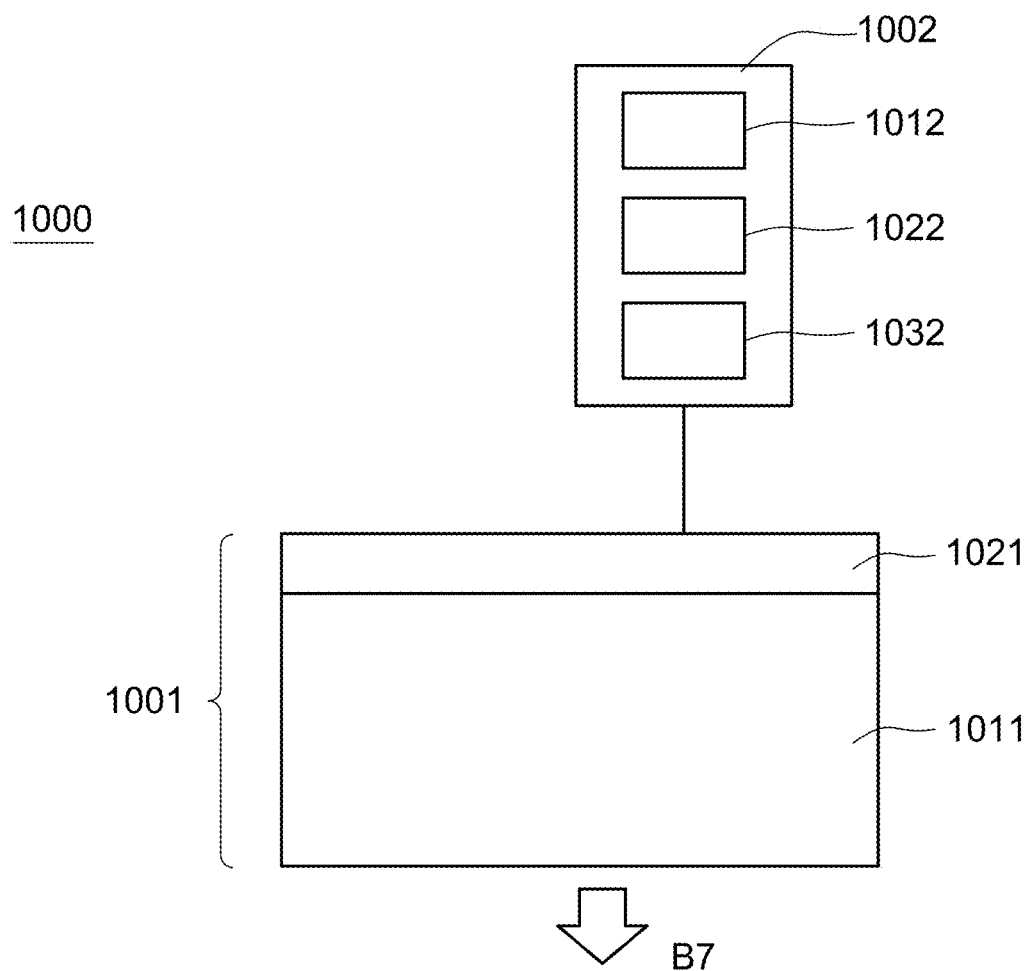
FIG. 47 is a schematic view of a light source apparatus according to another embodiment of the present invention.

Referring to FIG. 47, a light source system 1000 includes a light source apparatus 1001 and a sensor module 1002 according to another embodiment of the present invention. The light source apparatus 1001 includes a light-emitting module 1011 and a control unit 1021. The sensor module 1002 is an ambient sensor module for sensing an ambient-light parameter. The ambient-light parameter equivalent melanopic lux ("EML") to allow the control unit 1021 to control light emitted from the light-emitting module 1011 according to the ambient-light parameter. Thus, the light source apparatus 1001 provides light of different EML in different areas, at different points of time or according to different settings.

The light-emitting module 1011 provides at least one light beam B7 of different color temperatures, illuminance, CAF or CS/P. The light-emitting module 1011 can include the light-emitting modules 110a, 110b, 310, 410, 510, 610, 610a, 610b, 610c, 610d, 610f in the above-mentioned embodiments.

The sensor module 1002 includes a first photo sensor 1012, a second photo sensor 1022 and an illuminance sensor 1032 for sensing an ambient-light parameter such as EML.

In detail, in this embodiment, CAF and EML are defined as follows:

$$EML = 1.218 \times CAR \times Lux$$

$$CAF = \frac{\int X_{e,\lambda} C(\lambda) d\lambda}{\int X_{e,\lambda} V(\lambda) d\lambda}$$

The sensor module 1002 senses light in a certain spectrum in an area via the first photo sensor 1012, the second photo sensor 1022 and the illuminance sensor 1032.

Figure 48:
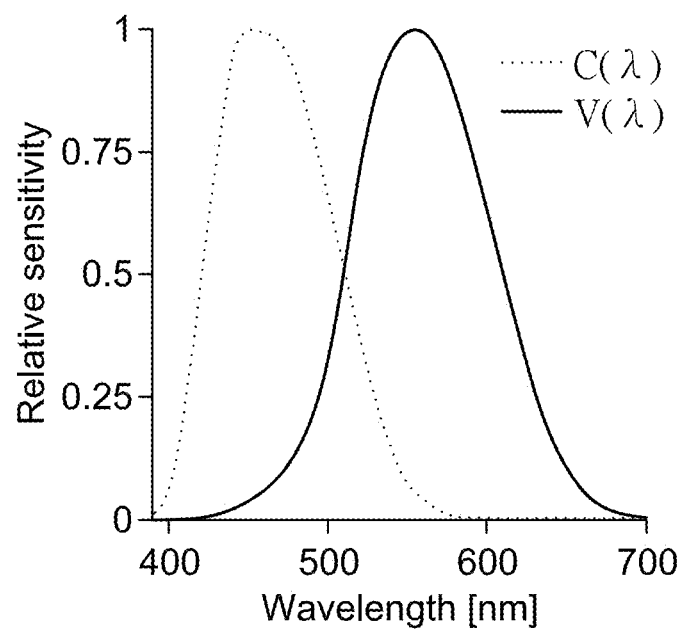
FIG. 48 shows a relationship of a light source apparatus versus light at certain wavelengths.

Referring to FIG. 48, light at a wavelength of 400 to 600 nm actuates the first photo sensor 1012 to provide a first sensed value $\int X_{e,\lambda} C(\lambda) d\lambda$. Light at a wavelength of 450 to 700 nm causes the second photo sensor 1022 to provide a second sensed value $\int X_{e,\lambda}(\lambda) d\lambda$.

The illuminance sensor 1032 is actuated by light to provide a sensed value of LUX.

The control unit 1021 turns the light emitted from the light-emitting module 1011 into a first light beam with high circadian stimulus value or LUX when the ambient-light parameter sensed by the sensor module 1002, i.e., the EML, is smaller than a first preset value. The control unit 1021 turns the light emitted from the light-emitting module 1011 into a second light beam with low circadian stimulus value or LUX when the EML sensed by the sensor module 1002 is larger than a second preset value. The first and second light beams can provide a same color temperature in this embodiment. The first and second light beams can provide different color temperatures in another embodiment.

Based on the first sensed value $\int X_{e,\lambda}(\lambda) d\lambda$, the second sensed value $\int X_{e,\lambda} C(\lambda) d\lambda$ and the sensed value of LUX, the control unit 1021 calculates the CAF and EML in the area, compares the calculated EML with a preset value for the area, and adjusts the light beam B7 emitted from the light-emitting module 1011 to render the EML in compliance with the preset value of LUX in the area such as regulations about EML in IWBI.

Moreover, the preset value for the area can be a timing parameter. That is, the preset value is determined according to different values of EML required for different periods of time in a day, and the control unit 1021 accordingly adjusts the light beam B7 emitted from the light-emitting module 1011.

Furthermore, time management data ("DT") and/or matching data are written in the DR of the system to allow the control unit 1021 to adjust the light beam B7 emitted from the light-emitting module 1011 according to different periods of time in a day. Related techniques have been described in the description of the embodiments referring to FIGS. 2D and 2E.

In addition, the preset value of LUX in the area can be an operation signal entered by a user UR via a user interface 130 or a connection interface 140. Related techniques have been described in the description of the embodiment referring to FIG. 2E.

Thus, the light source apparatus 1011 can adjust the EML according to the environment, time and purpose to maintain the user's natural physiological cycle and provide sufficient light without causing the user to sense any change in the color temperature.

Figure 49:
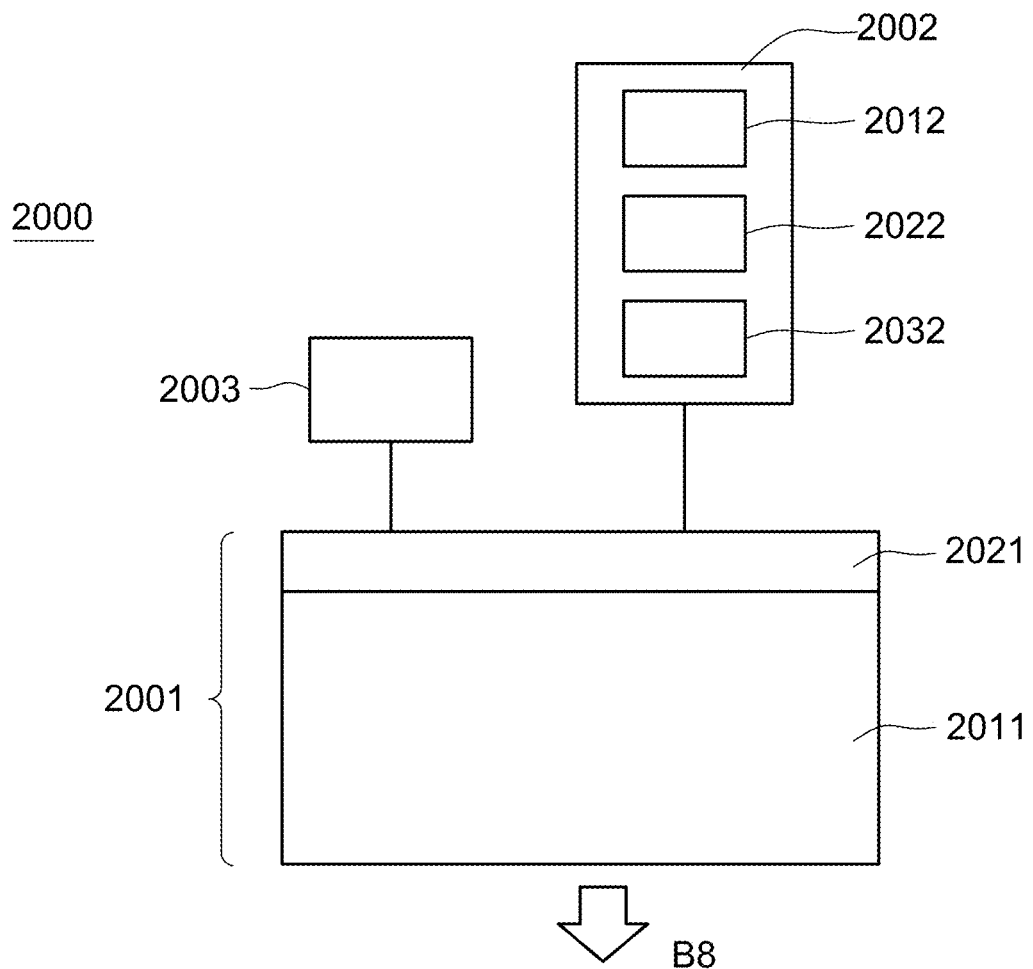
FIG. 49 is a schematic view of a light source apparatus according to another embodiment of the present invention.

Referring to FIG. 49, the light source system 2000 further includes physiological sensor 2003 for sensing the user's physiological parameters according to another embodiment. For example, the physiological parameters can be the frequency intensity of brainwave of the user UR sensed by an electroencephalograph. Alternatively, the physiological parameters can include the heart rate variability of the user UR sensed by a heart rate sensor.

According to an embodiment, the physiological sensor 2003 is an electroencephalograph in compliance with Ten-Tween electrode method. Experiments have proven that humans are sleepy and lowly alerted when the brainwave is strong in the range of 4.0 to 8.0 Hz. Humans are awake or highly alerted when the brainwave is intense in the range of 14 to 20 Hz.

As discussed above, the EML of the light beam B8 emitted from the light-emitting module 2011 is adjustable to satisfy the user's need. For example, the user UR may have to stay awake or alerted in the day or when he or she is studying or working. At such moments, the control unit 2021 controls the light beam B8 emitted from the light-emitting module 2011 to increase the EML to increase physiological stimulation on the user UR to increase the concentration level if the electroencephalograph senses that the brainwave of the user UR is strong in the range of 4.0 to 8.0 Hz. On the contrary, the user UR may feel like resting at night. At such a moment, the control unit 2021 controls the light beam B8 emitted from the light-emitting module 2011 to reduce the EML to reduce physiological stimulation on the user UR to allow the user UR to relax if the electroencephalograph senses that the brainwave of the user UR is strong in the range of 14 to 20 Hz.

According to another embodiment, the physiological sensor 2003 is a heart rate sensor for sensing the heart rate variability of the user UR as a physiological parameter. The control unit 2021 controls the EML of the light beam B8 emitted from the light-emitting module 2011 according to the heart rate variability of the user UR.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A light source system comprising:
   a first sensor module for sensing a ambient-light parameter; and
   a light source apparatus comprising:
      a light-emitting module for providing light of different color temperature, circadian stimulus value or illuminance; and
      a control unit for controlling the color temperature, circadian stimulus value or illuminance of the light according to the ambient-light parameter;
   wherein the ambient-light parameter is equivalent melanopic lux (EML) in an area.

2. The light source system according to claim 1, wherein the first sensor module comprises a first photo sensor for sensing light in a first range of wavelength and a second photo sensor for sensing light in a second range of wavelength.

3. The light source system according to claim 2, wherein the first range of wavelength is 400 to 600 nm, and the second range of wavelength is 450 to 700 nm.

4. The light source system according to claim 2, wherein the first sensor module further comprises an illuminance sensor for sensing the illuminance.

5. The light source system according to claim 1, wherein the control unit turns the light into a first light beam with high circadian stimulus value if the equivalent melanopic lux is smaller than a first preset value.

6. The light source system according to claim 1, wherein the control unit turns the light into a first light beam with high illuminance if the equivalent melanopic lux is smaller than a first preset value.

7. The light source system according to claim 1, wherein the control unit turns the light into a second light beam with low circadian stimulus value if the equivalent melanopic lux is larger than a second preset value.

8. The light source system according to claim 1, wherein the control unit turns the light into a second light beam with low illuminance if the equivalent melanopic lux is larger than a second preset value.

9. The light source system according to claim 1, wherein the control unit adjusts the color temperature, circadian stimulus value or illuminance of the light according to a timing parameter.

10. The light source system according to claim 1, further comprising a second sensor module for sensing a physiological parameter of a user.

11. The light source system according to claim 10, wherein the control unit controls the color temperatures, circadian stimulus value or illuminance of the light according to the physiological parameter.

12. The light source system according to claim 11, wherein the physiological parameter is a frequency intensity of brainwave.

13. The light source system according to claim 12, wherein the control unit turns the light emitted from the light-emitting module into a first light beam with high circadian stimulus value or illuminance or a second light beam with low circadian stimulus value or illuminance according to the frequency intensity of brainwave.

14. The light source system according to claim 13, wherein the first and second light beams have a same color temperature.

15. The light source system according to claim 14, wherein the control unit turns the light emitted from the light-emitting module into the second light beam if the frequency intensity of brainwave is smaller than a first preset value.

16. The light source system according to claim 15, wherein the brainwave frequency is 4.0 to 8.0 Hz.

17. The light source system according to claim 14, wherein the control unit turns the light emitted from the light-emitting module into the first light beam if the frequency intensity of brainwave is smaller than a second preset value.

18. The light source system according to claim 17, wherein the brainwave frequency is 14 to 20 Hz.

19. The light source system according to claim 1, wherein the control unit controls the circadian stimulus value or illuminance of the light beam according to a timing parameter.

20. The light source system according to claim 11, wherein the physiological parameter is heart rate variability.

21. The light source system according to claim 20, wherein the control unit turns the light emitted from the light-emitting module into a first light beam with high circadian stimulus value or illuminance or a second light beam with low circadian stimulus value or illuminance according to the heart rate variability.

22. The light source system according to claim 21, wherein the first and second light beams have a same color temperature.

23. The light source system according to claim 21, wherein the control unit adjusts the light beam circadian stimulus value or illuminance according to a timing parameter.

* * * * *